US012794586B2

(12) United States Patent
Yang et al.

(10) Patent No.: US 12,794,586 B2
(45) Date of Patent: Nov. 10, 2026

(54) PROBABILISTIC SHAPING AND CHANNEL CODING FOR WIRELESS SIGNALS

(71) Applicant: QUALCOMM Incorporated, San Diego, CA (US)

(72) Inventors: Wei Yang, San Diego, CA (US); Jing Jiang, San Diego, CA (US); Liangming Wu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 18/872,246

(22) PCT Filed: Jul. 15, 2022

(86) PCT No.: PCT/CN2022/105852

§ 371 (c)(1),
(2) Date: Dec. 5, 2024

(87) PCT Pub. No.: WO2024/011552

PCT Pub. Date: Jan. 18, 2024

(65) Prior Publication Data

US 2025/0358044 A1 Nov. 20, 2025

(51) Int. Cl.
*H04L 1/00* (2006.01)
*H04L 27/34* (2006.01)

(52) U.S. Cl.
CPC .......... *H04L 1/0042* (2013.01); *H04L 1/0047* (2013.01); *H04L 27/3405* (2013.01)

(58) Field of Classification Search
CPC ..... H04L 1/0042; H04L 1/0058; H04L 1/001; H04L 27/04; H04L 1/0007; H04L 1/0061;
(Continued)

(56) References Cited

U.S. PATENT DOCUMENTS 10,069,519 B1 * 9/2018 Millar .................... H04L 1/0042
10,742,472 B1 8/2020 Van Nee
(Continued)

FOREIGN PATENT DOCUMENTS

AU 711984 B2 10/1999
CA 2471541 A1 7/2003
(Continued)

OTHER PUBLICATIONS

International Search Report and Written Opinion—PCT/CN2022/105852 —ISA/EPO—Nov. 30, 2022.
(Continued)

*Primary Examiner* — Chieh M Fan
(74) *Attorney, Agent, or Firm* — Holland & Hart LLP

(57) ABSTRACT

Methods, systems, and devices for a framework for probabilistic shaping and channel coding for wireless signals are described to support a probabilistic shaping framework for higher-order modulations in which shaping and channel coding may be independent. A transmitting device may shape a set of information bits using a set of masking bits. The transmitting device may encode, shape, modulate, and transmit information bits to a receiving device, and the receiving device may demodulate, deshape, and decode the received information bits. In addition to transmitting the information bits to the receiving device, the transmitting device may also transmit a set of shaping bits, which may be indicative of the set of masking bits used to shape the information bits. The receiving device may use the set of shaping bits to generate the set of masking bits, and may use the set of masking bits to deshape the received information bits.

28 Claims, 23 Drawing Sheets

(58) Field of Classification Search

CPC ................. H04L 1/0059; H04L 1/0063; H04L 1/0064; H04L 5/0007; H04L 5/001; H04L 5/0046; H04L 1/0047; H04L 27/3405; H04B 10/1129; H04W 24/08; H04W 28/06; H04W 28/04; H03M 13/3916; H03M 12/1171

USPC ................................. 375/262, 260, 267, 299

See application file for complete search history.

(56) References Cited

U.S. PATENT DOCUMENTS

| | | | | |
|---|---|---|---|---|
| 11,228,396 | B2 * | 1/2022 | Doan | H04L 1/0042 |
| 2003/0123564 | A1 * | 7/2003 | Ophir | H04L 27/3411 375/265 |
| 2020/0119840 | A1 * | 4/2020 | Ebrahimzad | H04L 1/0042 |
| 2020/0162172 | A1 * | 5/2020 | Sridhar | H04L 27/12 |
| 2021/0211229 | A1 | 7/2021 | Doan et al. | |
| 2022/0103285 | A1 * | 3/2022 | Yoshida | H04L 27/362 |
| 2023/0033774 | A1 * | 2/2023 | Koike-Akino | H04L 1/0065 |
| 2024/0275645 | A1 * | 8/2024 | Yang | H04L 1/0042 |
| 2024/0340209 | A1 * | 10/2024 | Sayed Hassan | H04L 27/2636 |
| 2024/0406797 | A1 * | 12/2024 | Sen | H04L 1/0061 |
| 2025/0280407 | A1 * | 9/2025 | Yang | H04L 69/324 |
| 2025/0286757 | A1 * | 9/2025 | Liu | H04L 27/34 |

FOREIGN PATENT DOCUMENTS

| | | | |
|---|---|---|---|
| CA | 2390070 | A1 | 12/2003 |
| CN | 113411135 | A | 9/2021 |
| WO | WO-2019197037 | A1 | 10/2019 |
| WO | WO-2021056399 | A1 | 4/2021 |

OTHER PUBLICATIONS

Chen D., et al., "Low-Complexity High-Performance Low-Density Parity-Check Encoder Design for China Digital Radio Standard", IEEE Acces, vol. 5, Jul. 4, 2017, pp. 20880-20886.

Bocherer G., et al., "High Throughput Probabilistic Shaping with Product Distribution Matching", ARXIV.ORG, Cornell University Library, 201 OLIN Library Cornell University Ithaca, NY 14853, arXiv: 1702.07510v1 [cs.IT], Feb. 24, 2017, XP080748436, pp. 1-9.

Supplementary Partial European Search Report—EP22950673—Search Authority—MUNICH—Jun. 11, 2026.

Yoshida T., et al., "Compressed Shaping: Concept and FPGA Demonstration", Journal of Lightwave Technology, Jun. 2021, vol. 39, No. 17, IEEE, pp. 5412-5422.

* cited by examiner

PROBABILISTIC SHAPING AND CHANNEL CODING FOR WIRELESS SIGNALS

CROSS REFERENCE

The present Application is a 371 national stage filing of International PCT Application No. PCT/CN2022/105852 by YANG et al. entitled "PROBABILISTIC SHAPING AND CHANNEL CODING FOR WIRELESS SIGNALS," filed Jul. 15, 2022, which is assigned to the assignee hereof, and which is expressly incorporated by reference in its entirety herein.

FIELD OF TECHNOLOGY

The following relates to wireless communications, and particularly to a framework for probabilistic shaping and channel coding for wireless signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless systems, data may be modulated by a transmitting device for transmission to a receiving device by shaping the data into a constellation of modulated symbols. For example, in some cases, a distribution of modulated symbols may be shaped such that different symbols may have different probabilities of usage, where such a distribution may be referred to as a non-uniform distribution of symbols. For example, the distribution of symbols may be shaped using one or more probabilistic shaping techniques. In one example of a probabilistic shaping framework, shaping may be performed prior to channel coding of information bits and may utilize systematic channel codes to preserve the shaping after channel coding. In such examples, the structure of the probabilistic shaping framework may be coupled or related with channel coding (e.g., to preserve the shaping after the coding is performed), which may result in less flexibility for some coding parameters.

SUMMARY

The described techniques relate to improved methods, systems, devices, and apparatuses that support probabilistic shaping and channel coding for wireless signals. For example, the described techniques provide for a probabilistic shaping framework for higher-order modulations in which shaping and channel coding may be independent. A transmitting device (e.g., network entity, user equipment (UE)) may shape a set of information bits (e.g., including data bits and parity bits) using a set of masking bits. The transmitting device may encode, shape, modulate, and transmit information bits to a receiving device (e.g., UE, network entity), and the receiving device may demodulate, deshape, and decode the received information bits. In addition to transmitting the information bits to the receiving device, the transmitting device may also transmit a set of shaping bits, which may be indicative of the set of masking bits used to shape the information bits. The receiving device may use the set of shaping bits to generate the set of masking bits, and may use the set of masking bits to deshape the received information bits. The information bits may be encoded for transmission either before shaping or after shaping, and in either case, the information bits and the set of shaping bits may be encoded using different channel coding schemes. The shaping bits and the information bits may be separately or jointly modulated for transmission to the receiving device.

A method for wireless communication at a first device is described. The method may comprise generating, using information bits, a set of shaping bits associated with shaping the information bits into a probability distribution of modulated symbols for a transmission, encoding the information bits using a first channel coding scheme, encoding the set of shaping bits using a second channel coding scheme based at least in part on generating the set of shaping bits, and modulating the encoded information bits and the encoded set of shaping bits for the transmission to a second device, the modulated encoded information bits associated with modulated symbols that are probabilistically shaped corresponding to the probability distribution.

An apparatus for wireless communication at a first device is described. The apparatus may comprise a processor, memory coupled with the processor, and instructions stored in the memory. The instructions may be executable by the processor to cause the apparatus to generate, using information bits, a set of shaping bits associated with shaping the information bits into a probability distribution of modulated symbols for a transmission, encode the information bits using a first channel coding scheme, encode the set of shaping bits using a second channel coding scheme based at least in part on generating the set of shaping bits, and modulate the encoded information bits and the encoded set of shaping bits for the transmission to a second device, the modulated encoded information bits associated with modulated symbols that are probabilistically shaped corresponding to the probability distribution.

Another apparatus for wireless communication at a first device is described. The apparatus may comprise means for generating, using information bits, a set of shaping bits associated with shaping the information bits into a probability distribution of modulated symbols for a transmission, means for encoding the information bits using a first channel coding scheme, means for encoding the set of shaping bits using a second channel coding scheme based at least in part on generating the set of shaping bits, and means for modulating the encoded information bits and the encoded set of shaping bits for the transmission to a second device, the modulated encoded information bits associated with modulated symbols that are probabilistically shaped corresponding to the probability distribution.

A non-transitory computer-readable medium storing code for wireless communication at a first device is described. The code may comprise instructions executable by a processor to generate, using information bits, a set of shaping bits associated with shaping the information bits into a probability distribution of modulated symbols for a transmission, encode the information bits using a first channel coding scheme, encode the set of shaping bits using a second channel coding scheme based at least in part on generating the set of shaping bits, and modulate the encoded information bits and the encoded set of shaping bits for the transmission to a second device, the modulated encoded information bits associated with modulated symbols that are probabilistically shaped corresponding to the probability distribution.

Some examples of the method, apparatuses, and non-transitory computer-readable medium described herein may further comprise operations, features, means, or instructions for transmitting the modulated encoded information bits and the modulated encoded set of shaping bits to the second device.

Some examples of the method, apparatuses, and non-transitory computer-readable medium described herein may further comprise operations, features, means, or instructions for receiving first feedback from the second device based at least in part on transmitting the modulated encoded information bits, the first feedback associated with the information bits and receiving, from the second device based at least in part on transmitting the modulated encoded set of shaping bits, second feedback different from the first feedback, the second feedback associated with the set of shaping bits.

In some examples of the method, apparatuses, and non-transitory computer-readable medium described herein, the probability distribution of the modulated symbols comprises a first set of symbols with respective probabilities of usage below a first probability level and a second set of symbols with respective probabilities of usage above or equal to the first probability level.

Some examples of the method, apparatuses, and non-transitory computer-readable medium described herein may further comprise operations, features, means, or instructions for generating a set of masking bits corresponding to the set of shaping bits and shaping the information bits for modulation based at least in part on combining the information bits with the set of masking bits, wherein modulating the encoded information bits may be based at least in part on shaping the information bits.

In some examples of the method, apparatuses, and non-transitory computer-readable medium described herein, generating the set of masking bits may comprise operations, features, means, or instructions for generating the set of masking bits using the set of shaping bits, wherein generating the masking bits using the set of shaping bits comprises one or more of multiplying the set of shaping bits with a generator matrix to generate the set of masking bits or encoding the set of shaping bits using a linear code to generate the set of masking bits.

In some examples of the method, apparatuses, and non-transitory computer-readable medium described herein, generating the set of shaping bits may comprise operations, features, means, or instructions for generate the set of shaping bits by compressing the set of masking bits to reduce a size of the set of masking bits.

In some examples of the method, apparatuses, and non-transitory computer-readable medium described herein, the information bits comprise data bits and parity bits associated with the data bits.

In some examples of the method, apparatuses, and non-transitory computer-readable medium described herein, shaping the information bits may comprise operations, features, means, or instructions for applying the set of masking bits to a subset of the information bits, wherein the subset of the information bits may be based at least in part on one or more respective modulation symbol bit positions associated with the subset of information bits.

In some examples of the method, apparatuses, and non-transitory computer-readable medium described herein, shaping the information bits may comprise operations, features, means, or instructions for applying a first set of shaping parameters to a first subset of the information bits, the first subset associated with a first set of frequency resources, a first set of time resources, a first set of spatial layers, or any combination thereof and applying a second set of shaping parameters to a second subset of the information bits, the second subset associated with a second set of frequency resources, a second set of time resources, a second set of spatial layers, or any combination thereof.

In some examples of the method, apparatuses, and non-transitory computer-readable medium described herein, generating the set of shaping bits may comprise operations, features, means, or instructions for generating a first subset of the set of shaping bits corresponding to the first set of shaping parameters and generating a second subset of the set of shaping bits corresponding to the second set of shaping parameters.

In some examples of the method, apparatuses, and non-transitory computer-readable medium described herein, generating the set of shaping bits may comprise operations, features, means, or instructions for shaping the information bits for modulation after encoding the information bits based at least in part on combining the information bits with a set of masking bits, wherein the set of shaping bits may be indicative of the set of masking bits and generating the set of shaping bits after encoding the information bits using the encoded information bits.

In some examples of the method, apparatuses, and non-transitory computer-readable medium described herein, generating the set of shaping bits may comprise operations, features, means, or instructions for shaping the information bits for modulation before encoding the information bits based at least in part on combining the information bits with a set of masking bits, wherein the set of shaping bits may be indicative of the set of masking bits and generating the set of shaping bits using unencoded information bits based at least in part on shaping the information bits before encoding the information bits.

In some examples of the method, apparatuses, and non-transitory computer-readable medium described herein, modulating the encoded information bits and the encoded set of shaping bits may comprise operations, features, means, or instructions for modulating the encoded information bits using a first modulation scheme, modulating the encoded set of shaping bits using a second modulation scheme, and transmitting the modulated encoded information bits and the modulated encoded set of shaping bits to the second device.

In some examples of the method, apparatuses, and non-transitory computer-readable medium described herein, modulating the encoded information bits and the encoded set of shaping bits may comprise operations, features, means, or instructions for jointly modulating the encoded information bits and the encoded set of shaping bits using a modulation scheme and transmitting the modulated encoded information bits and the modulated encoded set of shaping bits to the second device.

In some examples of the method, apparatuses, and non-transitory computer-readable medium described herein, the modulated encoded information bits may be mapped to respective amplitudes of the modulated symbols and the modulated encoded set of shaping bits may be mapped to respective signs of the modulated symbols.

Some examples of the method, apparatuses, and non-transitory computer-readable medium described herein may further comprise operations, features, means, or instructions for transmit the modulated encoded information bits and the modulated encoded set of shaping bits to the second device, wherein the modulated encoded information bits and the modulated encoded set of shaping bits may be transmitted via a same transmission.

Some examples of the method, apparatuses, and non-transitory computer-readable medium described herein may further comprise operations, features, means, or instructions for transmit the modulated encoded information bits and the modulated encoded set of shaping bits to the second device, wherein the modulated encoded information bits and the modulated encoded set of shaping bits may be transmitted via different transmissions.

In some examples of the method, apparatuses, and non-transitory computer-readable medium described herein, the set of shaping bits may be concatenated with second information bits for encoding, modulation, and transmission via a second transmission.

A method for wireless communication at a second device is described. The method may comprise demodulating information bits and a set of shaping bits from signaling received from a first device, the set of shaping bits associated with shaping the information bits into a probability distribution of modulated symbols for wireless communication, decoding the set of shaping bits using a second channel decoding scheme based at least in part on demodulating the set of shaping bits, deshaping the information bits using a set of masking bits, the set of masking bits generated based at least in part on the decoded set of shaping bits, and decoding the information bits using a first channel decoding scheme based at least in part on deshaping the information bits.

An apparatus for wireless communication at a second device is described. The apparatus may comprise a processor, memory coupled with the processor, and instructions stored in the memory. The instructions may be executable by the processor to cause the apparatus to demodulate information bits and a set of shaping bits from signaling received from a first device, the set of shaping bits associated with shaping the information bits into a probability distribution of modulated symbols for wireless communication, decode the set of shaping bits using a second channel decoding scheme based at least in part on demodulating the set of shaping bits, deshape the information bits using a set of masking bits, the set of masking bits generated based at least in part on the decoded set of shaping bits, and decode the information bits using a first channel decoding scheme based at least in part on deshaping the information bits.

Another apparatus for wireless communication at a second device is described. The apparatus may comprise means for demodulating information bits and a set of shaping bits from signaling received from a first device, the set of shaping bits associated with shaping the information bits into a probability distribution of modulated symbols for wireless communication, means for decoding the set of shaping bits using a second channel decoding scheme based at least in part on demodulating the set of shaping bits, means for deshaping the information bits using a set of masking bits, the set of masking bits generated based at least in part on the decoded set of shaping bits, and means for decoding the information bits using a first channel decoding scheme based at least in part on deshaping the information bits.

A non-transitory computer-readable medium storing code for wireless communication at a second device is described. The code may comprise instructions executable by a processor to demodulate information bits and a set of shaping bits from signaling received from a first device, the set of shaping bits associated with shaping the information bits into a probability distribution of modulated symbols for wireless communication, decode the set of shaping bits using a second channel decoding scheme based at least in part on demodulating the set of shaping bits, deshape the information bits using a set of masking bits, the set of masking bits generated based at least in part on the decoded set of shaping bits, and decode the information bits using a first channel decoding scheme based at least in part on deshaping the information bits.

Some examples of the method, apparatuses, and non-transitory computer-readable medium described herein may further comprise operations, features, means, or instructions for receiving the signaling from the first device, wherein demodulating the information bits and the set of shaping bits may be based at least in part on receiving the signaling.

Some examples of the method, apparatuses, and non-transitory computer-readable medium described herein may further comprise operations, features, means, or instructions for transmitting first feedback to the first device based at least in part on decoding the information bits, the first feedback associated with the information bits and transmitting, to the first device based at least in part on decoding the set of shaping bits, second feedback different from the first feedback, the second feedback associated with the set of shaping bits.

In some examples of the method, apparatuses, and non-transitory computer-readable medium described herein, the probability distribution of modulated symbols comprises a first set of symbols with respective probabilities of usage below a first probability level and a second set of symbols with respective probabilities of usage above or equal to the first probability level.

In some examples of the method, apparatuses, and non-transitory computer-readable medium described herein, deshaping the information bits may comprise operations, features, means, or instructions for removing the set of masking bits from a first set of log likelihood ratios associated with the information bits and the set of masking bits to generate a second set of log likelihood ratios associated with the information bits.

Some examples of the method, apparatuses, and non-transitory computer-readable medium described herein may further comprise operations, features, means, or instructions for generating the set of masking bits based at least in part on one or more of multiplying the set of shaping bits with a generator matrix to generate the set of masking bits or encoding the set of shaping bits using a linear code to generate the set of masking bits.

Some examples of the method, apparatuses, and non-transitory computer-readable medium described herein may further comprise operations, features, means, or instructions for generating the set of masking bits based at least in part on decompressing the set of shaping bits.

In some examples of the method, apparatuses, and non-transitory computer-readable medium described herein, the information bits comprise data bits and parity bits associated with the data bits.

In some examples of the method, apparatuses, and non-transitory computer-readable medium described herein, deshaping the information bits may comprise operations, features, means, or instructions for removing the set of masking bits from a subset of the information bits, wherein the subset of the information bits may be based at least in part on one or more respective modulation symbol bit positions associated with the subset of information bits.

In some examples of the method, apparatuses, and non-transitory computer-readable medium described herein, deshaping the information bits may comprise operations, features, means, or instructions for applying a first set of deshaping parameters to a first subset of the information bits, the first subset associated with a first set of frequency resources, a first set of time resources, a first set of spatial layers, or any combination thereof and applying a second set of deshaping parameters to a second subset of the information bits, the second subset associated with a second set of frequency resources, a second set of time resources, a second set of spatial layers, or any combination thereof.

In some examples of the method, apparatuses, and non-transitory computer-readable medium described herein, a first subset of the set of shaping bits corresponds to the first set of deshaping parameters and a second subset of the set of shaping bits corresponds to the second set of deshaping parameters.

In some examples of the method, apparatuses, and non-transitory computer-readable medium described herein, deshaping the information bits may comprise operations, features, means, or instructions for deshaping the information bits after decoding the information bits.

In some examples of the method, apparatuses, and non-transitory computer-readable medium described herein, deshaping the information bits may comprise operations, features, means, or instructions for deshaping the information bits before decoding the information bits.

In some examples of the method, apparatuses, and non-transitory computer-readable medium described herein, demodulating the information bits and the set of shaping bits may comprise operations, features, means, or instructions for demodulating the information bits using a first demodulation scheme and demodulating the set of shaping bits using a second demodulation scheme.

In some examples of the method, apparatuses, and non-transitory computer-readable medium described herein, demodulating the information bits and the set of shaping bits may comprise operations, features, means, or instructions for jointly demodulating the information bits and the set of shaping bits using a demodulation scheme.

In some examples of the method, apparatuses, and non-transitory computer-readable medium described herein, the information bits may be mapped to respective amplitudes of the modulated symbols and the set of shaping bits may be mapped to respective signs of the modulated symbols.

Some examples of the method, apparatuses, and non-transitory computer-readable medium described herein may further comprise operations, features, means, or instructions for receiving the modulated encoded information bits and the modulated encoded set of shaping bits from the first device, wherein the modulated encoded information bits and the modulated encoded set of shaping bits may be received via a same transmission.

Some examples of the method, apparatuses, and non-transitory computer-readable medium described herein may further comprise operations, features, means, or instructions for receive the modulated encoded information bits and the modulated encoded set of shaping bits from the first device, wherein the modulated encoded information bits and the modulated encoded set of shaping bits may be received via different transmissions.

In some examples of the method, apparatuses, and non-transitory computer-readable medium described herein, the set of shaping bits may be concatenated with second information bits for reception via a second transmission, demodulation, and decoding.

DETAILED DESCRIPTION

Figure 1:
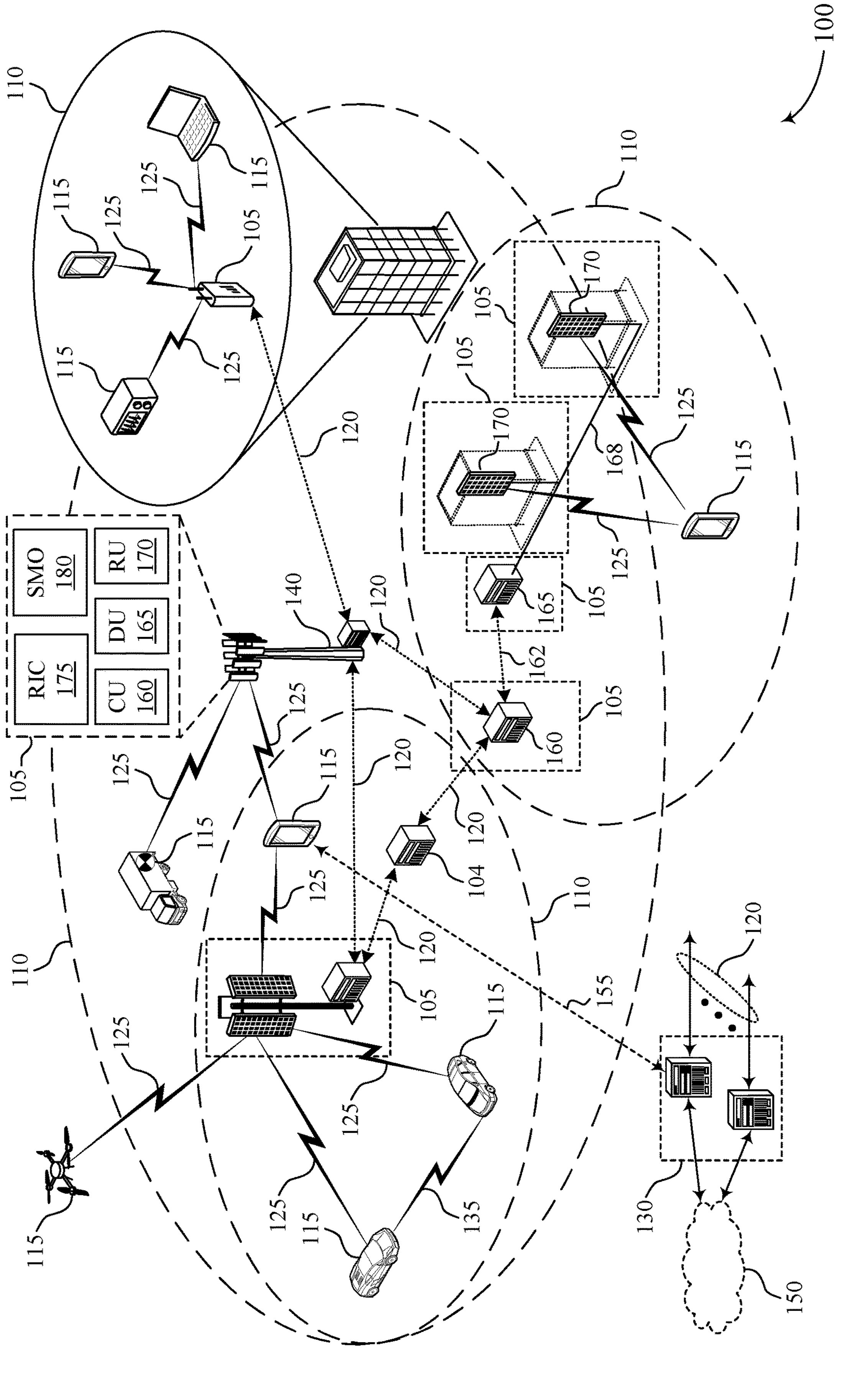
FIG. 1 illustrates an example of a wireless communications system that supports probabilistic shaping and channel coding for wireless signals in accordance with one or more aspects of the present disclosure.

Some wireless communications systems may utilize higher order modulation to increase spectral efficiency for wireless transmissions. In some cases, a distribution of modulated symbols may be shaped such that different symbols may have different probabilities of usage, where such a distribution may be referred to as a non-uniform distribution of symbols. For example, the distribution of symbols may be shaped using one or more probabilistic shaping techniques. Probabilistic shaping may be a technique used to increase spectral efficiency of the coded modulation, and may generate non-uniformly distributed coded modulation symbols, or non-uniformly distributed constellations. In some examples, non-uniformly distributed symbols may have a higher capacity and may result in higher transmission capacities, higher spectral efficiencies, or generally higher communication quality than uniform symbol distributions.

An example of a probabilistic shaping framework may be probabilistic amplitude shaping (PAS) (e.g., distribution matching). PAS may shape an amplitude of a constellation of modulated symbols (e.g., the amplitude may be non-uniform), while leaving the sign of the constellation uniformly distributed. In some examples, PAS may be performed prior to channel coding of information bits. In some examples, PAS may perform shaping on information bits (e.g., shaping the bits for distribution into a non-uniform constellation of symbols), and may utilize systematic channel codes. For example, PAS may use a systematic channel code to preserve the shaping applied to the information bits (e.g., the shaping may be preserved during channel coding, which may occur after shaping). In PAS, parity bits may not be shaped, and instead may be mapped to the signs of the constellations (e.g., which signs may not be shaped in PAS).

Because some shaping strategies (e.g., PAS) for creating the non-uniform distribution of symbols may not shape parity bits with the associated data bits, such strategies may reduce a shaping gain for a retransmission. For example, if an initial transmission is not successful, a retransmission may be based on one or more parity bits. In some examples, more parity bits may increase incremental redundancy. However, because the parity bits may not be shaped, a shaping gain for retransmission may be reduced or lost. Additionally, shaping strategies such as PAS may use a different mapping from a systematic bit mapping for a wireless system, which may reduce coding performance. Further, shaping strategies such as PAS may result in difficulties for performing selective shaping on different frequency, spatial, or time resources (or a combination thereof) because shaping may be related to channel coding.

The present disclosure provides techniques for a probabilistic shaping framework for higher-order modulations in which shaping and channel coding may be independent. A transmitting device (e.g., network entity, user equipment (UE)) may shape a set of information bits (e.g., including data bits and parity bits) using a set of masking bits (e.g., bits or parameters for shaping, or masking, the set of information bits when combined with the set of information bits). The transmitting device may encode, shape, modulate, and transmit information bits to a receiving device (e.g., UE, network entity), and the receiving device may demodulate, deshape, and decode the received information bits. Shaping for parity bits may therefore be provided, mapping may be aligned with coding systems, and selective shaping for different sets of resources may be supported.

In addition to transmitting the information bits to the receiving device, the transmitting device may also transmit a set of shaping bits, which may be indicative of the set of masking bits used to shape the information bits (e.g., the set of shaping bits may be indicative or otherwise represent one or more shaping parameters used to shape the set of information bits). The receiving device may use the set of shaping bits to generate the set of masking bits, and may use the set of masking bits to deshape the received information bits. Such shaping techniques may support joint shaping of data and parity bits (e.g., in the information bits) by performing shaping after generation of the parity bits (e.g., after channel coding). Because parity bits are shaped, the systematic bit mapping may align with wireless system coding systems by supporting mapping of parity bits to amplitudes of a shaped constellation (e.g., least significant bits (LSBs)) and mapping of data bits (e.g., other information bits) to signs of the shaped constellation (e.g., most significant bits (MSBs)). Additionally or alternatively, because shaping and channel coding are decoupled, such shaping techniques may support selective shaping for different sets of resources (e.g., which may be associated with different, respective channel codings).

The information bits may be encoded for transmission either before shaping or after shaping, and in either case, the information bits and the set of shaping bits may be encoded using different channel coding schemes. The shaping bits and the information bits may be separately or jointly modulated for transmission to the receiving device. In some examples, the transmitting device may perform modulation of the encoded information bits and encoded shaping bits separately or jointly. In some examples, the receiving device may separately transmit feedback for the shaping bits and information bits. In some other examples, the shaping of the information bits may be selective shaping (e.g., different for different frequency, spatial, or time resources). In some cases, the shaping bits may be concatenated with (e.g., included in) a subsequent transmission (e.g., of information bits).

Aspects of the disclosure are initially described in the context of wireless communications systems. Aspects of the disclosure are illustrated by and described with reference to a reception scheme and transmission schemes that relate to probabilistic shaping and channel coding for wireless signals. Aspects of the disclosure are further illustrated by and described with reference to apparatus diagrams, system diagrams, and flowcharts that relate to probabilistic shaping and channel coding for wireless signals.

FIG. 1 illustrates an example of a wireless communications system 100 that supports probabilistic shaping and channel coding for wireless signals in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2))

functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support probabilistic shaping and channel coding for wireless signals as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A transmitting device (e.g., network entity 105, UE 115) may shape a set of information bits (e.g., including data bits and parity bits) using a set of masking bits. The transmitting device may encode, shape, modulate, and transmit information bits to a receiving device (e.g., UE 115, network entity 105), and the receiving device may demodulate, deshape, and decode the received information bits. In addition to transmitting the information bits to the receiving device, the transmitting device may also transmit a set of shaping bits, which may be indicative of the set of masking bits used to shape the information bits. The receiving device may use the set of shaping bits to generate the set of masking bits, and may use the set of masking bits to deshape the received information bits. The information bits may be encoded for transmission either before shaping or after shaping, and in either case, the information bits and the set of shaping bits may be encoded using different channel coding schemes. The shaping bits and the information bits may be separately or jointly modulated for transmission to the receiving device.

Figure 2:
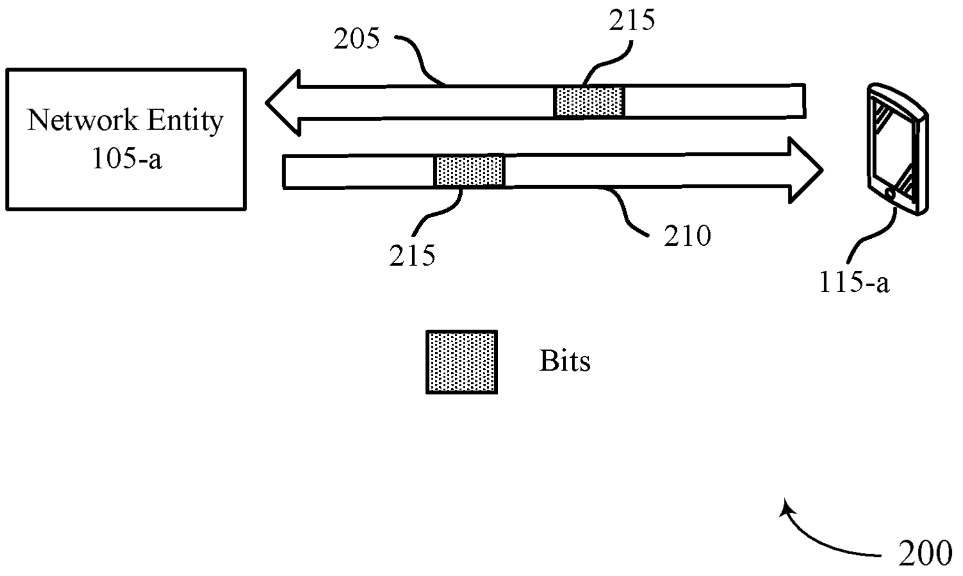
FIG. 2 illustrates an example of a wireless communications system that supports probabilistic shaping and channel coding for wireless signals in accordance with one or more aspects of the present disclosure.

FIG. 2 illustrates an example of a wireless communications system 200 that supports probabilistic shaping and channel coding for wireless signals in accordance with one or more aspects of the present disclosure. The wireless communications system 200 may include a network entity 105-*a* and a UE 115-*a*, which may be examples of the corresponding devices described herein with reference to FIG. 1. The network entity 105-*a* and the UE 115-*a* may communicate with each other in either the uplink or the downlink, where the UE 115-*a* may transmit in the uplink and the network entity 105-*a* may transmit in the downlink. In some cases, the UE 115-*a* may additionally or alternatively communicate with another UE 115 in the sidelink. A device transmitting a signal (e.g., in the uplink, downlink, or sidelink) may be referred to as a transmitting device, and a device receiving the transmitted signal (e.g., in the uplink, downlink, or sidelink) may be referred to as a receiving device.

Generally, the wireless communications system 200 illustrates an example of the network entity 105-*a* and the UE 115-*a* communicating via an uplink channel 205 or a downlink channel 210 (e.g., while the UE 115-*a* may additionally or alternatively communicate with another UE 115 via a sidelink channel). For example, the network entity 105-*a*, the UE 115-*a*, or both, may transmit a signal modulated to represent a set of bits 215. As such, the bits 215 (e.g., the modulated signal representative of the bits 215) may be communicated between the network entity 105-*a* and the UE 115-*a* via the uplink channel 205 or the downlink channel 210. For example, the bits 215 may be transmitted via a distribution of modulated symbols, where each symbol in the distribution may represent one or more bits.

Some wireless communications systems (e.g., cellular, Wi-Fi) may utilize higher order modulation (e.g., 16 quadrature amplitude modulation (QAM), 64 QAM, 256 QAM) to increase spectral efficiency for wireless transmissions at higher signal-to-noise-ratio (SNR) values. In such systems, constellations of modulated symbols may be fixed (e.g., may be square constellations), where each constellation point (e.g., value, symbol) may have a same probability of being used as another constellation point (e.g., each constellation point may be used with equal probability).

In some cases, the distribution of symbols may be shaped such that different symbols may have different probabilities of usage, where such a distribution may be referred to as a non-uniform distribution of symbols. For example, a non-uniform distribution of symbols may include a first set of symbols with respective probabilities of usage below a first probability level and a second set of symbols with respective probabilities of usage above or equal to the first probability level. In such cases, the first set of symbols may include one or more probabilities below the first probability level (e.g., different probabilities below the first probability level) and the second set of symbols may include one or more probabilities above or equal to the first probability level (e.g., different probabilities above or equal to the first probability level).

A non-uniform distribution of symbols may be shaped using one or more probabilistic shaping techniques. Probabilistic shaping may be a technique used to increase spectral efficiency of the coded modulation, and may generate non-uniformly distributed coded modulation symbols, or non-uniformly distributed constellations. In some examples, non-uniformly distributed QAM may have a higher capacity than a uniformly distributed QAM. Such non-uniform distributions may result in higher transmission capacities, higher spectral efficiencies, or generally higher communication quality than uniform symbol distributions. For example, non-uniformly distributed constellations may be associated with a larger mutual information (e.g., an information I, defined by parameters X and Y) than uniformly distributed constellations, at the same SNR.

An example of a probabilistic shaping framework may be PAS (e.g., distribution matching). PAS may shape an amplitude of a constellation of modulated symbols (e.g., the amplitude may be non-uniform), while leaving the sign of the constellation uniformly distributed. In some examples, PAS may be performed prior to channel coding of information bits. In some examples, PAS may perform shaping on information bits (e.g., shaping the bits for distribution into a non-uniform constellation of symbols), and may utilize systematic channel codes. For example, PAS may use a systematic channel code to preserve the shaping applied to the information bits (e.g., the shaping may be preserved during channel coding, which may occur after shaping). In PAS, parity bits may not be shaped, and instead may be mapped to the signs of the constellations (e.g., which signs may not be shaped in PAS).

In some examples, the structure of the PAS may be coupled or related with channel coding (e.g., to preserve the shaping after the coding is performed), which may result in less flexibility for some coding parameters. For example, in some cases, channel conditions may change with time or frequency (e.g., among other parameters), and if the channel coding does not change with one or more of these parameters (e.g., because channel coding is based on, or related to, PAS), a communication quality of the associated signaling may decrease. Further, if shaping is performed prior to channel coding, a quantity of uncoded bits used by a channel coding scheme (e.g., an encoder) may be larger than a payload size of the associated information bits (e.g., the quantity of information bits).

Because some shaping strategies (e.g., PAS) for creating the non-uniform distribution of symbols may not shape parity bits with the associated data bits, such strategies may reduce a shaping gain for a retransmission. For example, in a HARQ transmission, if an initial transmission is not successful, a retransmission may be based on one or more parity bits. In some examples, more parity bits may increase incremental redundancy. However, because the parity bits may not be shaped, a shaping gain for retransmission may be reduced or lost. For example, because HARQ processes use a circular buffer, a reduced subset of the shaped bits may be retransmitted (e.g., and another subset of the shaped may not be retransmitted), while any parity bits that are retransmitted may not be shaped.

Because only some of the shaped bits may be retransmitted, shaping gains may be lost because the bits may be shaped for transmission together, but may not be transmitted together. Additionally, because a reduced subset of the shaped bits may be retransmitted, a receiving device may experience difficulties in determining a distribution associated with (e.g., on) the shaped symbols. In some cases, because a quantity of uncoded bits received by the encoder may be larger than the actual payload (e.g., quantity of information bits), a retransmission may also use more resources for encoding in order to support decoding the shaped bits at the receiving device.

Additionally, shaping strategies such as PAS may map systematic bits (e.g., data bits) to the LSBs of a modulation constellation, and may map parity bits to the MSBs, or signs, of the modulation constellation. Such a design may be different from a systematic bit priority mapping (SBPM) used by a wireless communications system (e.g., an NR system), where the wireless communications system may use the SBPM to increase performance for low-density parity check (LDPC) code. For example, in the SBPM of the wireless communications system, systematic bits may be mapped to MSBs and parity bits may be mapped to LSBs. Because the SBPM may use a different mapping than the PAS mapping, transmissions using PAS mapping may experience a reduced coding gain (e.g., may lose coding gain), which may reduce coding performance.

Further, shaping strategies such as PAS may result in difficulties for performing selective shaping on different frequency, spatial, or time resources (or a combination thereof). For example, in some cases, a shaping rate may be selected to fit channel SNR. In an example of a MIMO, or a fading channel (e.g., or both), the SNR may be different for different subbands, layers, or both. Such differences in SNR may increase a difficulty for PAS techniques to perform selective shaping on frequency, spatial, and/or time resources.

The present disclosure provides techniques for a probabilistic shaping framework for higher-order modulations in which shaping and channel coding may be decoupled. A transmitting device (e.g., network entity 105-*a*, UE 115-*a*) may shape a set of information bits (e.g., including data bits and parity bits) using a set of masking bits. As described herein, the set of information bits may include data bits representative of data for transmission to a receiving device (e.g., UE 115-*a*, network entity 105-*a*, another UE 115). For example, the data bits, or the data associated therewith, may be generated by a processor of the transmitting device (e.g., may be generated by one or more layers of a protocol stack of the transmitting device) in association with performance of one or more functions of the transmitting device. In some cases, the data or data bits may be associated with the one or more functions of the transmitting device, or may be associated with wireless communications (e.g., techniques or methods for wireless communication) between the transmitting device and the receiving device). The set of information bits may also include parity bits associated with (e.g., at least partially generated from) the data bits.

Information bits, data bits, parity bits, masking bits, and other bits may be examples of bits 215 that may be transmitted between network entity 105-*a* and UE 115-*a* (e.g., or between UE 115-*a* and another UE 115). A transmitting device (e.g., network entity 105-*a*, UE 115-*a*) may encode, shape, modulate, and transmit information bits to a receiving device (e.g., UE 115-*a*, network entity 105-*a*), and the receiving device may demodulate, deshape, and decode the received information bits. Thus, shaping for parity bits may be provided, mapping may be aligned with coding systems (e.g., NR coding systems), and selective shaping for different sets of resources may be supported.

In addition to transmitting the information bits to the receiving device, the transmitting device may also transmit a set of shaping bits, which may be indicative of the set of masking bits used to shape the information bits. The receiving device may use the set of shaping bits to generate the set of masking bits, and may use the set of masking bits to deshape the received information bits. Transmission of the set of shaping bits to the receiving device may support decoupling of the channel coding scheme and the shaping of the information bits, for example, based on providing information related to the shaping of the information bits to the receiving device. Such shaping techniques may support joint shaping of data and parity bits (e.g., in the information bits) by performing shaping after generation of the parity bits (e.g., after channel coding). Because parity bits are shaped, the systematic bit mapping may align with a coding system for a RAT (e.g., an NR coding system) by supporting mapping of parity bits to amplitudes of a shaped constellation (e.g., least significant bits (LSBs)) and mapping of data bits (e.g., other information bits) to signs of the shaped constellation (e.g., most significant bits (MSBs)). Additionally or alternatively, because shaping and channel coding are decoupled, such shaping techniques may support selective shaping for different sets of resources (e.g., which may be associated with different, respective channel codings). The information bits may be encoded for transmission either before shaping or after shaping, and in either case, the information bits and the set of shaping bits may be encoded using different channel coding schemes. The shaping bits and the information bits may be separately or jointly modulated for transmission to the receiving device.

For example, a transmitting device may encode bits for transmission, shape the encoded bits, modulate the shaped bits, and transmit the modulated bits to a receiving device. The network entity 105-*a* or the UE 115-*a* may be an example of a transmitting device. The transmitting device may shape bits for transmission, for example, by generating masking bits and shaping information bits by combining the information bits and the masking bits. The transmitting device may compress the masking bits into a set of shaping bits for transmission to the receiving device. The shaping bits may also be coded to generate encoded shaping bits. The information bits may be separately encoded from the shaping bits, and both the encoded shaping bits and encoded information bits may be further modulated into one or more constellations (e.g., jointly or separately modulated). The transmitting device (e.g., network entity 105-*a* UE 115-*a*) may transmit the shaped constellation of information bits (e.g., bits 215) and the shaping bits to a receiving device (e.g., UE 115-*a*, network entity 105-*a*), such as via a downlink channel 210, an uplink channel 205, or a sidelink channel.

The receiving device may receive, demodulate, deshape, and decode the shaped constellations received from the transmitting device. The receiving device may first demodulate and decode the shaping bits from received signaling, and use the shaping bits to generate the masking bits. The receiving device may demodulate the shaped information bits and may use the masking bits to deshape, or demask, the information bits. The receiving device (e.g., UE 115-*a*, network entity 105-*a*) may decode the information bits from the deshaped information bits, for example, using a channel code (e.g., where the channel code may protect the information payload).

In some examples, the transmitting device may perform modulation of the encoded information bits and encoded shaping bits separately or jointly. For example, as described herein, a respective modulation scheme, or a demodulation scheme, may represent a modulation scheme (e.g., or demodulation scheme) configured for or determined by the transmitting device, or both, using one or more techniques or methods associated with the wireless communications system 200. For example, the modulation scheme(s) (e.g., or demodulation scheme) may be configured for a UE 115 by a network device 105 (e.g., via signaling, as indicated by one or more parameters), determined by a network device 105 for use by the network device 105, determined by a UE 115 for use by the UE 115 or by another UE 115, or jointly configured and/or determined by a UE 115 and a network device 105 (e.g., via signaling, as indicated by one or more parameters). The modulation scheme(s) (e.g., or demodulation scheme) may be based on one or more channel qualities of an uplink, sidelink, or downlink channel used for communications between the transmitting device and the receiving device, such as based on one or more measurements performed by the transmitting device, the receiving device, or both. In some cases, different techniques, methods, or parameters may be configured for determining or configuring a respective modulation scheme (e.g., or demodulation scheme) for the information bits (e.g., demodulating the information bits) and a respective modulation scheme for the set of shaping bits (e.g., demodulating the set of shaping bits).

In some examples, the receiving device may separately transmit feedback for the shaping bits and information bits. In some other examples, the shaping of the information bits may be selective shaping (e.g., different for different frequency, spatial, or time resources). In some cases, the shaping bits may be concatenated with (e.g., included in) a subsequent transmission (e.g., of information bits).

As described herein, a respective channel coding scheme (e.g., a channel coding), or a channel decoding scheme, may represent a channel coding scheme (e.g., or a channel decoding scheme) configured for or determined by the transmitting device, or both, using one or more techniques or methods associated with the wireless communications system 200. For example, the channel coding schemes (e.g., or channel decoding scheme) may be configured for a UE 115 by a network device 105 (e.g., via signaling, as indicated by one or more parameters), determined by a network device 105 for use by the network device 105, determined by a UE 115 for use by the UE 115 or by another UE 115, or jointly configured and/or determined by a UE 115 and a network device 105 (e.g., via signaling, as indicated by one or more parameters). The channel coding schemes (e.g., or channel decoding schemes) may be based on one or more channel qualities of an uplink, sidelink, or downlink channel used for communications between the transmitting device and the receiving device, such as based on one or more channel quality measurements performed by the transmitting device, the receiving device, or both. In some cases, different techniques, methods, or parameters may be configured for determining or configuring a respective channel coding scheme (e.g., or channel decoding scheme) for encoding the information bits (e.g., decoding information bits) and a respective channel coding scheme for encoding the set of shaping bits (e.g., decoding the set of shaping bits).

Figure 3:
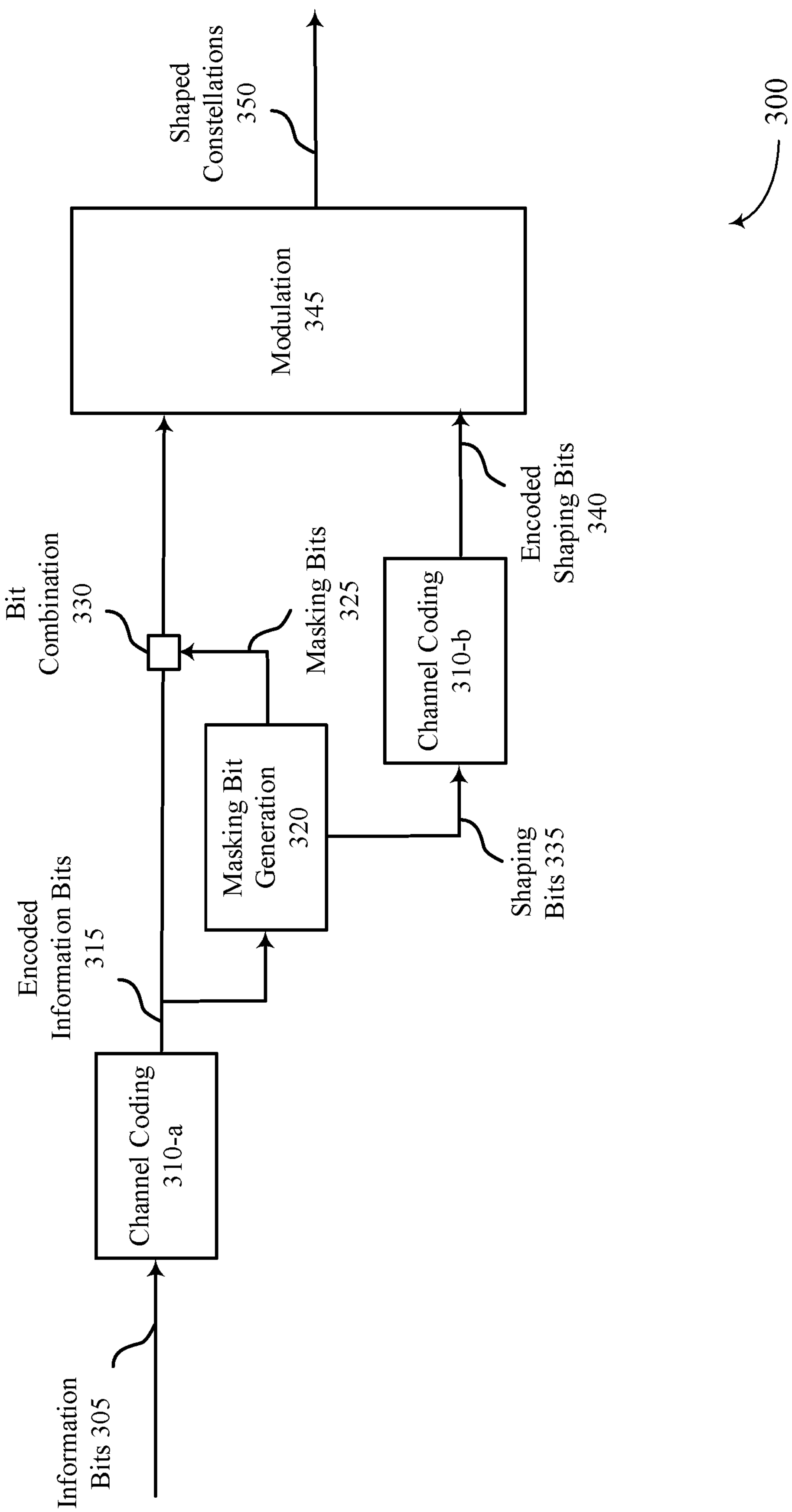
FIG. 3 illustrates an example of a transmission scheme that supports probabilistic shaping and channel coding for wireless signals in accordance with one or more aspects of the present disclosure.

FIG. 3 illustrates an example of a transmission scheme 300 that supports probabilistic shaping and channel coding for wireless signals in accordance with one or more aspects of the present disclosure. FIG. 3 may be an example of one or more features of a framework for probabilistic shaping for higher-order modulation. The framework may include one or more of the features described with reference to FIG. 2. For example, FIG. 3 illustrates one or more techniques for the processing of information bits 305 (e.g., u) for coding, shaping, and modulating information bits 305 (e.g., data and associated parity bits) for transmission (e.g., using one or more shaping techniques described with reference to FIG. 2).

For example, a transmitting device (e.g., a UE 115, a network entity 105) may directly encode the information bits 305 using a channel coding 310-*a* (e.g., a channel coding scheme). After performing the channel coding, the information bits 305 may be referred to as encoded information bits 315 (e.g., x). At 320, the transmitting device may generate a set of masking bits 325 using the encoded information bits 315. The set of masking bits 325 may have a same quantity of bits (e.g., n bits) as the encoded information bits 315. The masking bits may be used to shape the encoded information bits 315 by applying a masking, or scrambling to the encoded information bits 315. The set of masking bits 325 may be a sequence of bits (e.g., v bits) that may depend on the encoded information bits 315 (e.g., x), such that the combination (e.g., via a bit-wise XOR operation) of the set of masking bits 325 and the encoded information bits 315 (e.g., x+v, where + represents a bit-wise XOR operation) may not be uniformly distributed (e.g., may achieve the shaped distribution).

For example, after modulation, the combination of the set of masking bits 325 and the encoded information bits 315 (e.g., x+v) may result in a desired distribution (e.g., non-uniform distribution) of modulated symbols. In some examples, the masking bit generation may be applied to parity bits associated with data carried by the encoded information bits 315. For example, the encoded information bits 315 may include parity bits associated with data that is included in the encoded information bits 315.

In some examples, information about the set of masking bits 325 may not be available to a receiving device (e.g., a UE 115, a network entity 105). As such, information associated with the set of masking bits 325 may be generated and transmitted to the receiver for deshaping (e.g., de-masking or descrambling) received information bits. For example, the transmitting device may use the set of masking bits 325 to generate a set of shaping bits 335 that may be used for generating a mask (e.g., v, the set of masking bits 325) for masking the encoded information bits 315. In some cases, the transmitting device may use the set of shaping bits 335 to generate the set of masking bits 325. The set of shaping bits 335 may represent a second sequence of bits (e.g., s) that may have a smaller length than v, but may be used to generate v (e.g., the set of masking bits 325). For example, the shaping bits 335 may be generated by compressing the set of masking bits 325, such that the masking bits 325 may be equal to the shaping bits 335 multiplied by a generator matrix (e.g., G). In some examples, the masking bits 325 may be generated (e.g., re-generated by the receiving device, generated by the transmitting device) from the shaping bits 335 via a linear block code (e.g., Golay code, polar code, LDPC code, convolutional code, Turbo code, Reed Muller code) using a generator matrix (e.g., G). For example, the linear block code may be applied to the shaping bits 335 by multiplying the shaping bits 335 by a generator matrix (e.g., which generator matrix may be associated with or configured for application of the linear block code).

At 330, the transmitting device may mask, or shape, the encoded information bits 315 by combining (e.g., adding, performing a bit-wise XOR operation) the encoded information bits 315 with the set of masking bits 325. As described herein, the combination of the masking bits 325 and encoded information bits 315 may produce a desired distribution of symbols after modulation (e.g., a non-uniform distribution of symbols). At 345, the shaped, encoded information bits 315 may be modulated by the transmitting device (e.g., for transmission to the receiving device), which may generate one or more shaped constellations 350 of modulated symbols.

The shaping bits 335 may be channel coded again using a channel coding 310-*b* (e.g., a channel coding scheme), which may generate encoded shaping bits 345. The channel coding 310-*b* may represent a different or separate channel coding than channel coding 310-*a*, such that the set of shaping bits 335 may be separately encoded from the information bits 305. As such, the encoded information bits 315 and the encoded shaping bits 340 may use different coding rates, different modulation orders, different quantities of spatial layers, or the like. At 345, the encoded shaping bits 340 may be modulated by the transmitting device (e.g., for transmission to the receiving device). As further described with reference to FIGS. 5 and 6, the encoded shaping bits 340 and the encoded information bits 315 may be jointly modulated or may be separately modulated.

Figure 4:
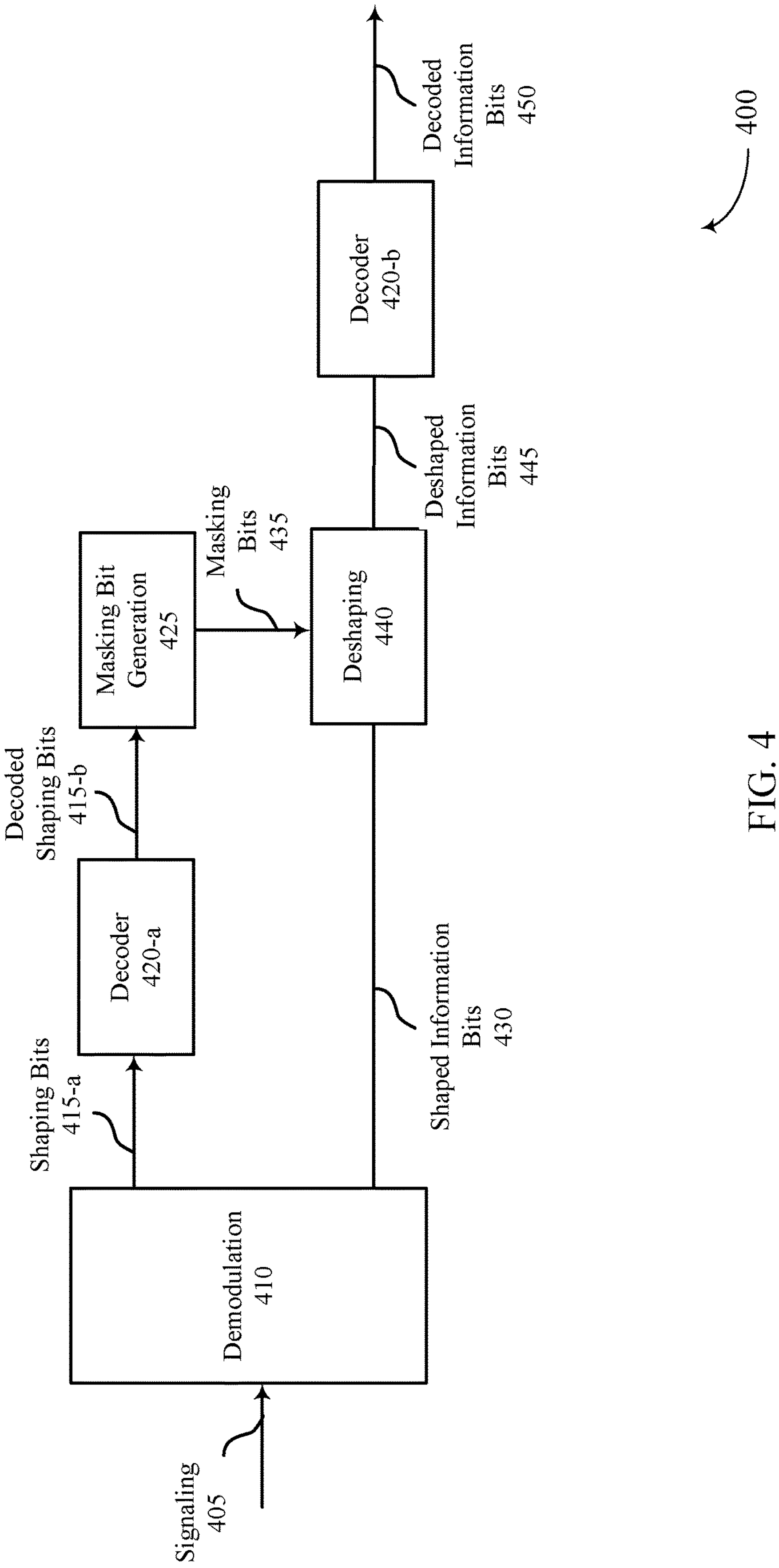
FIG. 4 illustrates an example of a reception scheme that supports probabilistic shaping and channel coding for wireless signals in accordance with one or more aspects of the present disclosure.

FIG. 4 illustrates an example of a transmission scheme 400 that supports probabilistic shaping and channel coding for wireless signals in accordance with one or more aspects of the present disclosure. The transmission scheme 400 may be used by a receiving device (e.g., a UE 115, a network entity 105), that may receive and demodulate signaling 405. For example, the receiving device may receive shaped constellations of modulated symbols from a transmitting device, such as those described with reference to FIGS. 2 and 3. The signaling 405 transmitted to the receiving device may additionally be an example of the bits 215 described with reference to FIG. 2.

The receiving device may receive the signaling 405 and demodulate the signaling 405 at 410. The signaling 405 may include payload information (e.g., u, information bits), associated shaping bits (e.g., s), or both. The demodulation may generate shaping bits 415-*a*, shaped information bits 430, or both. The shaped information bits 430 may, for example, represent log likelihood ratios (LLRs) corresponding to the shaped information bits 430, where the shaped information bits 430 may be a combination of information bits and masking bits (e.g., v+x). Similarly, the shaping bits 415-*a* may represents LLR values associated with the shaping bits 415-*a*. A decoder 420-*a* may decode (e.g., based on a second channel coding scheme) shaping bits 415-*a* received via the signaling 405, which may generate decoded shaping bits 415-*b*. At 425, the receiving device may generate a set of masking bits 435 (e.g., v) using the decoded shaping bits 415-*b* (e.g., s). For example, the receiving device may decompress the decoded shaping bits 415-*b* to generate the set of masking bits 435, such as by multiplying the shaping bits 415-*b* by a generator matrix (e.g., a generator matrix G, where v=s*G), or other matrix or code.

The shaped information bits 430 may be deshaped at 440, using the set of masking bits 435. The deshaping process may generate deshaped information bits 445, which may, for example, represent LLRs corresponding to the deshaped information bits 445. The deshaping 440 may, for example, demask the shaped information bits 430, by removing the set of masking bits 435, or effects of the set of masking bits 435 on the shaped information bits 430, from the shaped information bits 430 (e.g., remove the information associated with the set of masking bits 435 to generate the LLRs for the unmasked information bits). For example, removing the effects of the set of masking bits 435 may include removing information associated with the set of masking bits 435 from the shaped information bits 430, removing or altering one or more shaping parameters from the shaped information bits 430, or removing LLRs associated with the set of masking bits 435, among other examples.

The deshaped information bits 445 (e.g., LLRs thereof) may be decoded using a decoder 420-*b* to generate decoded information bits 450. For example, the decoded information bits 450 may represent an information payload (e.g., u) decoded from the channel code used to protect the information payload. The decoder 420-*b* may be associated with a first or different decoding scheme than that associated with decoder 420-*a*. As such, the shaping bits 415 may be separately decoded from the information bits 450, and the information bits 450 and the shaping bits 415 may be associated with different coding rates, different modulation orders, different quantities of spatial layers, or the like.

Figure 5:
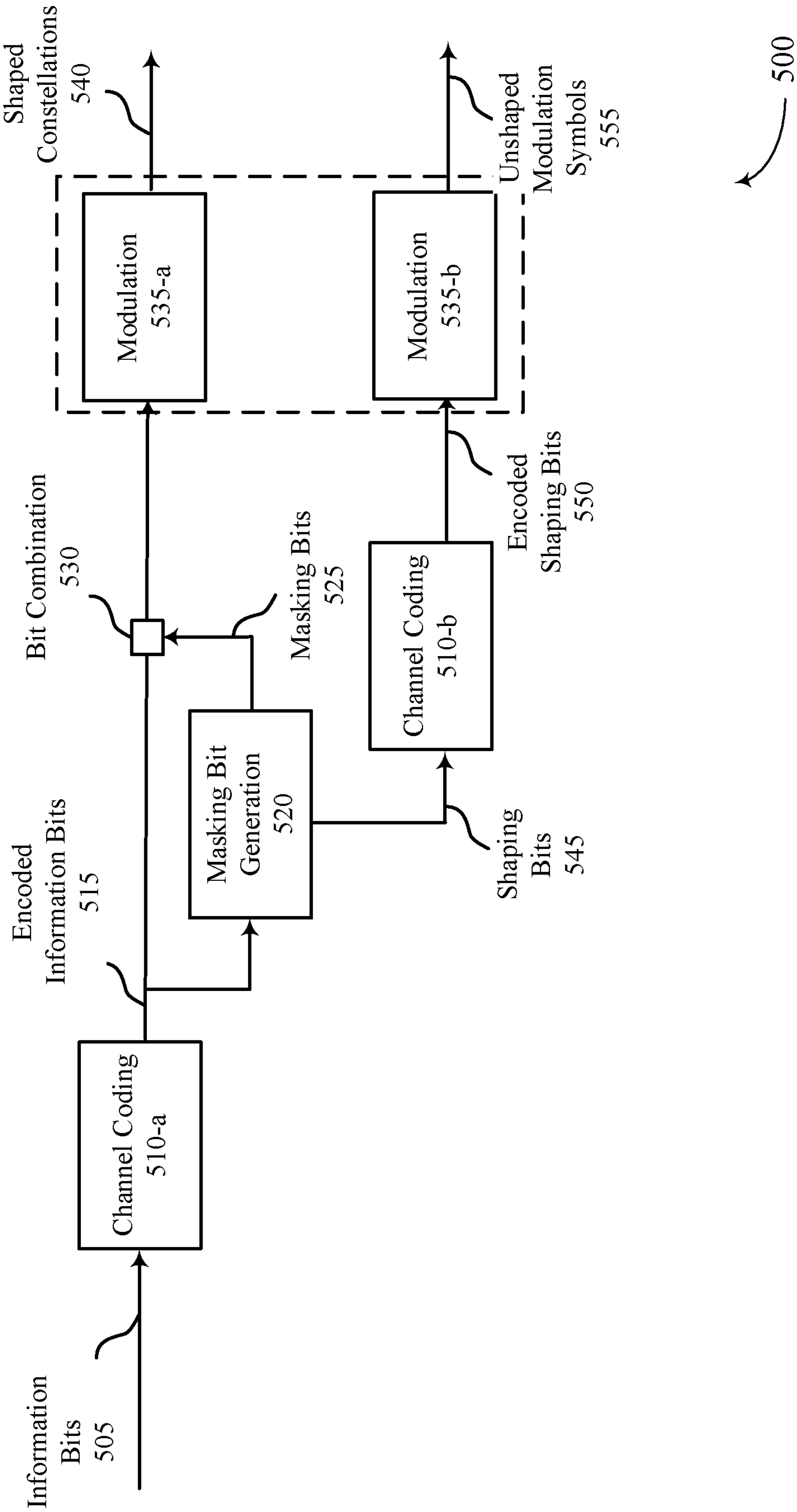
FIG. 5 illustrates an example of a transmission scheme that supports probabilistic shaping and channel coding for wireless signals in accordance with one or more aspects of the present disclosure.

FIG. 5 illustrates an example of a transmission scheme 500 that supports probabilistic shaping and channel coding for wireless signals in accordance with one or more aspects of the present disclosure. FIG. 5 may be an example of one or more features of a framework for probabilistic shaping for higher-order modulation, such as those described with reference to FIGS. 2 and 3. For example, a transmitting device may encode information bits 505 using a channel coding 510-*a*, which may generate encoded information bits 515. At 520, the information bits 505 (e.g., encoded information bits 515) may be used to generate masking bits 525, which may be combined with the encoded information bits 515 at 530 to generate shaped information bits. The transmitting device may also use the set of masking bits 525 to generate a set of shaping bits 545, or vice versa, and may encode the set of shaping bits 545 using a channel coding 510-*b*, which may generate encoded shaping bits 550.

Generally, FIG. 5 is an example of techniques for modulating the encoded information bits 515 into shaped constellations 540 and modulating the encoded shaping bits 550 into unshaped modulation symbols 555. In such examples, the modulation symbols corresponding to the information payload, or information bits 505, may be shaped, and the modulation symbols corresponding to the shaping bits 545 may be unshaped. The shaped, the encoded information bits 515 may be associated with a modulation 535-*a* and the encoded shaping bits 550 may be associated with a modulation 535-*b*, where modulation 535-*a* and modulation 535-*b* may represent different modulation schemes, or different portions or subsets of a same modulation scheme (e.g., joint modulation).

In an example of using different modulation schemes (e.g., the encoded information bits 515 and the encoded shaping bits 550 may be separately modulated), the modulation symbols corresponding to the information payload, or information bits 505, may be shaped, and the modulation symbols corresponding to the shaping bits 545 may be unshaped. In such cases, the data payload (e.g., encoded information bits 515) and encoded shaping bits 550 may be transmitted via different resources (e.g., time, frequency, spatial resources), using different coding rates, using different modulation orders, or the like.

In cases where such modulation schemes may be applicable to a cellular system, the modulated encoded information bits 515 and encoded shaping bits 550 may be included in different codeblocks of a same transport block, different transport blocks of a same data transmission (e.g., a downlink, uplink, or sidelink shared channel and/or data channel transmission), or different data transmissions (e.g., in different downlink, uplink, or sidelink shared channel and/or data channel transmissions). In some cases, the information payload (e.g., modulated encoded information bits 515) may be transmitted via a data channel, and the shaping bits may be transmitted via a different channel (e.g., via a medium access control (MAC) control element (CE), via a control channel, such as an uplink control channel, downlink control channel, sidelink control channel, or dedicated channel for shaping bit transmission.)

In some examples, the encoded information bits 515 and the encoded shaping bits 550 may be jointly modulated, which may result in shaped constellations. For example, the encoded shaping bits 550 may be mapped to a sign of a constellation (e.g., which may not be shaped), and the encoded information bits 515 may be mapped to an amplitude of the constellation (e.g., which may be shaped). For example, the encoded shaping bits 550 may be represented by a vector s1 and the encoded information bits 515 (e.g., after masking) may be represented by vectors a1, a2, and a3. As such, a transmitting device may map [s1, a1, a2, a3] to a same modulation, such as a 16 PAM modulation (e.g., a real or imaginary part of a 256 QAM modulation).

In such examples, the encoded shaping bits 550 may be encoded separately from the information bits 505 (e.g., the data payload, associated parity bits). Additionally, because bit mapping to signs may increase a reliability of the associated bits, mapping the encoded shaping bits 550 to the sign of the constellation may increase reliability and provide increased protection for the encoded shaping bits 550. The increased reliability and protection for the encoded shaping bits 550 may provide increased reliability for deshaping the encoded information bits 515, because the shaping bits 545 may be used for deshaping. In some other examples, joint modulation may include mapping the encoded shaping bits 550 to a location of a constellation where less shaping is performed (e.g., an LSB bit).

In some cases, a first subset of the encoded information bits 515 may be shaped and a second subset of the encoded information bits 515 may not be shaped (e.g., by combining with the set of masking bits at 520). For example, masking may be limited to the first subset of the encoded information bits 515 based on a respective position of a bit within an associated modulation symbol (e.g., a position in the modulation symbol to which one of the encoded information bits 515 of the first subset maps).

In a first example of 16 QAM modulation, a second bit and a fourth bit of a modulation symbol may be shaped (e.g., masked) and a first bit and a third bit (e.g., which may correspond to a sign of a real or imaginary part of a constellation) of the modulation symbol may not be shaped. In a second example of 256 QAM or 16 pulse amplitude modulation (PAM) modulation, a second bit of modulation symbol may be prioritized for shaping because the second bit may have a highest impact on a power of the constellation. For example, a second bit value of zero may represent inner constellations and a second bit value of one may represent outer constellations.

In some cases, the shaping may additionally or alternatively be limited to systematic bits. In such cases, the shaping (e.g., masking) performed at 530 on the encoded information bits 515 may be performed on the information bits 505 prior to encoding.

Figure 6:
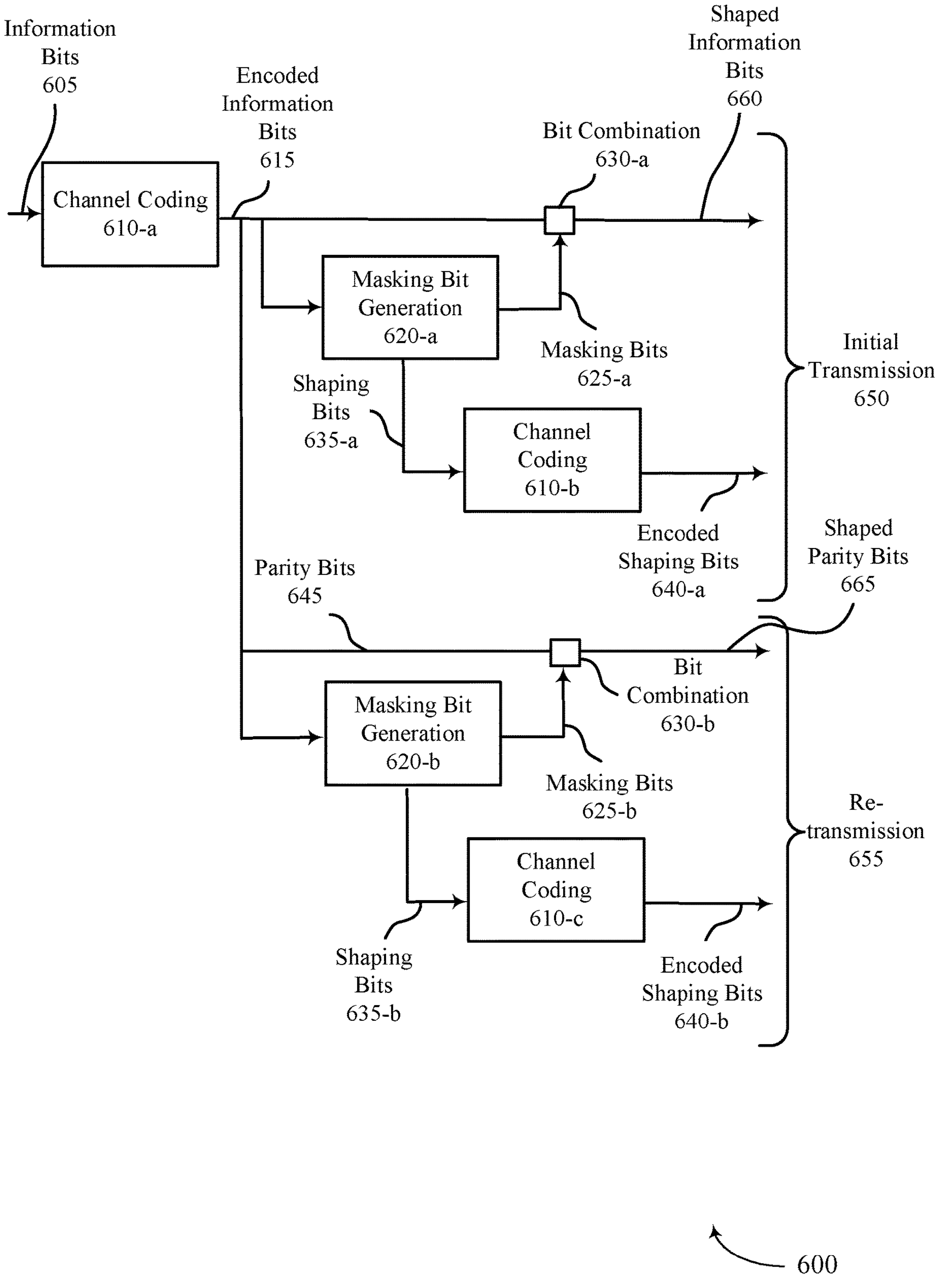
FIG. 6 illustrates an example of a transmission scheme that supports probabilistic shaping and channel coding for wireless signals in accordance with one or more aspects of the present disclosure.

FIG. 6 illustrates an example of a transmission scheme 600 that supports probabilistic shaping and channel coding for wireless signals in accordance with one or more aspects of the present disclosure. FIG. 6 may be an example of one or more features of a framework for probabilistic shaping for higher-order modulation, such as those described with reference to any one of FIGS. 2, 3, and 5. FIG. 6 illustrates a transmission scheme 600 for probabilistic shaping for higher-order modulation. For example, the transmission scheme 600 may represent a scheme for retransmissions in response to feedback from a receiving device. An initial transmission 650 may be probabilistically shaped, for example, as described with reference to FIG. 2, FIG. 3, or both.

For example, a transmitting device may encode information bits 605 using a channel coding 610-*a*, which may generate encoded information bits 615. At 620-*a*, the encoded information bits 615 may be used to generate masking bits 625-*a*, which may be combined with the encoded information bits 615 at 630-*a* to generate shaped information bits 660. The masking bits 625-*a* may be used to generate shaping bits 635-*a*, or vice versa. The transmitting device may encode the shaping bits 635-*a* using a channel coding 610-*b* (e.g., a second or different channel coding scheme), which may generate encoded shaping bits 640-*a*. The encoded shaping bits 640-*a* and the shaped information bits 660 may be modulated and transmitted to the receiving device, for example, as described with reference to FIGS. 2-5.

The receiving device may, in some examples, provide respective feedback (e.g., ACK/NACK feedback) to the transmitting device for the shaping bits 635-*a* and the information bits 605. The feedback may indicate, for example, whether the initial transmission 650 was correctly received (e.g., fully or partially received) by the receiving device. Based on the feedback from the receiving device, the transmitting device may determine whether to retransmit one or more portions of the initial transmission 650. For example, if the receiving device indicates that the initial transmission 650 is correctly or fully received, the transmitting device may refrain from retransmitting. In some cases, the receiving device may indicate that the initial transmission was not correctly received (e.g., or was correctly received in part), and the transmitting device may determine to retransmit one or more portions of the initial transmission 650 based on the feedback.

In a first example, the receiving device may indicate that the shaping bits 635-*a* were correctly decoded by the receiving device (e.g., which may have a larger probability of correct decoding), but may indicate that the information bits 605 (e.g., a data payload) were not correctly decoded. In such cases, the transmitting device may prepare and retransmit new parity bits 645 (e.g., associated with the information bits 605) to the receiving device (e.g., according to incremental redundancy HARQ (IR-HARQ)). For example, the parity bits 645 may represent coded information bits taken from a circular buffer of a channel coder (e.g., associated with channel coding 610-*a*). The parity bits 645 may represent a different redundancy version (RV) from the encoded information bits 615 (e.g., from the initial transmission). For example, the initial transmission may be a first RV (e.g., RV0) associated with the channel coding 610-*a* and the retransmission may be associated with a different RV (e.g., RV1, RV2, RV3) associated with the channel coding 610-*a*.

The parity bits 645 (e.g., new information bits) may be masked using new masking bits, such as masking bits 625-*b*, which may shape the parity bits for retransmission via a corresponding channel (e.g., which may tailor or optimize the parity bits 645 for channel conditions for a retransmission 655). For example, at 620-*b*, the transmitting device may generate the masking bits 625-*b* using the parity bits 645, and may also generate shaping bits 635-*b* associated with the masking bits 625-*b* (e.g., using one or more techniques described herein). At 630-*b*, the transmitting device may combine the masking bits 625-*b* with the parity bits 645 to shape or mask the parity bits. The combination of the masking bits 625-*b* and the parity bits 645 may generate shaped parity bits 665, which may be modulated and transmitted to the receiving device.

The shaping bits 635-*b* may be encoded using a channel coding 610-*c* (e.g., a third or different channel coding), which may generate encoded shaping bits 640-*b*. The encoded shaping bits 640-*b* may be modulated and transmitted to the receiving device as described herein. By shaping the parity bits 645, shaping gains may be applied to the retransmission 655, which may increase a communication quality and a likelihood of successful reception of the retransmission 655. In some cases, the retransmission 655 may be transmitted without shaping the parity bits 645.

In a second example, in addition or as an alternative to indicating that the information bits 605 (e.g., a data payload) were not correctly decoded, the receiving device may indicate that the shaping bits 635-*a* were not correctly decoded. In such cases, in addition or as an alternative to preparing and transmitting the shaped parity bits 665 and the encoded shaping bits 640-*b*, the transmitting device may retransmit the encoded shaping bits 640-*a* (e.g., as part of the retransmission 655, using IR-HARQ).

Figure 7:
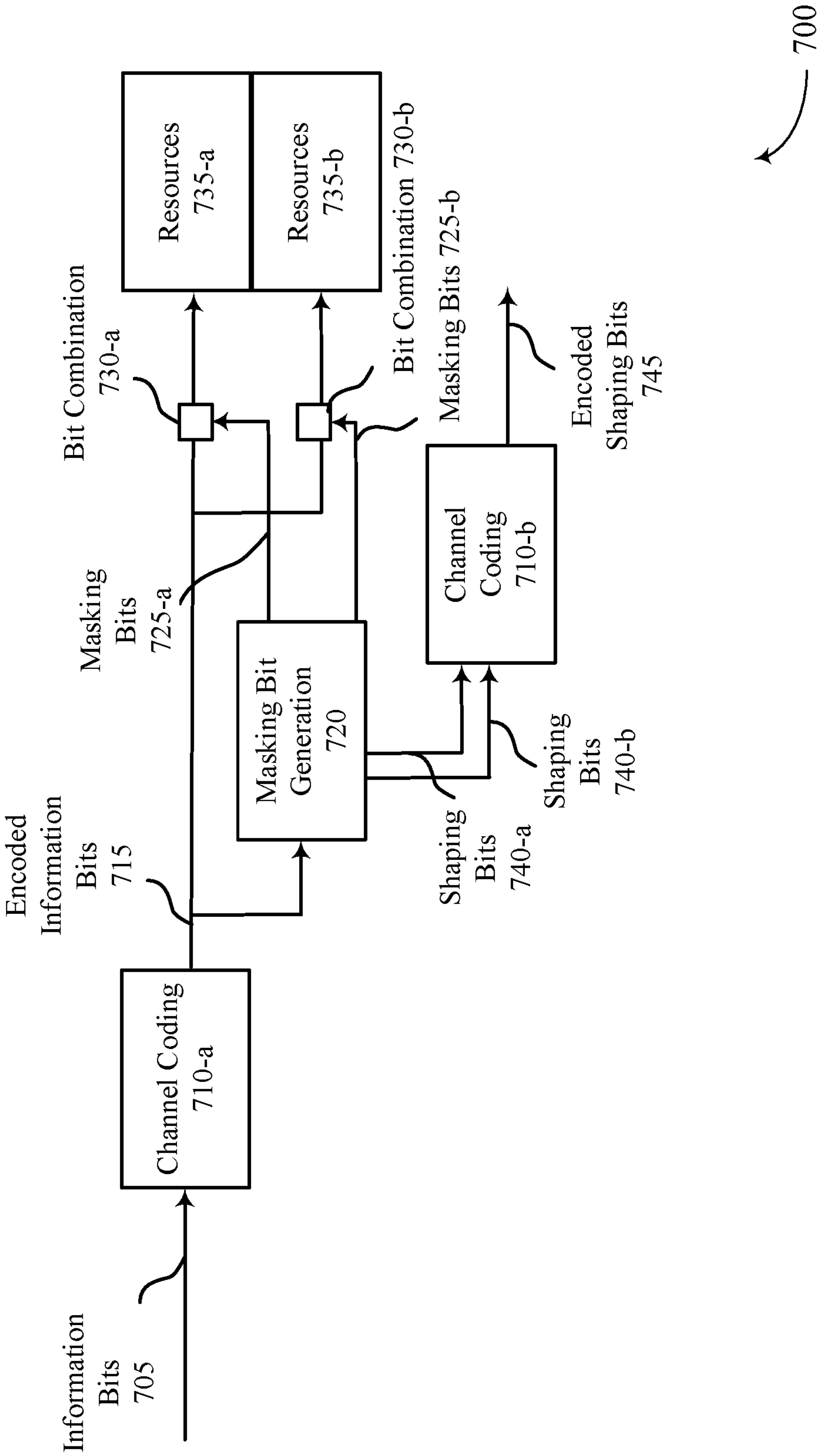
FIG. 7 illustrates an example of a transmission scheme that supports probabilistic shaping and channel coding for wireless signals in accordance with one or more aspects of the present disclosure.

FIG. 7 illustrates an example of a transmission scheme 700 that supports probabilistic shaping and channel coding for wireless signals in accordance with one or more aspects of the present disclosure. FIG. 7 may be an example of one or more features of a framework for probabilistic shaping for higher-order modulation, such as those described with reference to any one of FIGS. 2, 3, 5, and 6. For example, a transmitting device may encode information bits 705 using a channel coding 710-*a*, which may generate encoded information bits 715 (e.g., data and associated parity bits).

Generally, FIG. 7 is an example of frequency, spatial, and/or time selective shaping of the encoded information bits 715. After channel coding 710-*a*, masking bit generation 720 may shape the encoded information bits 715, by applying a masking, or shaping. At 720, the transmitting device may generate one or more sets of masking bits 725 using the encoded information bits 715. For example, the transmitting device may split the encoded information bits 715 into two sequences of bits (e.g., x1 and x2), and may generate respective masking bits 725-*a* and 725-*b* (e.g., v1 and v2) based on the two sequences of bits. The transmitting device may respectively generate shaping bits 740-*a* and shaping bits 740-*b* (e.g., s1 and s2) based on (e.g., to be indicative of), respectively, masking bits 725-*a* or masking bits 725-*b* (e.g., v1 and v2).

The masking bits 725-*a* or the masking bits 725-*b* may depend on the respective sequence of the two sequences of encoded information bits 715 (e.g., x1 or x2), such that the combination of the sequence of the masking bits 725-*a* or the masking bits 725-*b* and the respective sequence of encoded information bits 715 (e.g., x1+v1, or x2+v2) are non-uniformly distributed (e.g., are shaped). The masking bits 725-*a* may be equal to the shaping bits 740-*a* multiplied by a first generator matrix (e.g., G1), and the masking bits 725-*b* may be equal to the shaping bits 740-*b* multiplied by a second generator matrix (e.g., G2). In some examples, the masking bits 725-*a* or the masking bits 725-*b* may be generated from the shaping bits 740-*a* or the shaping bits 740-*b*, respectively, via a respective linear block code (e.g., polar code, other code) with either the first or second generator matrix. The shaping bits 740-*a* and the shaping bits 740-*b* may be encoded (e.g., jointly encoded or separately encoded) using a channel coding 710-*b*, which may generate encoded shaping bits 745.

The shaping of the respective sequences of the encoded information bits 715 using the masking bits 725-*a* and the masking bits 725-*b* may support frequency, spatial, and/or time selective shaping for the different sequences of the encoded information bits 715. For example, different shaping parameters may be applied (e.g., using the respective masking bits 725-*a* and 725-*b*) to sequences of the encoded information bits 715 transmitted on different resources 735-*a* and 735-*b*, such as different frequency resources (e.g., resource block (RB)), time resources (e.g., OFDM symbols), and/or spatial resources (e.g., spatial layers). The transmitting device may thus generate separate shaping bits (e.g., shaping bits 740-*a* and shaping bits 740-*b*) and separate masking bits (e.g., masking bits 725-*a* and masking bits 725-*b*), and apply the different masking bits 725 to different parts of the data transmission (e.g., different sequences of the encoded information bits 715, each corresponding to different resources). For example, at 730-*a*, the transmitting device may combine a first sequence of the encoded information bits 715 with the masking bits 725-*a*, and at 730-*b*, the transmitting device may combine a second sequence of the encoded information bits 715 with the masking bits 725-*b*.

As described herein, shaping parameters, or associated deshaping parameters, may be configured for or determined by the transmitting device, or both, using one or more techniques or methods. For example, the shaping parameters (e.g., or deshaping parameters) may be configured for a UE 115 by a network device 105 (e.g., via signaling, as indicated by one or more parameters), determined by a network device 105 for use by the network device 105, determined by a UE 115 for use by the UE 115 or by another UE 115, or jointly configured and/or determined by a UE 115 and a network device 105 (e.g., via signaling, as indicated by one or more parameters). The shaping parameters (e.g., or deshaping parameters) may be based on one or more channel qualities of an uplink, sidelink, or downlink channel used for communications between the transmitting device and the receiving device, such as based on one or more measurements performed by the transmitting device, the receiving device, or both.

The different sequences of encoded information bits 715 may each correspond to respective data that is associated with transmission via different time, frequency, and/or spatial resources. The sequences of information bits may be jointly encoded (e.g., using channel coding 710-*a*, resulting in one codeblock for data encoding), and similarly, the different sets of shaping bits 740-*a* and 740-*b* may be jointly encoded (e.g., using channel coding 710-*b*).

In some cases, a transmitting device may send control information or configuration information indicative of one or more shaping schemes used for shaping bits 740-*a*, shaping bits 740-*b*, or both, to a receiving device. The control information or configuration information associated with the shaping scheme(s) may include a shaping rate associated with shaping bits 740-*a*, shaping bits 740-*b*, or both. The shaping rate may represent a ratio of a quantity of shaping bits 740 to a quantity of masking bits 725, or may represent a ratio of quantity of masking bits 725 to a difference between a quantity of shaping bits 740 and the quantity of masking bits 725. Additionally or alternatively, the control information or configuration information may include one or more of an indication of one or more generator matrices (e.g., G1 and/or G2) used to generate the masking bits 725, a respective quantity of bits (e.g., length) of shaping bits 740-*a* and 740-*b*, or one or more resources (e.g., time, frequency, and/or spatial resources) associated with the combining the respective encoded information bits 715 and masking bits 725 at 730-*a* and/or 730-*b*.

Similarly, the receiving device may receive signaling from the transmitting device over the different resources 735, or one of the resources 735, and may demodulate the signaling to generate respective shaping bits 740-*a* and 740-*b*, respective shaped information bits, or both. As described with reference to FIG. 4, the receiving device may generate a respective set of masking bits 725-*a* or 725-*b* (e.g., or both) based on decoding the respective shaping bits 740-*a* or 740-*b*. The receiving device may deshape the shaped information bits, using the set of masking bits 725-*a*, 725-*b*, or both (e.g., using respective deshaping parameters associated with or indicated by the set of masking bits 725-*a*, 725-*b*, or both). For example, based on whether the receiving device receives one or both sequences of information bits, the receiving device may use the set of masking bits 725-*a*, 725-*b*, or both.

Figure 8:
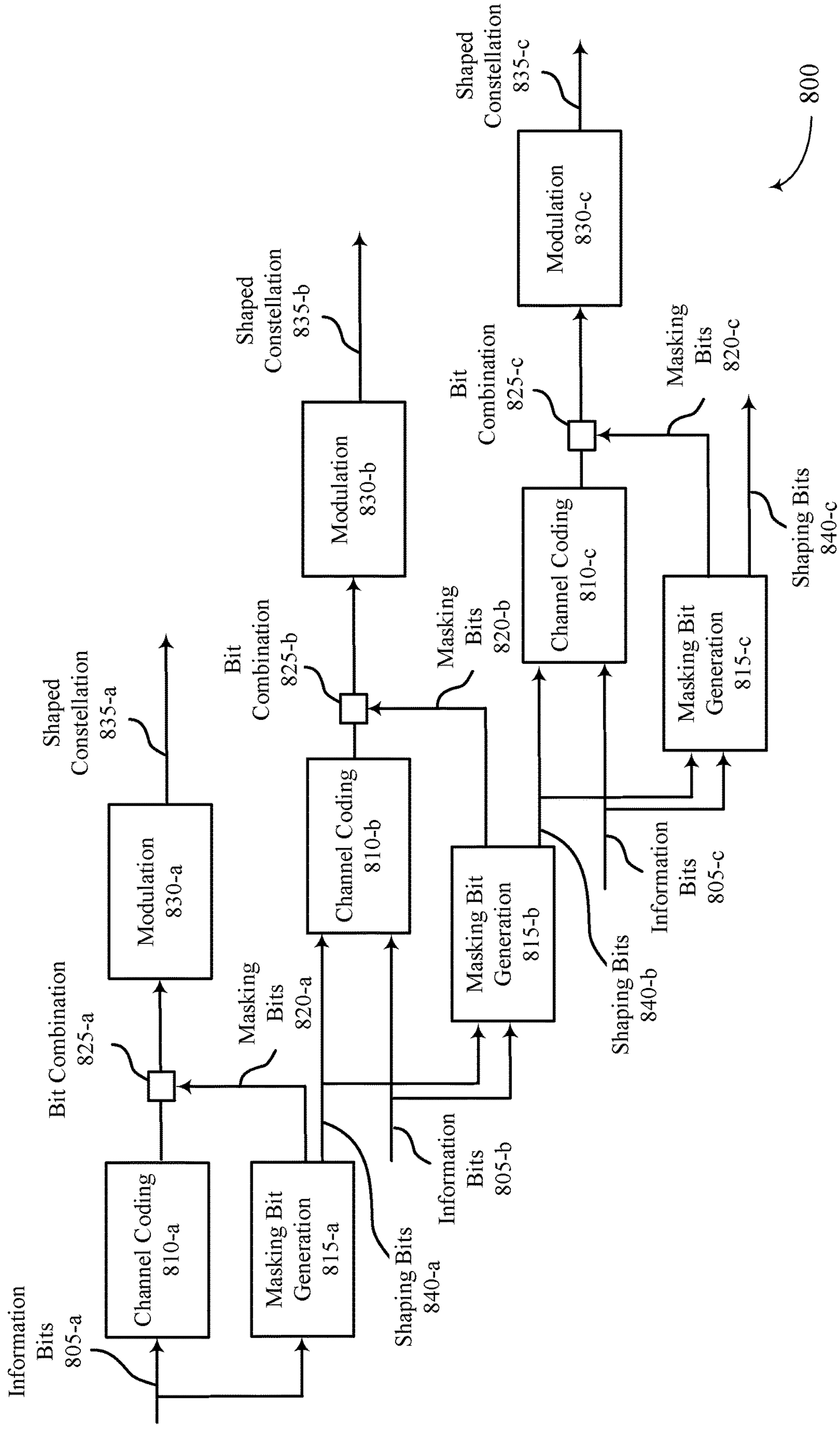
FIG. 8 illustrates an example of a transmission scheme that supports probabilistic shaping and channel coding for wireless signals in accordance with one or more aspects of the present disclosure.

FIG. 8 illustrates an example of a transmission scheme 800 that supports probabilistic shaping and channel coding for wireless signals in accordance with one or more aspects of the present disclosure. FIG. 8 may be an example of one or more features of a framework for probabilistic shaping for higher-order modulation, such as those described with reference to any one of FIGS. 2, 3, and 5-7. FIG. 8 illustrates a transmission scheme 800 for probabilistic shaping for higher-order modulation. For example, the transmission scheme 800 may represent a scheme for transmitting shaping bits to a receiving device. A transmission may be probabilistically shaped, for example, as described with reference to FIG. 2, FIG. 3, or both. For example, the transmitting device may encode information bits 805-*a* using a channel coding 810-*a*, which may generate encoded information bits. At 815-*a*, the information bits 805-*a* (e.g., unencoded information bits 805-*a*) may be used to generate masking bits 820-*a*, which may be combined with the encoded information bits at 825-*a* to generate shaped information bits. As described herein, at 830-*a*, the shaped information bits may be modulated for transmission, which may generate a shaped constellation 835-*a* of modulated symbols for transmission to the receiving device.

The masking bits 820-*a* may be used to generate shaping bits 840-*a*, or vice versa. In some cases, the shaping bits 840-*a* may be concatenated with (e.g., included in) a subsequent transmission of information bits 805-*b* (e.g., a subsequent data transmission). For example, the shaping bits 840-*a* may be concatenated with information bits 805-*b* and may be jointly encoded using a channel coding 810-*b* (e.g., a second or different channel coding). At 815-*b*, the shaping bits 840-*a* and information bits 805-*b* (e.g., unencoded bits) may also be used (e.g., together, jointly) to generate masking bits 820-*b* for shaping the shaping bits 840-*a* and information bits 805-*b*. At 825-*b*, the masking bits 820-*b* may be combined with the encoded shaping bits and information bits to mask or shape the encoded shaping bits and information bits. As described herein, at 830-*b*, the shaped bits may be modulated for transmission, which may generate a shaped constellation 835-*b* of modulated symbols for transmission to the receiving device.

Because the shaping bits 840-*a* may be jointly encoded with the information bits 805-*b* for transmission, a quantity of transmissions to the receiving device may be reduced, which may reduce overhead for the wireless system. Additionally, because the shaping bits 840-*a* may be shaped with the information bits 805-*b*, the shaping bits 840-*a* may be transmitted using shaping gains, which may improve a communication quality and performance for transmission of the shaping bits 840-*a*. Additionally, the shaping bits 840-*a* may be encoded using a different encoding scheme from the associated information bits 805-*a* (e.g., using channel coding 810-*b*), which may support different coding rates for the shaping bits 840-*a* and information bits 805-*a* (e.g., among other benefits).

The masking bits 820-*b* may also be used to generate shaping bits 840-*b*, or vice versa. In some cases, the shaping bits 840-*b* may be concatenated with (e.g., included in) a subsequent transmission of information bits 805-*c* (e.g., a subsequent data transmission). For example, the shaping bits 840-*b* may be concatenated with information bits 805-*c* and may be jointly encoded using a channel coding 810-*c* (e.g., a third or different channel coding). At 815-*c*, the shaping bits 840-*b* and information bits 805-*c* (e.g., unencoded bits) may also be used (e.g., together, jointly) to generate masking bits 820-*c* for shaping the shaping bits 840-*b* and information bits 805-*c*. At 825-*c*, the masking bits 820-*c* may be combined with the encoded shaping bits and information bits to mask or shape the encoded shaping bits and information bits. As described herein, at 830-*c*, the shaped bits may be modulated for transmission, which may generate a shaped constellation 835-*c* of modulated symbols for transmission to the receiving device.

The process of generating shaping bits 840 and concatenating the shaping bits 840 with a subsequent transmission may continue for any quantity of transmissions or shaping bits. For example, the masking bits 820-*c* may also be used to generate shaping bits 840-*c*, or vice versa, which may be concatenated with information bits 805 for joint encoding, shaping, and transmission.

Figure 9:
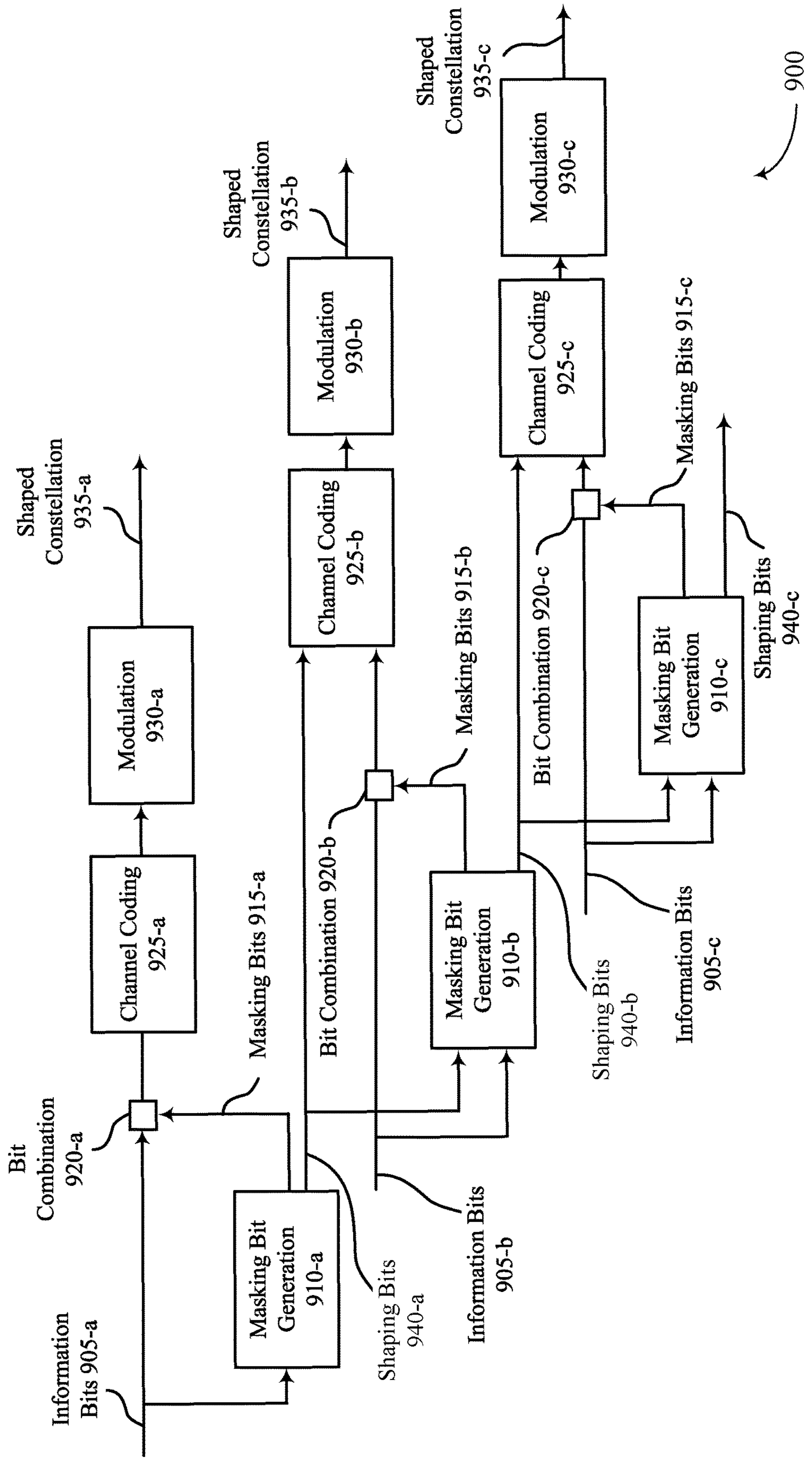
FIG. 9 illustrates an example of a transmission scheme that supports probabilistic shaping and channel coding for wireless signals in accordance with one or more aspects of the present disclosure.

FIG. 9 illustrates an example of a transmission scheme 900 that supports probabilistic shaping and channel coding for wireless signals in accordance with one or more aspects of the present disclosure. FIG. 9 illustrates a transmission scheme 900 for probabilistic shaping for higher-order modulation. For example, the transmission scheme 900 may represent a scheme for transmitting shaping bits to a receiving device. A transmission may be probabilistically shaped, for example, as described with reference to any one of FIGS. 2, 3, and 5-8. For example, at 910-*a*, the information bits 905-*a* (e.g., unencoded information bits 905-*a*) may be used to generate masking bits 915-*a*, which may be combined with the information bits 905-*a* at 920-*a* to generate shaped information bits (e.g., unencoded bits). The transmitting device may encode the shaped information bits 905-*a* using a channel coding 925-*a*, which may generate encoded information bits. As described herein, at 930-*a*, the shaped, encoded information bits may be modulated for transmission, which may generate a shaped constellation 935-*a* of modulated symbols for transmission to the receiving device.

The masking bits 915-*a* may be used to generate shaping bits 940-*a*, or vice versa. In some cases, the shaping bits 940-*a* may be concatenated with (e.g., included in) a subsequent transmission of information bits 905-*b* (e.g., a subsequent data transmission). For example, at 910-*b*, the shaping bits 940-*a* may be concatenated with information bits 905-*b* (e.g., unencoded bits) and may be used (e.g., together, jointly) to generate masking bits 915-*b* for shaping the information bits 905-*b*. At 920-*b*, the masking bits 915-*b* may be combined with the information bits 905-*b* to mask or shape the information bits 905-*b*. The transmitting device may encode the shaping bits 940-*a* and information bits 905-*b*, for example, using a channel coding 925-*b*. As described herein, at 930-*b*, the shaped, encoded bits may be modulated for transmission, which may generate a shaped constellation 935-*b* of modulated symbols for transmission to the receiving device.

Because the shaping bits 940-*a* may be jointly encoded with the information bits 905-*b* for transmission, a quantity of transmissions to the receiving device may be reduced, which may reduce overhead for the wireless system. In the examples illustrated by FIG. 9, the shaping bits 940-*a* may not be shaped with the information bits 905-*b*, which may reduce a complexity of the shaping scheme. In such cases, the transmitting device may use systematic codes to separate the shaping bits 940-*a* from the information bits 905-*b*. Additionally, the shaping bits 940-*a* may be encoded using a different encoding scheme than the associated information bits 905-*a* (e.g., using channel coding 925-*b*), which may support different coding rates for the shaping bits 940-*a* and information bits 905-*a* (e.g., among other benefits).

The masking bits 915-*b* may be used to generate shaping bits 940-*b*, or vice versa. In some cases, the shaping bits 940-*b* may be concatenated with a subsequent transmission of information bits 905-*c* (e.g., a subsequent data transmission). For example, at 910-*c*, the shaping bits 940-*b* may be concatenated with information bits 905-*c* (e.g., unencoded bits) and may be used (e.g., together, jointly) to generate masking bits 915-*c* for shaping the information bits 905-*c*. At 920-*c*, the masking bits 915-*c* may be combined with the information bits 905-*c* to mask or shape the information bits 905-*c*. The transmitting device may encode the shaping bits 940-*b* and information bits 905-*c*, for example, using a channel coding 925-*c*. As described herein, at 930-*c*, the shaped, encoded bits may be modulated for transmission, which may generate a shaped constellation 935-*c* of modulated symbols for transmission to the receiving device.

The process of generating shaping bits 940 and concatenating the shaping bits 940 with a subsequent transmission may continue for any quantity of transmissions or shaping bits. For example, the masking bits 915-*c* may also be used to generate shaping bits 940-*c*, or vice versa, which may be concatenated with information bits 905 for joint encoding, shaping, and transmission.

Figure 10:
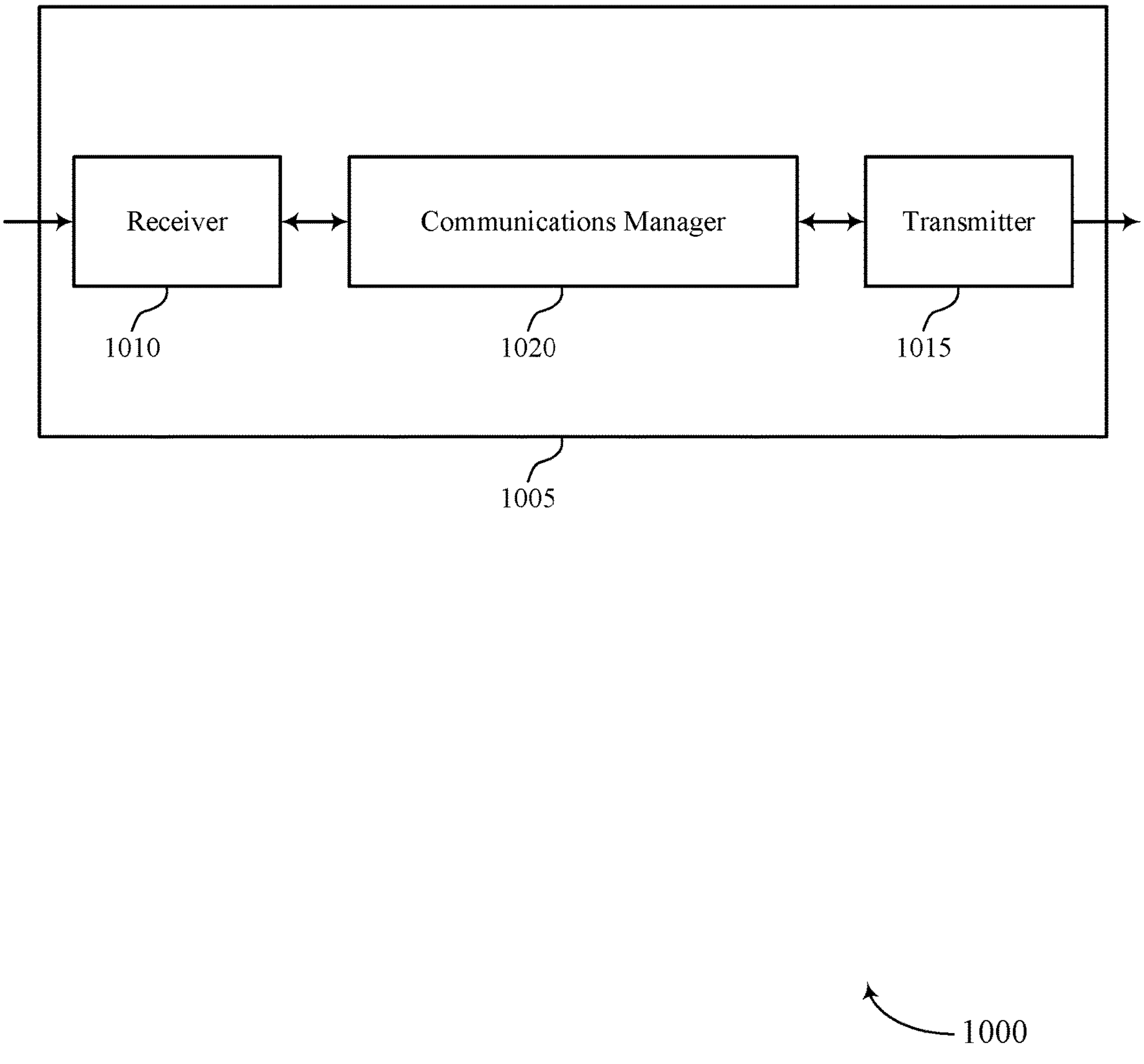
FIGS. 10 and 11 show block diagrams of devices that support probabilistic shaping and channel coding for wireless signals in accordance with one or more aspects of the present disclosure.

FIG. 10 shows a block diagram 1000 of a device 1005 that supports probabilistic shaping and channel coding for wireless signals in accordance with one or more aspects of the present disclosure. The device 1005 may be an example of aspects of a UE 115 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to probabilistic shaping and channel coding for wireless signals). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to probabilistic shaping and channel coding for wireless signals). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of probabilistic shaping and channel coding for wireless signals as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a first device in accordance with examples as disclosed herein. For example, the communications manager 1020 may be configured as or otherwise support a means for generating, using information bits, a set of shaping bits associated with shaping the information bits into a probability distribution of modulated symbols for a transmission. The communications manager 1020 may be configured as or otherwise support a means for encoding the information bits using a first channel coding scheme. The communications manager 1020 may be configured as or otherwise support a means for encoding the set of shaping bits using a second channel coding scheme based on generating the set of shaping bits. The communications manager 1020 may be configured as or otherwise support a means for modulating the encoded information bits and the encoded set of shaping bits for the transmission to a second device, the modulated encoded information bits associated with modulated symbols that are probabilistically shaped corresponding to the probability distribution.

Additionally, or alternatively, the communications manager 1020 may support wireless communication at a second device in accordance with examples as disclosed herein. For example, the communications manager 1020 may be configured as or otherwise support a means for demodulating information bits and a set of shaping bits from signaling received from a first device, the set of shaping bits associated with shaping the information bits into a probability distribution of modulated symbols for wireless communication. The communications manager 1020 may be configured as or otherwise support a means for decoding the set of shaping bits using a second channel decoding scheme based on demodulating the set of shaping bits. The communications manager 1020 may be configured as or otherwise support a means for deshaping the information bits using a set of masking bits, the set of masking bits generated based on the decoded set of shaping bits. The communications manager 1020 may be configured as or otherwise support a means for decoding the information bits using a first channel decoding scheme based on deshaping the information bits.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing, reduced power consumption, more efficient utilization of communication resources.

Figure 11:
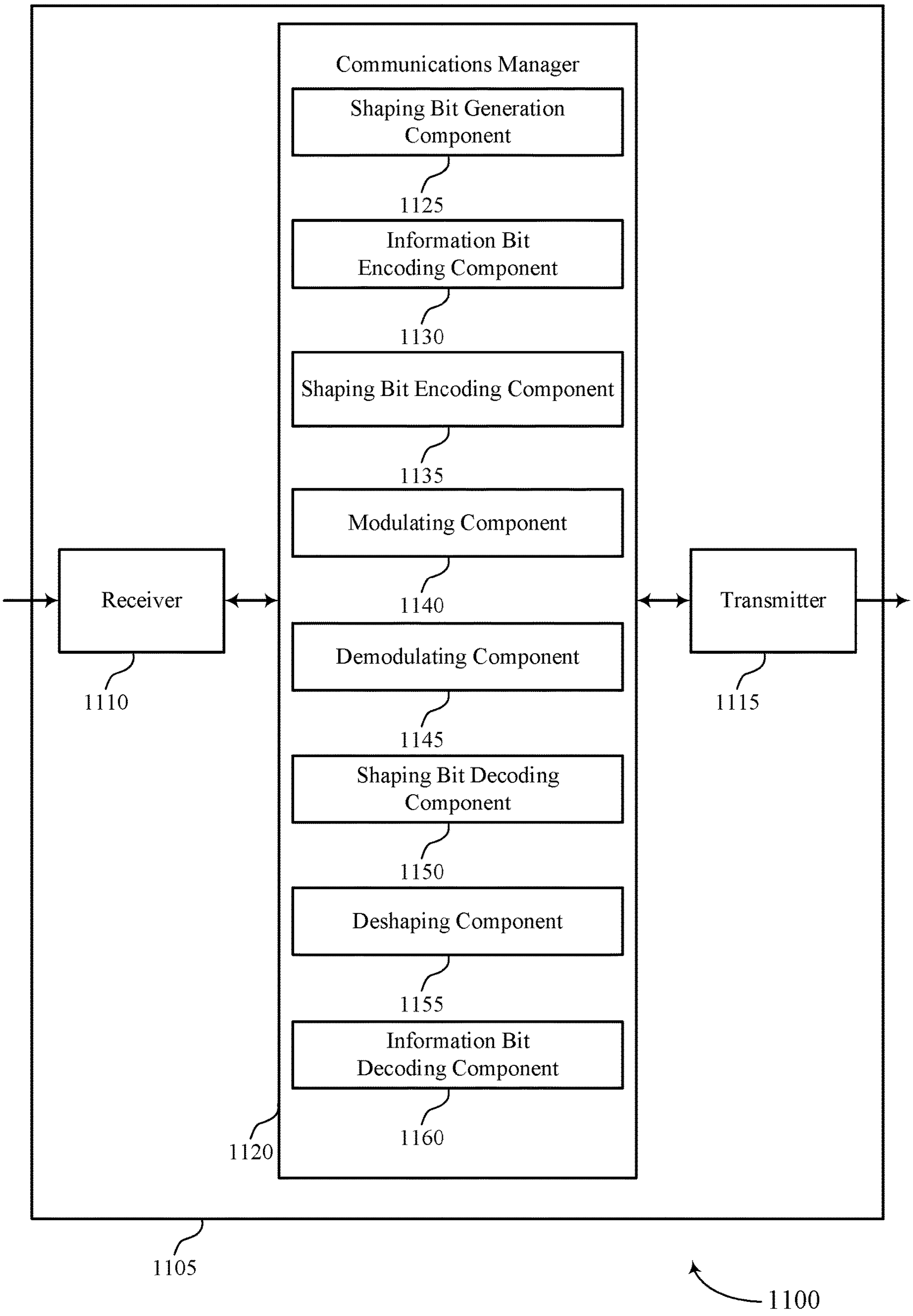

FIG. 11 shows a block diagram 1100 of a device 1105 that supports probabilistic shaping and channel coding for wireless signals in accordance with one or more aspects of the present disclosure. The device 1105 may be an example of aspects of a device 1005, a UE 115, or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to probabilistic shaping and channel coding for wireless signals). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to probabilistic shaping and channel coding for wireless signals). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of probabilistic shaping and channel coding for wireless signals as described herein. For example, the communications manager 1120 may include a shaping bit generation component 1125, an information bit encoding component 1130, a shaping bit encoding component 1135, a modulating component 1140, a demodulating component 1145, a shaping bit decoding component 1150, a deshaping component 1155, an information bit decoding component 1160, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a first device in accordance with examples as disclosed herein. The shaping bit generation component 1125 may be configured as or otherwise support a means for generating, using information bits, a set of shaping bits associated with shaping the information bits into a probability distribution of modulated symbols for a transmission. The information bit encoding component 1130 may be configured as or otherwise support a means for encoding the information bits using a first channel coding scheme. The shaping bit encoding component 1135 may be configured as or otherwise support a means for encoding the set of shaping bits using a second channel coding scheme based on generating the set of shaping bits. The modulating component 1140 may be configured as or otherwise support a means for modulating the encoded information bits and the encoded set of shaping bits for the transmission to a second device, the modulated encoded information bits associated with modulated symbols that are probabilistically shaped corresponding to the probability distribution.

Additionally, or alternatively, the communications manager 1120 may support wireless communication at a second device in accordance with examples as disclosed herein. The demodulating component 1145 may be configured as or otherwise support a means for demodulating information bits and a set of shaping bits from signaling received from a first device, the set of shaping bits associated with shaping the information bits into a probability distribution of modulated symbols for wireless communication. The shaping bit decoding component 1150 may be configured as or otherwise support a means for decoding the set of shaping bits using a second channel decoding scheme based on demodulating the set of shaping bits. The deshaping component 1155 may be configured as or otherwise support a means for deshaping the information bits using a set of masking bits, the set of masking bits generated based on the decoded set of shaping bits. The information bit decoding component 1160 may be configured as or otherwise support a means for decoding the information bits using a first channel decoding scheme based on deshaping the information bits.

Figure 12:
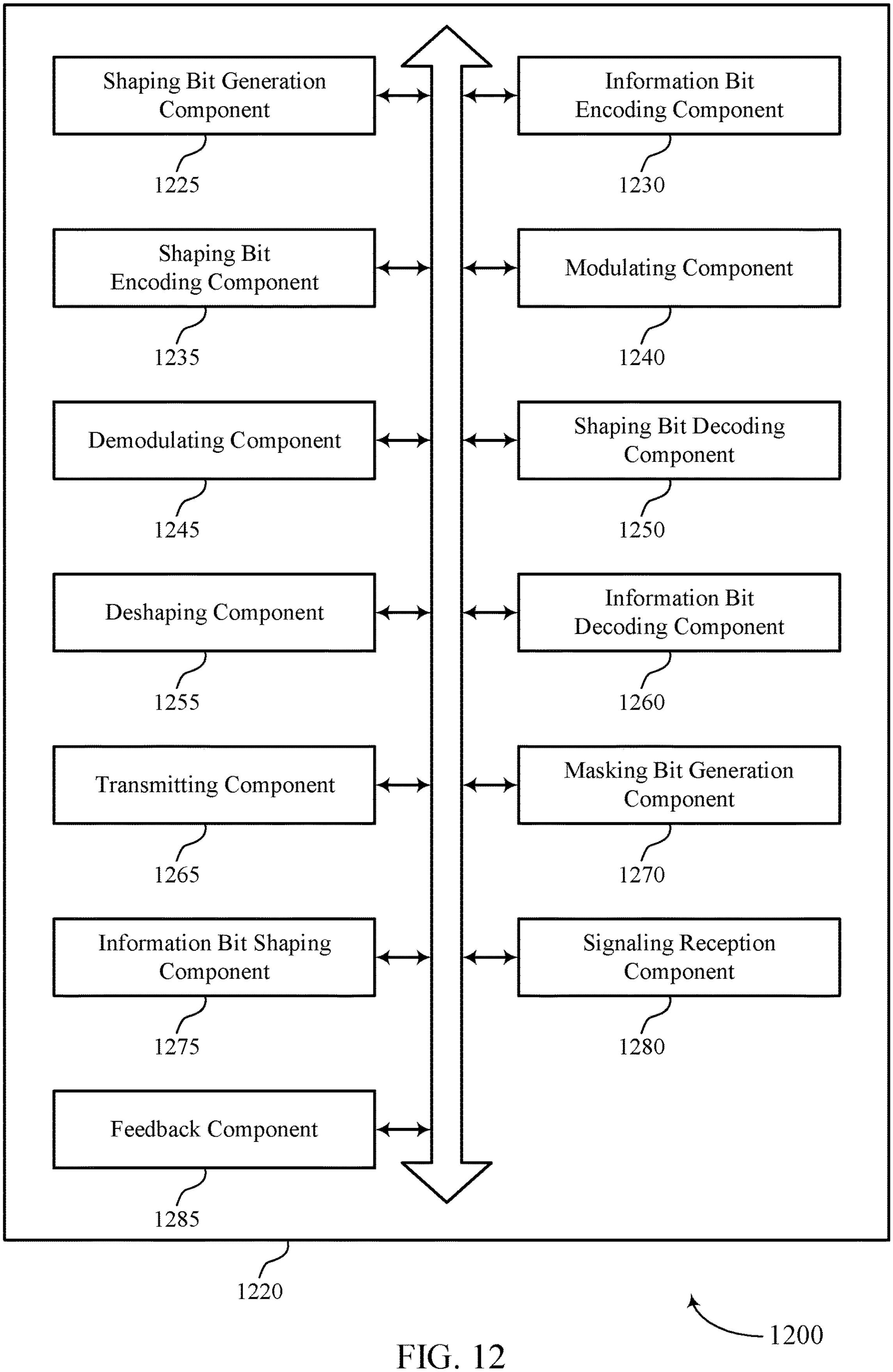
FIG. 12 shows a block diagram of a communications manager that supports probabilistic shaping and channel coding for wireless signals in accordance with one or more aspects of the present disclosure.

FIG. 12 shows a block diagram 1200 of a communications manager 1220 that supports probabilistic shaping and channel coding for wireless signals in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of probabilistic shaping and channel coding for wireless signals as described herein. For example, the communications manager 1220 may include a shaping bit generation component 1225, an information bit encoding component 1230, a shaping bit encoding component 1235, a modulating component 1240, a demodulating component 1245, a shaping bit decoding component 1250, a deshaping component 1255, an information bit decoding component 1260, a transmitting component 1265, a masking bit generation component 1270, an information bit shaping component 1275, a signaling reception component 1280, a feedback component 1285, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a first device in accordance with examples as disclosed herein. The shaping bit generation component 1225 may be configured as or otherwise support a means for generating, using information bits, a set of shaping bits associated with shaping the information bits into a probability distribution of modulated symbols for a transmission. The information bit encoding component 1230 may be configured as or otherwise support a means for encoding the information bits using a first channel coding scheme. The shaping bit encoding component 1235 may be configured as or otherwise support a means for encoding the set of shaping bits using a second channel coding scheme based on generating the set of shaping bits. The modulating component 1240 may be configured as or otherwise support a means for modulating the encoded information bits and the encoded set of shaping bits for the transmission to a second device, the modulated encoded information bits associated with modulated symbols that are probabilistically shaped corresponding to the probability distribution.

In some examples, the transmitting component 1265 may be configured as or otherwise support a means for transmitting the modulated encoded information bits and the modulated encoded set of shaping bits to the second device.

In some examples, the feedback component 1285 may be configured as or otherwise support a means for receiving first feedback from the second device based on transmitting the modulated encoded information bits, the first feedback associated with the information bits. In some examples, the feedback component 1285 may be configured as or otherwise support a means for receiving, from the second device based on transmitting the modulated encoded set of shaping bits, second feedback different from the first feedback, the second feedback associated with the set of shaping bits.

In some examples, the probability distribution of the modulated symbols includes a first set of symbols with respective probabilities of usage below a first probability level and a second set of symbols with respective probabilities of usage above or equal to the first probability level.

In some examples, the masking bit generation component 1270 may be configured as or otherwise support a means for generating a set of masking bits corresponding to the set of shaping bits. In some examples, the information bit shaping component 1275 may be configured as or otherwise support a means for shaping the information bits for modulation based on combining the information bits with the set of masking bits, where modulating the encoded information bits is based on shaping the information bits.

In some examples, to support generating the set of masking bits, the masking bit generation component 1270 may be configured as or otherwise support a means for generating the set of masking bits using the set of shaping bits, where generating the masking bits using the set of shaping bits includes one or more of multiplying the set of shaping bits with a generator matrix to generate the set of masking bits or encoding the set of shaping bits using a linear code to generate the set of masking bits.

In some examples, to support generating the set of shaping bits, the shaping bit generation component 1225 may be configured as or otherwise support a means for generate the set of shaping bits by compressing the set of masking bits to reduce a size of the set of masking bits.

In some examples, the information bits include data bits and parity bits associated with the data bits.

In some examples, to support shaping the information bits, the information bit shaping component 1275 may be configured as or otherwise support a means for applying the set of masking bits to a subset of the information bits, where the subset of the information bits is based on one or more respective modulation symbol bit positions associated with the subset of information bits.

In some examples, to support shaping the information bits, the information bit shaping component 1275 may be configured as or otherwise support a means for applying a first set of shaping parameters to a first subset of the information bits, the first subset associated with a first set of frequency resources, a first set of time resources, a first set of spatial layers, or any combination thereof. In some examples, to support shaping the information bits, the information bit shaping component 1275 may be configured as or otherwise support a means for applying a second set of shaping parameters to a second subset of the information bits, the second subset associated with a second set of frequency resources, a second set of time resources, a second set of spatial layers, or any combination thereof.

In some examples, to support generating the set of shaping bits, the shaping bit generation component 1225 may be configured as or otherwise support a means for generating a first subset of the set of shaping bits corresponding to the first set of shaping parameters. In some examples, to support generating the set of shaping bits, the shaping bit generation component 1225 may be configured as or otherwise support a means for generating a second subset of the set of shaping bits corresponding to the second set of shaping parameters.

In some examples, to support generating the set of shaping bits, the information bit shaping component 1275 may be configured as or otherwise support a means for shaping the information bits for modulation after encoding the information bits based on combining the information bits with a set of masking bits, where the set of shaping bits is indicative of the set of masking bits. In some examples, to support generating the set of shaping bits, the shaping bit generation component 1225 may be configured as or otherwise support a means for generating the set of shaping bits after encoding the information bits using the encoded information bits.

In some examples, to support generating the set of shaping bits, the information bit shaping component 1275 may be configured as or otherwise support a means for shaping the information bits for modulation before encoding the information bits based on combining the information bits with a set of masking bits, where the set of shaping bits is indicative of the set of masking bits. In some examples, to support generating the set of shaping bits, the shaping bit generation component 1225 may be configured as or otherwise support a means for generating the set of shaping bits using unencoded information bits based on shaping the information bits before encoding the information bits.

In some examples, to support modulating the encoded information bits and the encoded set of shaping bits, the modulating component 1240 may be configured as or otherwise support a means for modulating the encoded information bits using a first modulation scheme. In some examples, to support modulating the encoded information bits and the encoded set of shaping bits, the modulating component 1240 may be configured as or otherwise support a means for modulating the encoded set of shaping bits using a second modulation scheme. In some examples, to support modulating the encoded information bits and the encoded set of shaping bits, the transmitting component 1265 may be configured as or otherwise support a means for transmitting the modulated encoded information bits and the modulated encoded set of shaping bits to the second device.

In some examples, to support modulating the encoded information bits and the encoded set of shaping bits, the modulating component 1240 may be configured as or otherwise support a means for jointly modulating the encoded information bits and the encoded set of shaping bits using a modulation scheme. In some examples, to support modulating the encoded information bits and the encoded set of shaping bits, the transmitting component 1265 may be configured as or otherwise support a means for transmitting the modulated encoded information bits and the modulated encoded set of shaping bits to the second device.

In some examples, the modulated encoded information bits are mapped to respective amplitudes of the modulated symbols and the modulated encoded set of shaping bits is mapped to respective signs of the modulated symbols.

In some examples, the transmitting component 1265 may be configured as or otherwise support a means for transmit the modulated encoded information bits and the modulated encoded set of shaping bits to the second device, where the modulated encoded information bits and the modulated encoded set of shaping bits are transmitted via a same transmission.

In some examples, the transmitting component 1265 may be configured as or otherwise support a means for transmit the modulated encoded information bits and the modulated encoded set of shaping bits to the second device, where the modulated encoded information bits and the modulated encoded set of shaping bits are transmitted via different transmissions.

In some examples, the set of shaping bits is concatenated with second information bits for encoding, modulation, and transmission via a second transmission.

Additionally, or alternatively, the communications manager 1220 may support wireless communication at a second device in accordance with examples as disclosed herein. The demodulating component 1245 may be configured as or otherwise support a means for demodulating information bits and a set of shaping bits from signaling received from a first device, the set of shaping bits associated with shaping the information bits into a probability distribution of modulated symbols for wireless communication. The shaping bit decoding component 1250 may be configured as or otherwise support a means for decoding the set of shaping bits using a second channel decoding scheme based on demodulating the set of shaping bits. The deshaping component 1255 may be configured as or otherwise support a means for deshaping the information bits using a set of masking bits, the set of masking bits generated based on the decoded set of shaping bits. The information bit decoding component 1260 may be configured as or otherwise support a means for decoding the information bits using a first channel decoding scheme based on deshaping the information bits.

In some examples, the signaling reception component 1280 may be configured as or otherwise support a means for receiving the signaling from the first device, where demodulating the information bits and the set of shaping bits is based on receiving the signaling.

In some examples, the feedback component 1285 may be configured as or otherwise support a means for transmitting first feedback to the first device based on decoding the information bits, the first feedback associated with the information bits. In some examples, the feedback component 1285 may be configured as or otherwise support a means for transmitting, to the first device based on decoding the set of shaping bits, second feedback different from the first feedback, the second feedback associated with the set of shaping bits.

In some examples, the probability distribution of modulated symbols includes a first set of symbols with respective probabilities of usage below a first probability level and a second set of symbols with respective probabilities of usage above or equal to the first probability level.

In some examples, to support deshaping the information bits, the deshaping component 1255 may be configured as or otherwise support a means for removing the set of masking bits from a first set of log likelihood ratios associated with the information bits and the set of masking bits to generate a second set of log likelihood ratios associated with the information bits.

In some examples, the masking bit generation component 1270 may be configured as or otherwise support a means for generating the set of masking bits based on one or more of multiplying the set of shaping bits with a generator matrix to generate the set of masking bits or encoding the set of shaping bits using a linear code to generate the set of masking bits.

In some examples, the masking bit generation component 1270 may be configured as or otherwise support a means for generating the set of masking bits based on decompressing the set of shaping bits.

In some examples, the information bits include data bits and parity bits associated with the data bits.

In some examples, to support deshaping the information bits, the deshaping component 1255 may be configured as or otherwise support a means for removing the set of masking bits from a subset of the information bits, where the subset of the information bits is based on one or more respective modulation symbol bit positions associated with the subset of information bits.

In some examples, to support deshaping the information bits, the deshaping component 1255 may be configured as or otherwise support a means for applying a first set of deshaping parameters to a first subset of the information bits, the first subset associated with a first set of frequency resources, a first set of time resources, a first set of spatial layers, or any combination thereof. In some examples, to support deshaping the information bits, the deshaping component 1255 may be configured as or otherwise support a means for applying a second set of deshaping parameters to a second subset of the information bits, the second subset associated with a second set of frequency resources, a second set of time resources, a second set of spatial layers, or any combination thereof.

In some examples, a first subset of the set of shaping bits corresponds to the first set of deshaping parameters and a second subset of the set of shaping bits corresponds to the second set of deshaping parameters.

In some examples, to support deshaping the information bits, the deshaping component 1255 may be configured as or otherwise support a means for deshaping the information bits after decoding the information bits.

In some examples, to support deshaping the information bits, the deshaping component 1255 may be configured as or otherwise support a means for deshaping the information bits before decoding the information bits.

In some examples, to support demodulating the information bits and the set of shaping bits, the demodulating component 1245 may be configured as or otherwise support a means for demodulating the information bits using a first demodulation scheme. In some examples, to support demodulating the information bits and the set of shaping bits, the demodulating component 1245 may be configured as or otherwise support a means for demodulating the set of shaping bits using a second demodulation scheme.

In some examples, to support demodulating the information bits and the set of shaping bits, the demodulating component 1245 may be configured as or otherwise support a means for jointly demodulating the information bits and the set of shaping bits using a demodulation scheme.

In some examples, the information bits are mapped to respective amplitudes of the modulated symbols and the set of shaping bits is mapped to respective signs of the modulated symbols.

In some examples, the signaling reception component 1280 may be configured as or otherwise support a means for receiving the modulated encoded information bits and the modulated encoded set of shaping bits from the first device, where the modulated encoded information bits and the modulated encoded set of shaping bits are received via a same transmission.

In some examples, the signaling reception component 1280 may be configured as or otherwise support a means for receive the modulated encoded information bits and the modulated encoded set of shaping bits from the first device, where the modulated encoded information bits and the modulated encoded set of shaping bits are received via different transmissions.

In some examples, the set of shaping bits is concatenated with second information bits for reception via a second transmission, demodulation, and decoding.

Figure 13:
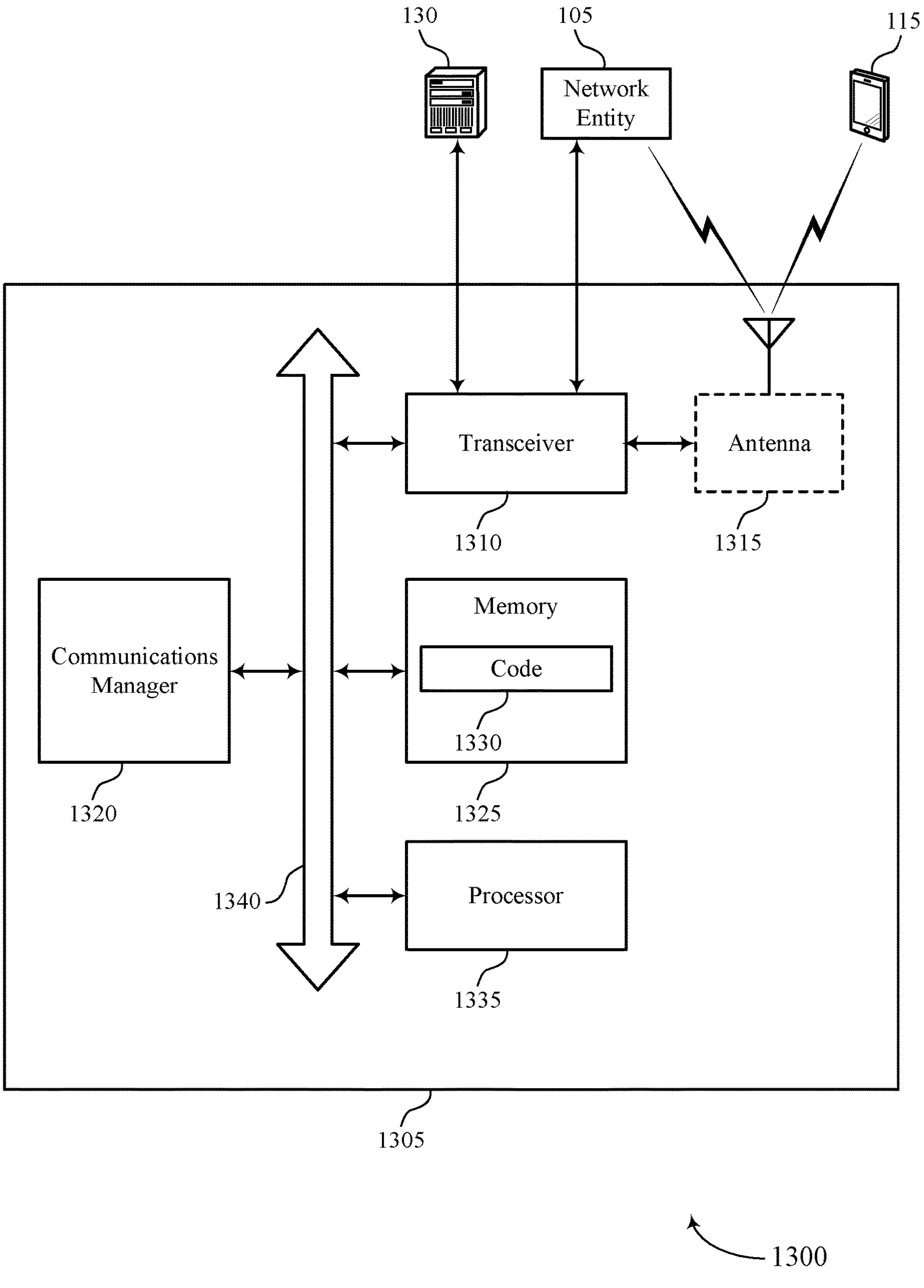
FIG. 13 shows a diagram of a system including a UE that supports probabilistic shaping and channel coding for wireless signals in accordance with one or more aspects of the present disclosure.

FIG. 13 shows a diagram of a system 1300 including a device 1305 that supports probabilistic shaping and channel coding for wireless signals in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include random access memory (RAM) and read-only memory (ROM). The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a basic input/output (I/O) system (BIOS) which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting probabilistic shaping and channel coding for wireless signals). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1305 may transmit information output from the chip or modem. In some implementations, the second interface may refer to an interface between the processing system of the chip or modem and a receiver, such that the device 1305 may obtain information or signal inputs, and the information may be passed to the processing system. A person having ordinary skill in the art will readily recognize that the first interface also may obtain information or signal inputs, and the second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a first device in accordance with examples as disclosed herein. For example, the communications manager 1320 may be configured as or otherwise support a means for generating, using information bits, a set of shaping bits associated with shaping the information bits into a probability distribution of modulated symbols for a transmission. The communications manager 1320 may be configured as or otherwise support a means for encoding the information bits using a first channel coding scheme. The communications manager 1320 may be configured as or otherwise support a means for encoding the set of shaping bits using a second channel coding scheme based on generating the set of shaping bits. The communications manager 1320 may be configured as or otherwise support a means for modulating the encoded information bits and the encoded set of shaping bits for the transmission to a second device, the modulated encoded information bits associated with modulated symbols that are probabilistically shaped corresponding to the probability distribution.

Additionally, or alternatively, the communications manager 1320 may support wireless communication at a second device in accordance with examples as disclosed herein. For example, the communications manager 1320 may be configured as or otherwise support a means for demodulating information bits and a set of shaping bits from signaling received from a first device, the set of shaping bits associated with shaping the information bits into a probability distribution of modulated symbols for wireless communication. The communications manager 1320 may be configured as or otherwise support a means for decoding the set of shaping bits using a second channel decoding scheme based on demodulating the set of shaping bits. The communications manager 1320 may be configured as or otherwise support a means for deshaping the information bits using a set of masking bits, the set of masking bits generated based on the decoded set of shaping bits. The communications manager 1320 may be configured as or otherwise support a means for decoding the information bits using a first channel decoding scheme based on deshaping the information bits.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of probabilistic shaping and channel coding for wireless signals as described herein, or the processor 1335 and the memory 1325 may be otherwise configured to perform or support such operations.

Figure 14:
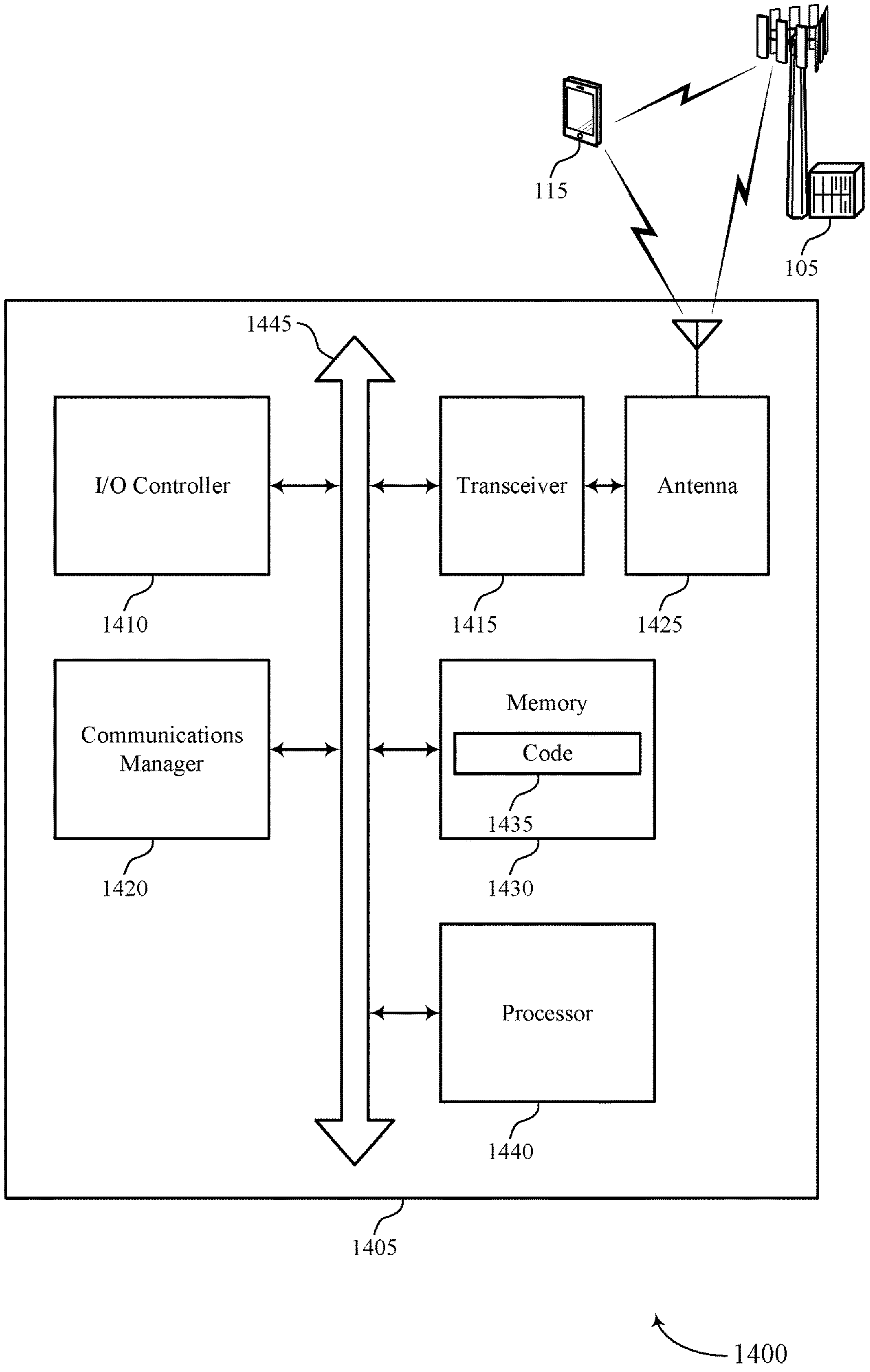
FIG. 14 shows a diagram of a system including a network entity that supports probabilistic shaping and channel coding for wireless signals in accordance with one or more aspects of the present disclosure.

FIG. 14 shows a diagram of a system 1400 including a device 1405 that supports probabilistic shaping and channel coding for wireless signals in accordance with one or more aspects of the present disclosure. The device 1405 may be an example of or include the components of a device 1005, a device 1105, or a UE 115 as described herein. The device 1405 may communicate (e.g., wirelessly) with one or more network entities 105, one or more UEs 115, or any combination thereof. The device 1405 may include components for bi-directional voice and data communications including components for transmitting and receiving communications, such as a communications manager 1420, an I/O controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter

1015, a transmitter 1115, a receiver 1010, a receiver 1110, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting probabilistic shaping and channel coding for wireless signals). For example, the device 1405 or a component of the device 1405 may include a processor 1440 and memory 1430 coupled with or to the processor 1440, the processor 1440 and memory 1430 configured to perform various functions described herein.

The communications manager 1420 may support wireless communication at a first device in accordance with examples as disclosed herein. For example, the communications manager 1420 may be configured as or otherwise support a means for generating, using information bits, a set of shaping bits associated with shaping the information bits into a probability distribution of modulated symbols for a transmission. The communications manager 1420 may be configured as or otherwise support a means for encoding the information bits using a first channel coding scheme. The communications manager 1420 may be configured as or otherwise support a means for encoding the set of shaping bits using a second channel coding scheme based on generating the set of shaping bits. The communications manager 1420 may be configured as or otherwise support a means for modulating the encoded information bits and the encoded set of shaping bits for the transmission to a second device, the modulated encoded information bits associated with modulated symbols that are probabilistically shaped corresponding to the probability distribution.

Additionally, or alternatively, the communications manager 1420 may support wireless communication at a second device in accordance with examples as disclosed herein. For example, the communications manager 1420 may be configured as or otherwise support a means for demodulating information bits and a set of shaping bits from signaling received from a first device, the set of shaping bits associated with shaping the information bits into a probability distribution of modulated symbols for wireless communication. The communications manager 1420 may be configured as or otherwise support a means for decoding the set of shaping bits using a second channel decoding scheme based on demodulating the set of shaping bits. The communications manager 1420 may be configured as or otherwise support a means for deshaping the information bits using a set of masking bits, the set of masking bits generated based on the decoded set of shaping bits. The communications manager 1420 may be configured as or otherwise support a means for decoding the information bits using a first channel decoding scheme based on deshaping the information bits.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of probabilistic shaping and channel coding for wireless signals as described herein, or the processor 1440 and the memory 1430 may be otherwise configured to perform or support such operations.

Figure 15:
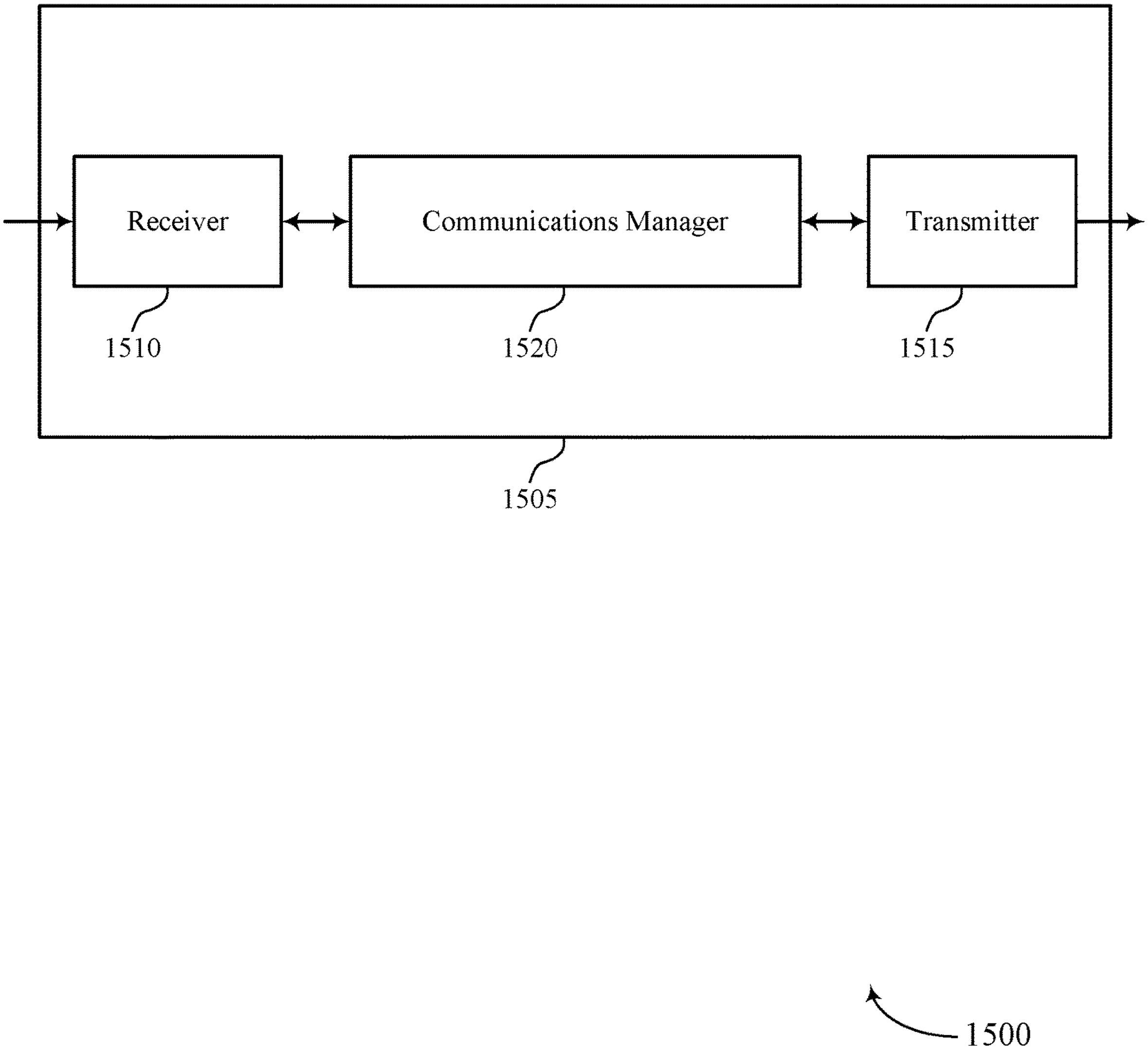
FIGS. 15 and 16 show block diagrams of devices that support probabilistic shaping and channel coding for wireless signals in accordance with one or more aspects of the present disclosure.

FIG. 15 shows a block diagram 1500 of a device 1505 that supports probabilistic shaping and channel coding for wireless signals in accordance with one or more aspects of the present disclosure. The device 1505 may be an example of aspects of a UE 115 or a network entity 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to probabilistic shaping and channel coding for wireless signals). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to probabilistic shaping and channel coding for wireless signals). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of probabilistic shaping and channel coding for wireless signals as described herein. For example, the communications manager 1520, the receiver

1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1520 may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communication at a first device in accordance with examples as disclosed herein. For example, the communications manager 1520 may be configured as or otherwise support a means for generating, using information bits, a set of shaping bits associated with shaping the information bits into a probability distribution of modulated symbols for a transmission. The communications manager 1520 may be configured as or otherwise support a means for encoding the information bits using a first channel coding scheme. The communications manager 1520 may be configured as or otherwise support a means for encoding the set of shaping bits using a second channel coding scheme based on generating the set of shaping bits. The communications manager 1520 may be configured as or otherwise support a means for modulating the encoded information bits and the encoded set of shaping bits for the transmission to a second device, the modulated encoded information bits associated with modulated symbols that are probabilistically shaped corresponding to the probability distribution.

Additionally, or alternatively, the communications manager 1520 may support wireless communication at a second device in accordance with examples as disclosed herein. For example, the communications manager 1520 may be configured as or otherwise support a means for demodulating information bits and a set of shaping bits from signaling received from a first device, the set of shaping bits associated with shaping the information bits into a probability distribution of modulated symbols for wireless communication. The communications manager 1520 may be configured as or otherwise support a means for decoding the set of shaping bits using a second channel decoding scheme based on demodulating the set of shaping bits. The communications manager 1520 may be configured as or otherwise support a means for deshaping the information bits using a set of masking bits, the set of masking bits generated based on the decoded set of shaping bits. The communications manager 1520 may be configured as or otherwise support a means for decoding the information bits using a first channel decoding scheme based on deshaping the information bits.

By including or configuring the communications manager 1520 in accordance with examples as described herein, the device 1505 (e.g., a processor controlling or otherwise coupled with the receiver 1510, the transmitter 1515, the communications manager 1520, or a combination thereof) may support techniques for reduced processing, reduced power consumption, more efficient utilization of communication resources.

Figure 16:
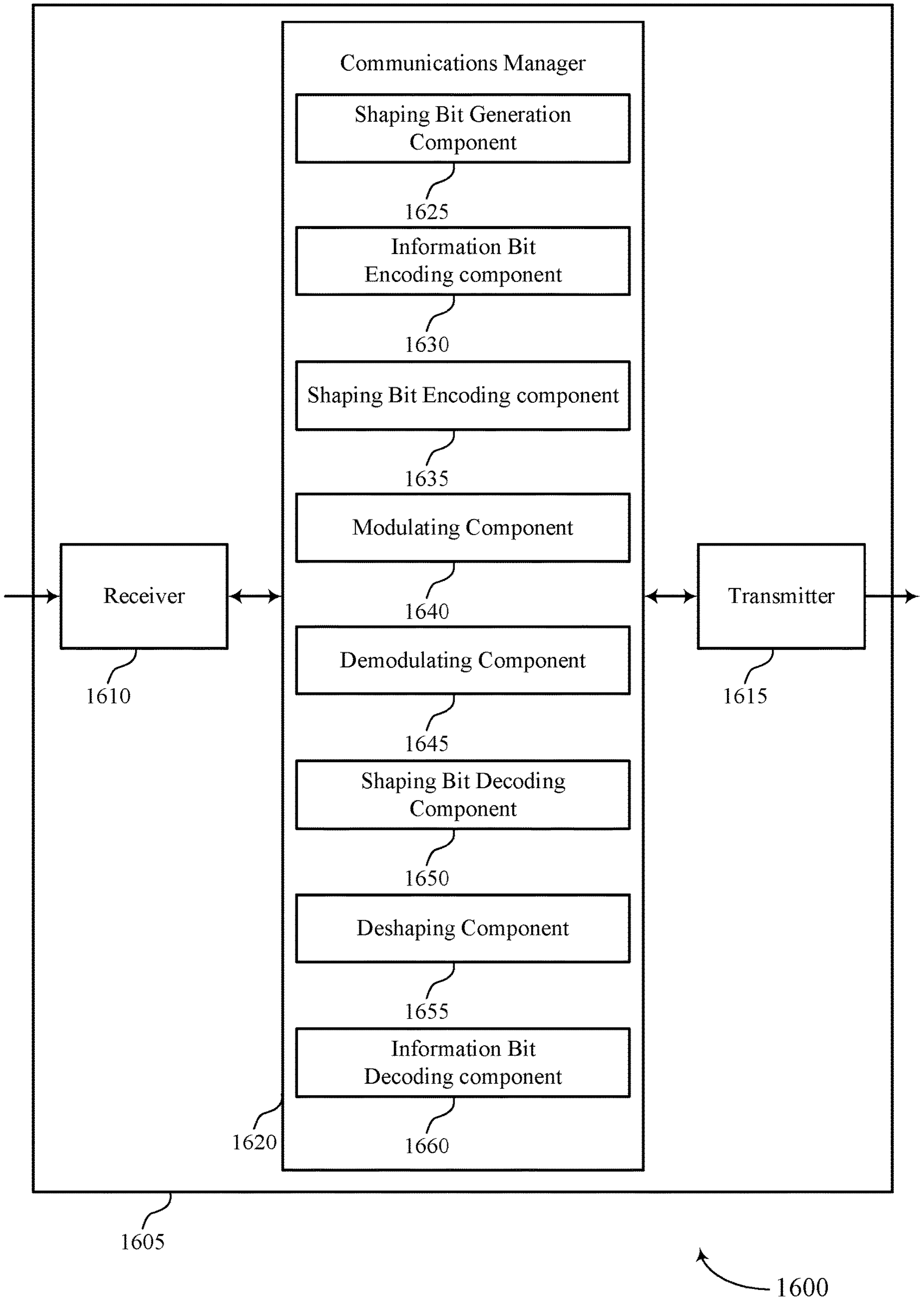

FIG. 16 shows a block diagram 1600 of a device 1605 that supports probabilistic shaping and channel coding for wireless signals in accordance with one or more aspects of the present disclosure. The device 1605 may be an example of aspects of a device 1505, a UE 115, or a network entity 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to probabilistic shaping and channel coding for wireless signals). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to probabilistic shaping and channel coding for wireless signals). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of probabilistic shaping and channel coding for wireless signals as described herein. For example, the communications manager 1620 may include a shaping bit generation component 1625, an information bit encoding component 1630, a shaping bit encoding component 1635, a modulating component 1640, a demodulating component 1645, a shaping bit decoding component 1650, a deshaping component 1655, an information bit decoding component 1660, or any combination thereof. The communications manager 1620 may be an example of aspects of a communications manager 1520 as described herein. In some examples, the communications manager 1620, or various components thereof, may be configured to perform various operations (e.g., receiving, obtaining, monitoring, outputting, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to obtain information, output information, or perform various other operations as described herein.

The communications manager 1620 may support wireless communication at a first device in accordance with examples as disclosed herein. The shaping bit generation component 1625 may be configured as or otherwise support a means for generating, using information bits, a set of shaping bits associated with shaping the information bits into a probability distribution of modulated symbols for a transmission. The information bit encoding component 1630 may be configured as or otherwise support a means for encoding the information bits using a first channel coding scheme. The shaping bit encoding component 1635 may be configured as or otherwise support a means for encoding the set of shaping bits using a second channel coding scheme based on generating the set of shaping bits. The modulating component 1640 may be configured as or otherwise support a means for modulating the encoded information bits and the encoded set of shaping bits for the transmission to a second device, the modulated encoded information bits associated with modulated symbols that are probabilistically shaped corresponding to the probability distribution.

Additionally, or alternatively, the communications manager 1620 may support wireless communication at a second device in accordance with examples as disclosed herein. The demodulating component 1645 may be configured as or otherwise support a means for demodulating information bits and a set of shaping bits from signaling received from a first device, the set of shaping bits associated with shaping the information bits into a probability distribution of modulated symbols for wireless communication. The shaping bit decoding component 1650 may be configured as or otherwise support a means for decoding the set of shaping bits using a second channel decoding scheme based on demodulating the set of shaping bits. The deshaping component 1655 may be configured as or otherwise support a means for deshaping the information bits using a set of masking bits, the set of masking bits generated based on the decoded set of shaping bits. The information bit decoding component 1660 may be configured as or otherwise support a means for decoding the information bits using a first channel decoding scheme based on deshaping the information bits.

Figure 17:
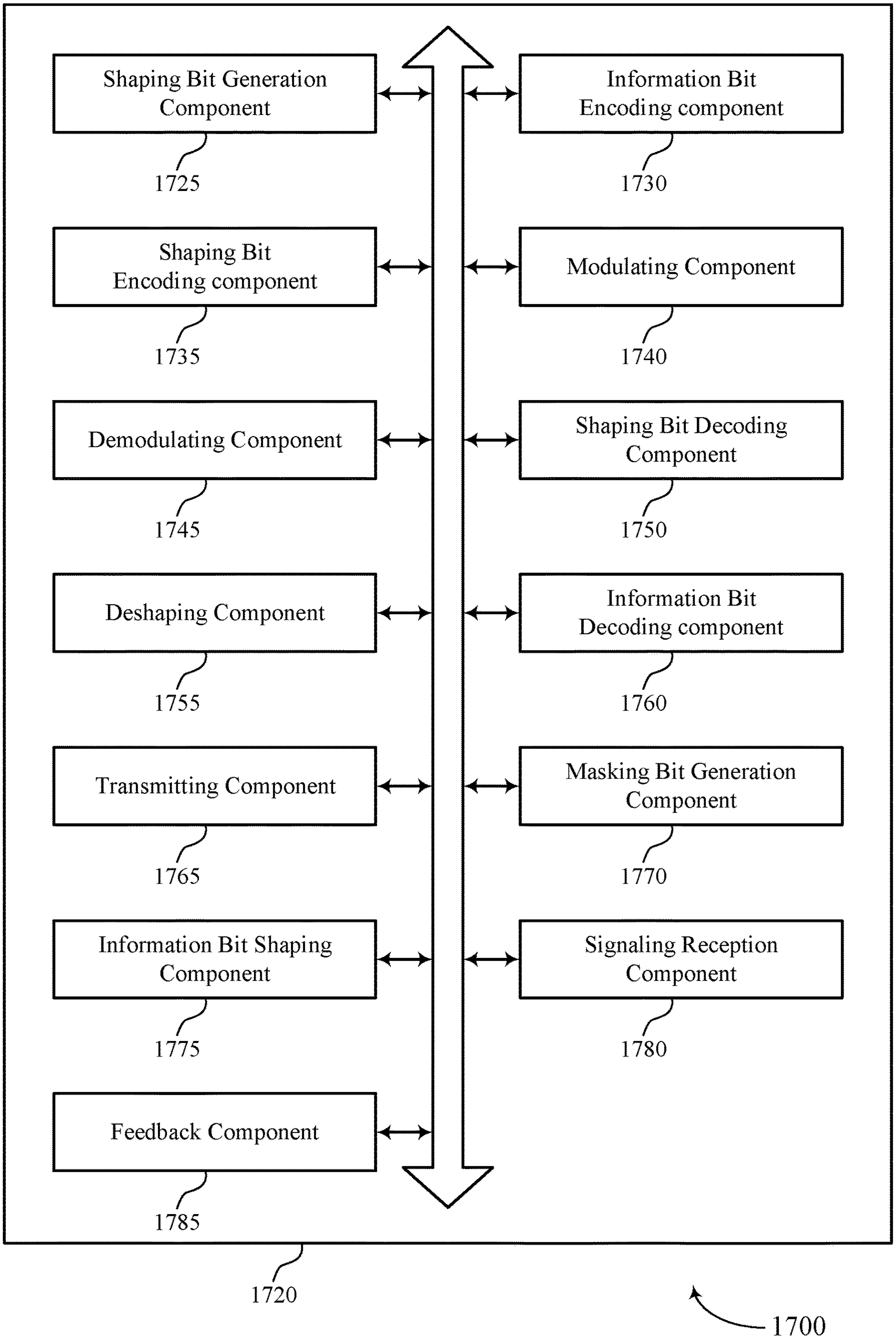
FIG. 17 shows a block diagram of a communications manager that supports probabilistic shaping and channel coding for wireless signals in accordance with one or more aspects of the present disclosure.

FIG. 17 shows a block diagram 1700 of a communications manager 1720 that supports probabilistic shaping and channel coding for wireless signals in accordance with one or more aspects of the present disclosure. The communications manager 1720 may be an example of aspects of a communications manager 1520, a communications manager 1620, or both, as described herein. The communications manager 1720, or various components thereof, may be an example of means for performing various aspects of probabilistic shaping and channel coding for wireless signals as described herein. For example, the communications manager 1720 may include a shaping bit generation component 1725, an information bit encoding component 1730, a shaping bit encoding component 1735, a modulating component 1740, a demodulating component 1745, a shaping bit decoding component 1750, a deshaping component 1755, an information bit decoding component 1760, a transmitting component 1765, a masking bit generation component 1770, an information bit shaping component 1775, a signaling reception component 1780, a feedback component 1785, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1720 may support wireless communication at a first device in accordance with examples as disclosed herein. The shaping bit generation component 1725 may be configured as or otherwise support a means for generating, using information bits, a set of shaping bits associated with shaping the information bits into a probability distribution of modulated symbols for a transmission. The information bit encoding component 1730 may be configured as or otherwise support a means for encoding the information bits using a first channel coding scheme. The shaping bit encoding component 1735 may be configured as or otherwise support a means for encoding the set of shaping bits using a second channel coding scheme based on generating the set of shaping bits. The modulating component 1740 may be configured as or otherwise support a means for modulating the encoded information bits and the encoded set of shaping bits for the transmission to a second device, the modulated encoded information bits associated with modulated symbols that are probabilistically shaped corresponding to the probability distribution.

In some examples, the transmitting component 1765 may be configured as or otherwise support a means for transmitting the modulated encoded information bits and the modulated encoded set of shaping bits to the second device.

In some examples, the feedback component 1785 may be configured as or otherwise support a means for receiving first feedback from the second device based on transmitting the modulated encoded information bits, the first feedback associated with the information bits. In some examples, the feedback component 1785 may be configured as or otherwise support a means for receiving, from the second device based on transmitting the modulated encoded set of shaping bits, second feedback different from the first feedback, the second feedback associated with the set of shaping bits.

In some examples, the probability distribution of the modulated symbols includes a first set of symbols with respective probabilities of usage below a first probability level and a second set of symbols with respective probabilities of usage above or equal to the first probability level.

In some examples, the masking bit generation component 1770 may be configured as or otherwise support a means for generating a set of masking bits corresponding to the set of shaping bits. In some examples, the information bit shaping component 1775 may be configured as or otherwise support a means for shaping the information bits for modulation based on combining the information bits with the set of masking bits, where modulating the encoded information bits is based on shaping the information bits.

In some examples, to support generating the set of masking bits, the masking bit generation component 1770 may be configured as or otherwise support a means for generating the set of masking bits using the set of shaping bits, where generating the masking bits using the set of shaping bits includes one or more of multiplying the set of shaping bits with a generator matrix to generate the set of masking bits or encoding the set of shaping bits using a linear code to generate the set of masking bits.

In some examples, to support generating the set of shaping bits, the shaping bit generation component 1725 may be configured as or otherwise support a means for generate the set of shaping bits by compressing the set of masking bits to reduce a size of the set of masking bits.

In some examples, the information bits include data bits and parity bits associated with the data bits.

In some examples, to support shaping the information bits, the information bit shaping component 1775 may be configured as or otherwise support a means for applying the set of masking bits to a subset of the information bits, where the subset of the information bits is based on one or more respective modulation symbol bit positions associated with the subset of information bits.

In some examples, to support shaping the information bits, the information bit shaping component 1775 may be configured as or otherwise support a means for applying a first set of shaping parameters to a first subset of the information bits, the first subset associated with a first set of frequency resources, a first set of time resources, a first set of spatial layers, or any combination thereof. In some examples, to support shaping the information bits, the information bit shaping component 1775 may be configured as or otherwise support a means for applying a second set of shaping parameters to a second subset of the information bits, the second subset associated with a second set of frequency resources, a second set of time resources, a second set of spatial layers, or any combination thereof.

In some examples, to support generating the set of shaping bits, the shaping bit generation component 1725 may be configured as or otherwise support a means for generating a first subset of the set of shaping bits corresponding to the first set of shaping parameters. In some examples, to support generating the set of shaping bits, the shaping bit generation component 1725 may be configured as or otherwise support a means for generating a second subset of the set of shaping bits corresponding to the second set of shaping parameters.

In some examples, to support generating the set of shaping bits, the information bit shaping component 1775 may be configured as or otherwise support a means for shaping the information bits for modulation after encoding the information bits based on combining the information bits with a set of masking bits, where the set of shaping bits is indicative of the set of masking bits. In some examples, to support generating the set of shaping bits, the shaping bit generation component 1725 may be configured as or otherwise support a means for generating the set of shaping bits after encoding the information bits using the encoded information bits.

In some examples, to support generating the set of shaping bits, the information bit shaping component 1775 may be configured as or otherwise support a means for shaping the information bits for modulation before encoding the information bits based on combining the information bits with a set of masking bits, where the set of shaping bits is indicative of the set of masking bits. In some examples, to support generating the set of shaping bits, the shaping bit generation component 1725 may be configured as or otherwise support a means for generating the set of shaping bits using unencoded information bits based on shaping the information bits before encoding the information bits.

In some examples, to support modulating the encoded information bits and the encoded set of shaping bits, the modulating component 1740 may be configured as or otherwise support a means for modulating the encoded information bits using a first modulation scheme. In some examples, to support modulating the encoded information bits and the encoded set of shaping bits, the modulating component 1740 may be configured as or otherwise support a means for modulating the encoded set of shaping bits using a second modulation scheme. In some examples, to support modulating the encoded information bits and the encoded set of shaping bits, the transmitting component 1765 may be configured as or otherwise support a means for transmitting the modulated encoded information bits and the modulated encoded set of shaping bits to the second device.

In some examples, to support modulating the encoded information bits and the encoded set of shaping bits, the modulating component 1740 may be configured as or otherwise support a means for jointly modulating the encoded information bits and the encoded set of shaping bits using a modulation scheme. In some examples, to support modulating the encoded information bits and the encoded set of shaping bits, the transmitting component 1765 may be configured as or otherwise support a means for transmitting the modulated encoded information bits and the modulated encoded set of shaping bits to the second device.

In some examples, the modulated encoded information bits are mapped to respective amplitudes of the modulated symbols and the modulated encoded set of shaping bits is mapped to respective signs of the modulated symbols.

In some examples, the transmitting component 1765 may be configured as or otherwise support a means for transmit the modulated encoded information bits and the modulated encoded set of shaping bits to the second device, where the modulated encoded information bits and the modulated encoded set of shaping bits are transmitted via a same transmission.

In some examples, the transmitting component 1765 may be configured as or otherwise support a means for transmit the modulated encoded information bits and the modulated encoded set of shaping bits to the second device, where the modulated encoded information bits and the modulated encoded set of shaping bits are transmitted via different transmissions.

In some examples, the set of shaping bits is concatenated with second information bits for encoding, modulation, and transmission via a second transmission.

Additionally, or alternatively, the communications manager 1720 may support wireless communication at a second device in accordance with examples as disclosed herein. The demodulating component 1745 may be configured as or otherwise support a means for demodulating information bits and a set of shaping bits from signaling received from a first device, the set of shaping bits associated with shaping the information bits into a probability distribution of modulated symbols for wireless communication. The shaping bit decoding component 1750 may be configured as or otherwise support a means for decoding the set of shaping bits using a second channel decoding scheme based on demodulating the set of shaping bits. The deshaping component 1755 may be configured as or otherwise support a means for deshaping the information bits using a set of masking bits, the set of masking bits generated based on the decoded set of shaping bits. The information bit decoding component 1760 may be configured as or otherwise support a means for decoding the information bits using a first channel decoding scheme based on deshaping the information bits.

In some examples, the signaling reception component 1780 may be configured as or otherwise support a means for receiving the signaling from the first device, where demodulating the information bits and the set of shaping bits is based on receiving the signaling.

In some examples, the feedback component 1785 may be configured as or otherwise support a means for transmitting first feedback to the first device based on decoding the information bits, the first feedback associated with the information bits. In some examples, the feedback component 1785 may be configured as or otherwise support a means for transmitting, to the first device based on decoding the set of shaping bits, second feedback different from the first feedback, the second feedback associated with the set of shaping bits.

In some examples, the probability distribution of modulated symbols includes a first set of symbols with respective probabilities of usage below a first probability level and a second set of symbols with respective probabilities of usage above or equal to the first probability level.

In some examples, to support deshaping the information bits, the deshaping component 1755 may be configured as or otherwise support a means for removing the set of masking bits from a first set of log likelihood ratios associated with the information bits and the set of masking bits to generate a second set of log likelihood ratios associated with the information bits.

In some examples, the masking bit generation component 1770 may be configured as or otherwise support a means for generating the set of masking bits based on one or more of multiplying the set of shaping bits with a generator matrix to generate the set of masking bits or encoding the set of shaping bits using a linear code to generate the set of masking bits.

In some examples, the masking bit generation component 1770 may be configured as or otherwise support a means for generating the set of masking bits based on decompressing the set of shaping bits.

In some examples, the information bits include data bits and parity bits associated with the data bits.

In some examples, to support deshaping the information bits, the deshaping component 1755 may be configured as or otherwise support a means for removing the set of masking bits from a subset of the information bits, where the subset of the information bits is based on one or more respective modulation symbol bit positions associated with the subset of information bits.

In some examples, to support deshaping the information bits, the deshaping component 1755 may be configured as or otherwise support a means for applying a first set of deshaping parameters to a first subset of the information bits, the first subset associated with a first set of frequency resources, a first set of time resources, a first set of spatial layers, or any combination thereof. In some examples, to support deshaping the information bits, the deshaping component 1755 may be configured as or otherwise support a means for applying a second set of deshaping parameters to a second subset of the information bits, the second subset associated with a second set of frequency resources, a second set of time resources, a second set of spatial layers, or any combination thereof.

In some examples, a first subset of the set of shaping bits corresponds to the first set of deshaping parameters and a second subset of the set of shaping bits corresponds to the second set of deshaping parameters.

In some examples, to support deshaping the information bits, the deshaping component 1755 may be configured as or otherwise support a means for deshaping the information bits after decoding the information bits.

In some examples, to support deshaping the information bits, the deshaping component 1755 may be configured as or otherwise support a means for deshaping the information bits before decoding the information bits.

In some examples, to support demodulating the information bits and the set of shaping bits, the demodulating component 1745 may be configured as or otherwise support a means for demodulating the information bits using a first demodulation scheme. In some examples, to support demodulating the information bits and the set of shaping bits, the demodulating component 1745 may be configured as or otherwise support a means for demodulating the set of shaping bits using a second demodulation scheme.

In some examples, to support demodulating the information bits and the set of shaping bits, the demodulating component 1745 may be configured as or otherwise support a means for jointly demodulating the information bits and the set of shaping bits using a demodulation scheme.

In some examples, the information bits are mapped to respective amplitudes of the modulated symbols and the set of shaping bits is mapped to respective signs of the modulated symbols.

In some examples, the signaling reception component 1780 may be configured as or otherwise support a means for receiving the modulated encoded information bits and the modulated encoded set of shaping bits from the first device, where the modulated encoded information bits and the modulated encoded set of shaping bits are received via a same transmission.

In some examples, the signaling reception component 1780 may be configured as or otherwise support a means for receive the modulated encoded information bits and the modulated encoded set of shaping bits from the first device, where the modulated encoded information bits and the modulated encoded set of shaping bits are received via different transmissions.

In some examples, the set of shaping bits is concatenated with second information bits for reception via a second transmission, demodulation, and decoding.

Figure 18:
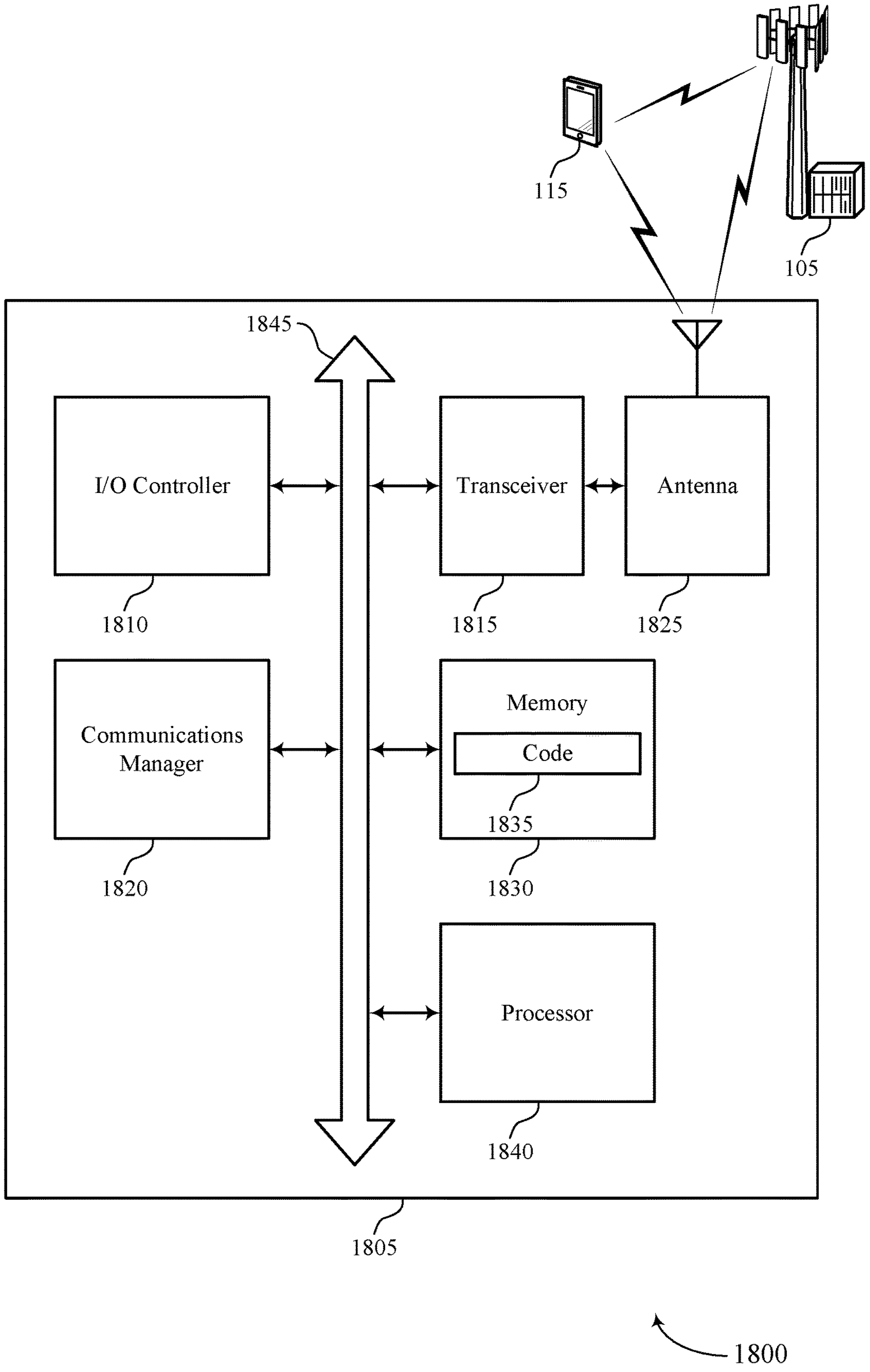
FIG. 18 shows a diagram of a system including a UE that supports probabilistic shaping and channel coding for wireless signals in accordance with one or more aspects of the present disclosure.

FIG. 18 shows a diagram of a system 1800 including a device 1805 that supports probabilistic shaping and channel coding for wireless signals in accordance with one or more aspects of the present disclosure. The device 1805 may be an example of or include the components of a device 1505, a device 1605, or a UE 115 as described herein. The device 1805 may communicate (e.g., wirelessly) with one or more network entities 105, one or more UEs 115, or any combination thereof. The device 1805 may include components for bi-directional voice and data communications including components for transmitting and receiving communications, such as a communications manager 1820, an input/output (I/O) controller 1810, a transceiver 1815, an antenna 1825, a memory 1830, code 1835, and a processor 1840. These components may be in electronic communication or otherwise coupled (e.g., operatively, communicatively, functionally, electronically, electrically) via one or more buses (e.g., a bus 1845).

The I/O controller 1810 may manage input and output signals for the device 1805. The I/O controller 1810 may also manage peripherals not integrated into the device 1805. In some cases, the I/O controller 1810 may represent a physical connection or port to an external peripheral. In some cases, the I/O controller 1810 may utilize an operating system such as iOS®, ANDROID®, MS-DOS®, MS-WINDOWS®, OS/2®, UNIX®, LINUX®, or another known operating system. Additionally or alternatively, the I/O controller 1810 may represent or interact with a modem, a keyboard, a mouse, a touchscreen, or a similar device. In some cases, the I/O controller 1810 may be implemented as part of a processor, such as the processor 1840. In some cases, a user may interact with the device 1805 via the I/O controller 1810 or via hardware components controlled by the I/O controller 1810.

In some cases, the device 1805 may include a single antenna 1825. However, in some other cases, the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include random access memory (RAM) and read-only memory (ROM). The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a basic I/O system (BIOS) which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting probabilistic shaping and channel coding for wireless signals). For example, the device 1805 or a component of the device 1805 may include a processor 1840 and memory 1830 coupled with or to the processor 1840, the processor 1840 and memory 1830 configured to perform various functions described herein.

The communications manager 1820 may support wireless communication at a first device in accordance with examples as disclosed herein. For example, the communications manager 1820 may be configured as or otherwise support a means for generating, using information bits, a set of shaping bits associated with shaping the information bits into a probability distribution of modulated symbols for a transmission. The communications manager 1820 may be configured as or otherwise support a means for encoding the information bits using a first channel coding scheme. The communications manager 1820 may be configured as or otherwise support a means for encoding the set of shaping bits using a second channel coding scheme based on generating the set of shaping bits. The communications manager 1820 may be configured as or otherwise support a means for modulating the encoded information bits and the encoded set of shaping bits for the transmission to a second device, the modulated encoded information bits associated with modulated symbols that are probabilistically shaped corresponding to the probability distribution.

Additionally, or alternatively, the communications manager 1820 may support wireless communication at a second device in accordance with examples as disclosed herein. For example, the communications manager 1820 may be configured as or otherwise support a means for demodulating information bits and a set of shaping bits from signaling received from a first device, the set of shaping bits associated with shaping the information bits into a probability distribution of modulated symbols for wireless communication. The communications manager 1820 may be configured as or otherwise support a means for decoding the set of shaping bits using a second channel decoding scheme based on demodulating the set of shaping bits. The communications manager 1820 may be configured as or otherwise support a means for deshaping the information bits using a set of masking bits, the set of masking bits generated based on the decoded set of shaping bits. The communications manager 1820 may be configured as or otherwise support a means for decoding the information bits using a first channel decoding scheme based on deshaping the information bits.

By including or configuring the communications manager 1820 in accordance with examples as described herein, the device 1805 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of probabilistic shaping and channel coding for wireless signals as described herein, or the processor 1840 and the memory 1830 may be otherwise configured to perform or support such operations.

Figure 19:
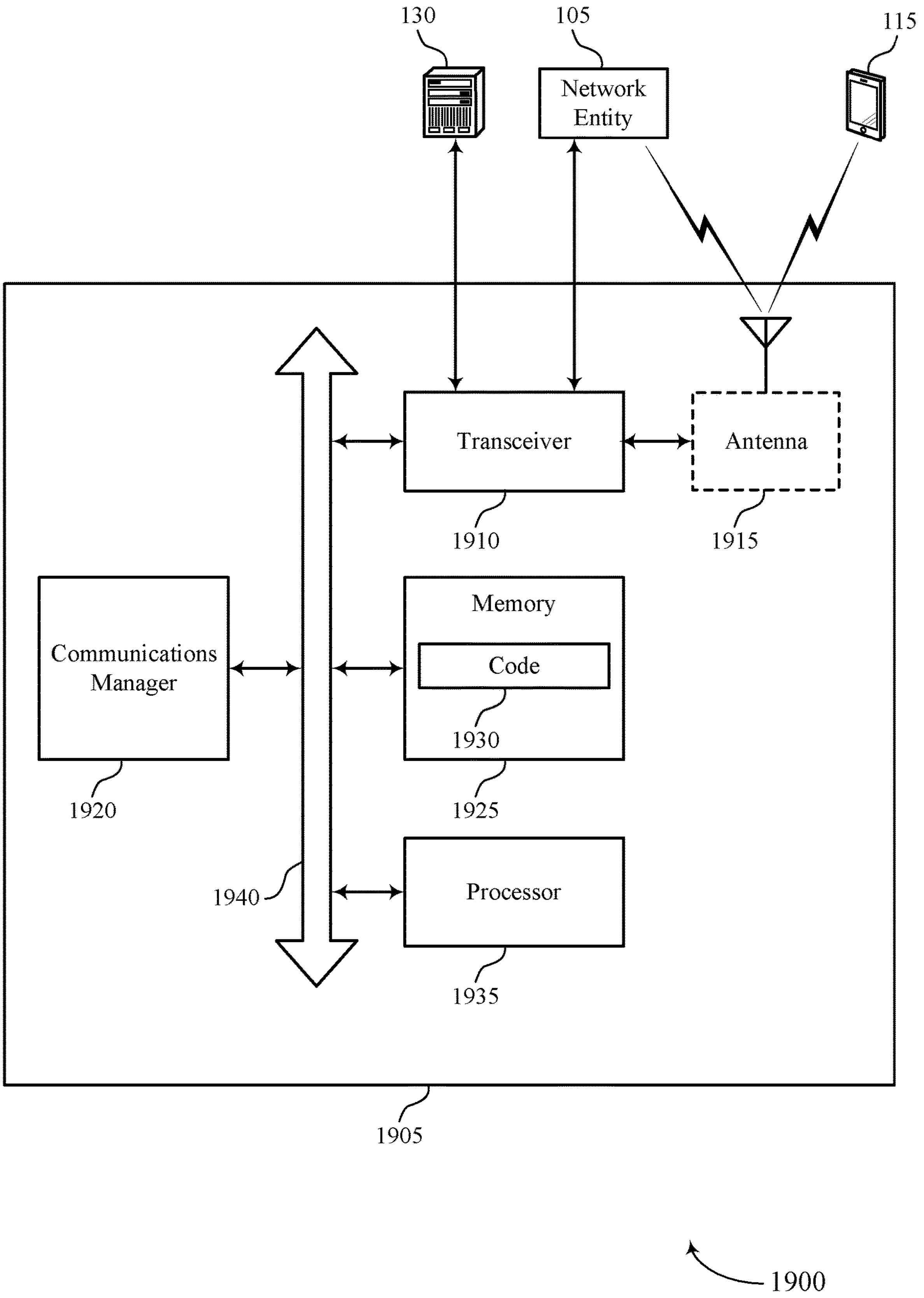
FIG. 19 shows a diagram of a system including a network entity that supports probabilistic shaping and channel coding for wireless signals in accordance with one or more aspects of the present disclosure.

FIG. 19 shows a diagram of a system 1900 including a device 1905 that supports probabilistic shaping and channel coding for wireless signals in accordance with one or more aspects of the present disclosure. The device 1905 may be an example of or include the components of a device 1505, a device 1605, or a network entity 105 as described herein. The device 1905 may communicate with one or more network entities 105, one or more UEs 115, or any combination thereof, which may include communications over one or more wired interfaces, over one or more wireless interfaces, or any combination thereof. The device 1905 may include components that support outputting and obtaining communications, such as a communications manager 1920, a transceiver 1910, an antenna 1915, a memory 1925, code 1930, and a processor 1935. These components may be in electronic communication or otherwise coupled (e.g., operatively, communicatively, functionally, electronically, electrically) via one or more buses (e.g., a bus 1940).

The transceiver 1910 may support bi-directional communications via wired links, wireless links, or both as described herein. In some examples, the transceiver 1910 may include a wired transceiver and may communicate bi-directionally with another wired transceiver. Additionally, or alternatively, in some examples, the transceiver 1910 may include a wireless transceiver and may communicate bi-directionally with another wireless transceiver. In some examples, the device 1905 may include one or more antennas 1915, which may be capable of transmitting or receiving wireless transmissions (e.g., concurrently). The transceiver 1910 may also include a modem to modulate signals, to provide the modulated signals for transmission (e.g., by one or more antennas 1915, by a wired transmitter), to receive modulated signals (e.g., from one or more antennas 1915, from a wired receiver), and to demodulate signals. In some implementations, the transceiver 1910 may include one or more interfaces, such as one or more interfaces coupled with the one or more antennas 1915 that are configured to support various receiving or obtaining operations, or one or more interfaces coupled with the one or more antennas 1915 that are configured to support various transmitting or outputting operations, or a combination thereof. In some implementations, the transceiver 1910 may include or be configured for coupling with one or more processors or memory components that are operable to perform or support operations based on received or obtained information or signals, or to generate information or other signals for transmission or other outputting, or any combination thereof. In some implementations, the transceiver 1910, or the transceiver 1910 and the one or more antennas 1915, or the transceiver 1910 and the one or more antennas 1915 and one or more processors or memory components (for example, the processor 1935, or the memory 1925, or both), may be included in a chip or chip assembly that is installed in the device 1905. The transceiver 1910, or the transceiver 1910 and one or more antennas 1915 or wired interfaces, where applicable, may be an example of a transmitter 1515, a transmitter 1615, a receiver 1510, a receiver 1610, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1925 may include RAM and ROM. The memory 1925 may store computer-readable, computer-executable code 1930 including instructions that, when executed by the processor 1935, cause the device 1905 to perform various functions described herein. The code 1930 may be stored in a non-transitory computer-readable medium such as system memory or another type of memory. In some cases, the code 1930 may not be directly executable by the processor 1935 but may cause a computer (e.g., when compiled and executed) to perform functions described herein. In some cases, the memory 1925 may contain, among other things, a BIOS which may control basic hardware or software operation such as the interaction with peripheral components or devices.

The processor 1935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1935 may be configured to operate a memory array using a memory controller. In some other cases, a memory controller may be integrated into the processor 1935. The processor 1935 may be configured to execute computer-readable instructions stored in a memory (e.g., the memory 1925) to cause the device 1905 to perform various functions (e.g., functions or tasks supporting probabilistic shaping and channel coding for wireless signals). For example, the device 1905 or a component of the device 1905 may include a processor 1935 and memory 1925 coupled with the processor 1935, the processor 1935 and memory 1925 configured to perform various functions described herein. The processor 1935 may be an example of a cloud-computing platform (e.g., one or more physical nodes and supporting software such as operating systems, virtual machines, or container instances) that may host the functions (e.g., by executing code 1930) to perform the functions of the device 1905. The processor 1935 may be any one or more suitable processors capable of executing scripts or instructions of one or more software programs stored in the device 1905 (such as within the memory 1925). In some implementations, the processor 1935 may be a component of a processing system. A processing system may generally refer to a system or series of machines or components that receives inputs and processes the inputs to produce a set of outputs (which may be passed to other systems or components of, for example, the device 1905). For example, a processing system of the device 1905 may refer to a system including the various other components or subcomponents of the device 1905, such as the processor 1935, or the transceiver 1910, or the communications manager 1920, or other components or combinations of components of the device 1905. The processing system of the device 1905 may interface with other components of the device 1905, and may process information received from other components (such as inputs or signals) or output information to other components. For example, a chip or modem of the device 1905 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1905 may transmit information output from the chip or modem. In some implementations, the second interface may refer to an interface between the processing system of the chip or modem and a receiver, such that the device 1905 may obtain information or signal inputs, and the information may be passed to the processing system. A person having ordinary skill in the art will readily recognize that the first interface also may obtain information or signal inputs, and the second interface also may output information or signal outputs.

In some examples, a bus 1940 may support communications of (e.g., within) a protocol layer of a protocol stack. In some examples, a bus 1940 may support communications associated with a logical channel of a protocol stack (e.g., between protocol layers of a protocol stack), which may include communications performed within a component of the device 1905, or between different components of the device 1905 that may be co-located or located in different locations (e.g., where the device 1905 may refer to a system in which one or more of the communications manager 1920, the transceiver 1910, the memory 1925, the code 1930, and the processor 1935 may be located in one of the different components or divided between different components).

In some examples, the communications manager 1920 may manage aspects of communications with a core network 130 (e.g., via one or more wired or wireless backhaul links). For example, the communications manager 1920 may manage the transfer of data communications for client devices, such as one or more UEs 115. In some examples, the communications manager 1920 may manage communications with other network entities 105, and may include a controller or scheduler for controlling communications with UEs 115 in cooperation with other network entities 105. In some examples, the communications manager 1920 may support an X2 interface within an LTE/LTE-A wireless communications network technology to provide communication between network entities 105.

The communications manager 1920 may support wireless communication at a first device in accordance with examples as disclosed herein. For example, the communications manager 1920 may be configured as or otherwise support a means for generating, using information bits, a set of shaping bits associated with shaping the information bits into a probability distribution of modulated symbols for a transmission. The communications manager 1920 may be configured as or otherwise support a means for encoding the information bits using a first channel coding scheme. The communications manager 1920 may be configured as or otherwise support a means for encoding the set of shaping bits using a second channel coding scheme based on generating the set of shaping bits. The communications manager 1920 may be configured as or otherwise support a means for modulating the encoded information bits and the encoded set of shaping bits for the transmission to a second device, the modulated encoded information bits associated with modulated symbols that are probabilistically shaped corresponding to the probability distribution.

Additionally, or alternatively, the communications manager 1920 may support wireless communication at a second device in accordance with examples as disclosed herein. For example, the communications manager 1920 may be configured as or otherwise support a means for demodulating information bits and a set of shaping bits from signaling received from a first device, the set of shaping bits associated with shaping the information bits into a probability distribution of modulated symbols for wireless communication. The communications manager 1920 may be configured as or otherwise support a means for decoding the set of shaping bits using a second channel decoding scheme based on demodulating the set of shaping bits. The communications manager 1920 may be configured as or otherwise support a means for deshaping the information bits using a set of masking bits, the set of masking bits generated based on the decoded set of shaping bits. The communications manager 1920 may be configured as or otherwise support a means for decoding the information bits using a first channel decoding scheme based on deshaping the information bits.

By including or configuring the communications manager 1920 in accordance with examples as described herein, the device 1905 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 1920 may be configured to perform various operations (e.g., receiving, obtaining, monitoring, outputting, transmitting) using or otherwise in cooperation with the transceiver 1910, the one or more antennas 1915 (e.g., where applicable), or any combination thereof. Although the communications manager 1920 is illustrated as a separate component, in some examples, one or more functions described with reference to the communications manager 1920 may be supported by or performed by the processor 1935, the memory 1925, the code 1930, the transceiver 1910, or any combination thereof. For example, the code 1930 may include instructions executable by the processor 1935 to cause the device 1905 to perform various aspects of probabilistic shaping and channel coding for wireless signals as described herein, or the processor 1935 and the memory 1925 may be otherwise configured to perform or support such operations.

Figure 20:
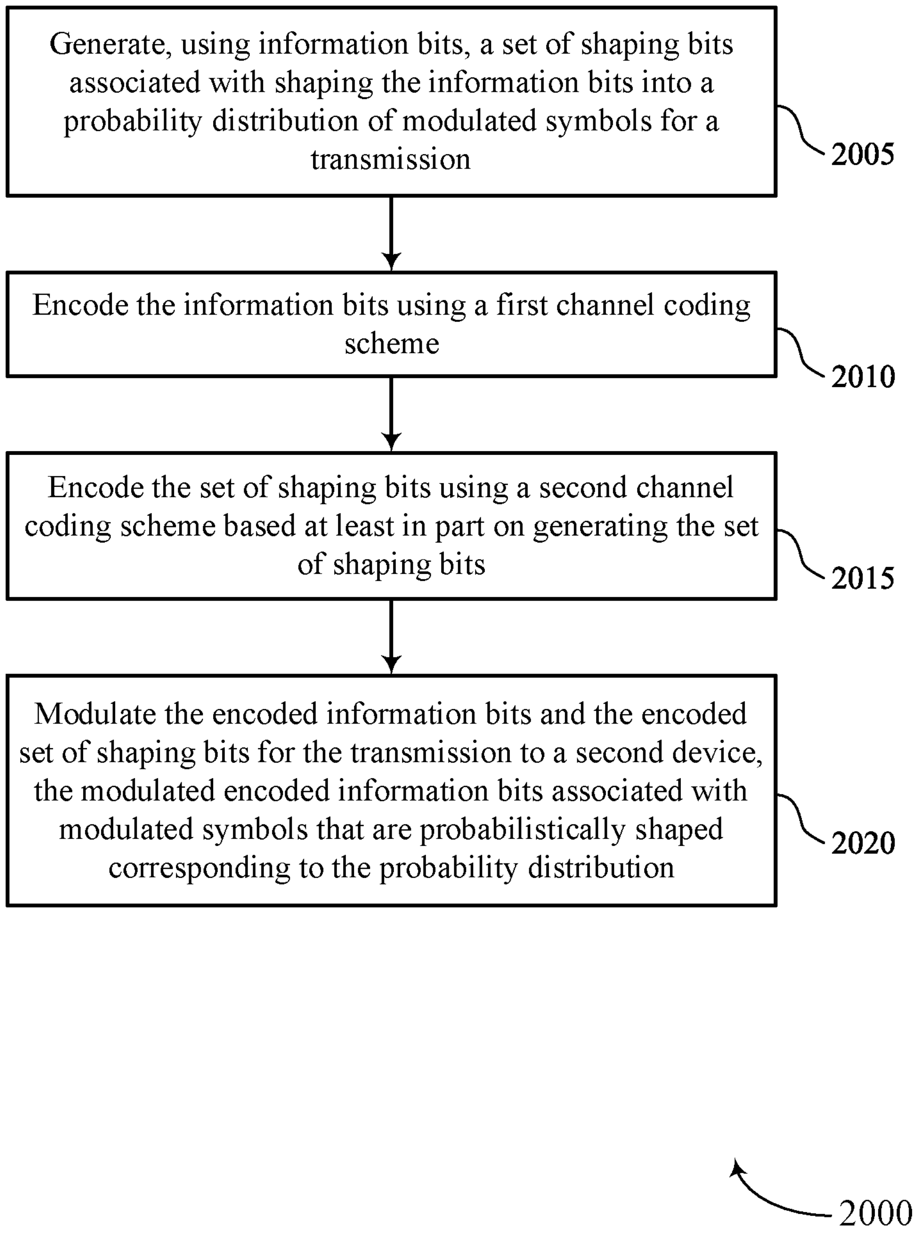
FIGS. 20 through 23 show flowcharts illustrating methods that support probabilistic shaping and channel coding for wireless signals in accordance with one or more aspects of the present disclosure.

FIG. 20 shows a flowchart illustrating a method 2000 that supports probabilistic shaping and channel coding for wireless signals in accordance with one or more aspects of the present disclosure. The operations of the method 2000 may be implemented by a network entity or a UE or its components as described herein. For example, the operations of the method 2000 may be performed by a network entity or a UE 115 as described with reference to FIGS. 1 through 14. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 2005, the method may include generating, using information bits, a set of shaping bits associated with shaping the information bits into a probability distribution of modulated symbols for a transmission. The operations of 2005 may be performed in accordance with examples as disclosed herein. In some examples, aspects of the operations of 2005 may be performed by a shaping bit generation component 1225 as described with reference to FIG. 12.

At 2010, the method may include encoding the information bits using a first channel coding scheme. The operations of 2010 may be performed in accordance with examples as disclosed herein. In some examples, aspects of the operations of 2010 may be performed by an information bit encoding component 1230 as described with reference to FIG. 12.

At 2015, the method may include encoding the set of shaping bits using a second channel coding scheme based at least in part on generating the set of shaping bits. The operations of 2015 may be performed in accordance with examples as disclosed herein. In some examples, aspects of the operations of 2015 may be performed by a shaping bit encoding component 1235 as described with reference to FIG. 12.

At 2020, the method may include modulating the encoded information bits and the encoded set of shaping bits for the transmission to a second device, the modulated encoded information bits associated with modulated symbols that are probabilistically shaped corresponding to the probability distribution. The operations of 2020 may be performed in accordance with examples as disclosed herein. In some examples, aspects of the operations of 2020 may be performed by a modulating component 1240 as described with reference to FIG. 12.

Figure 21:
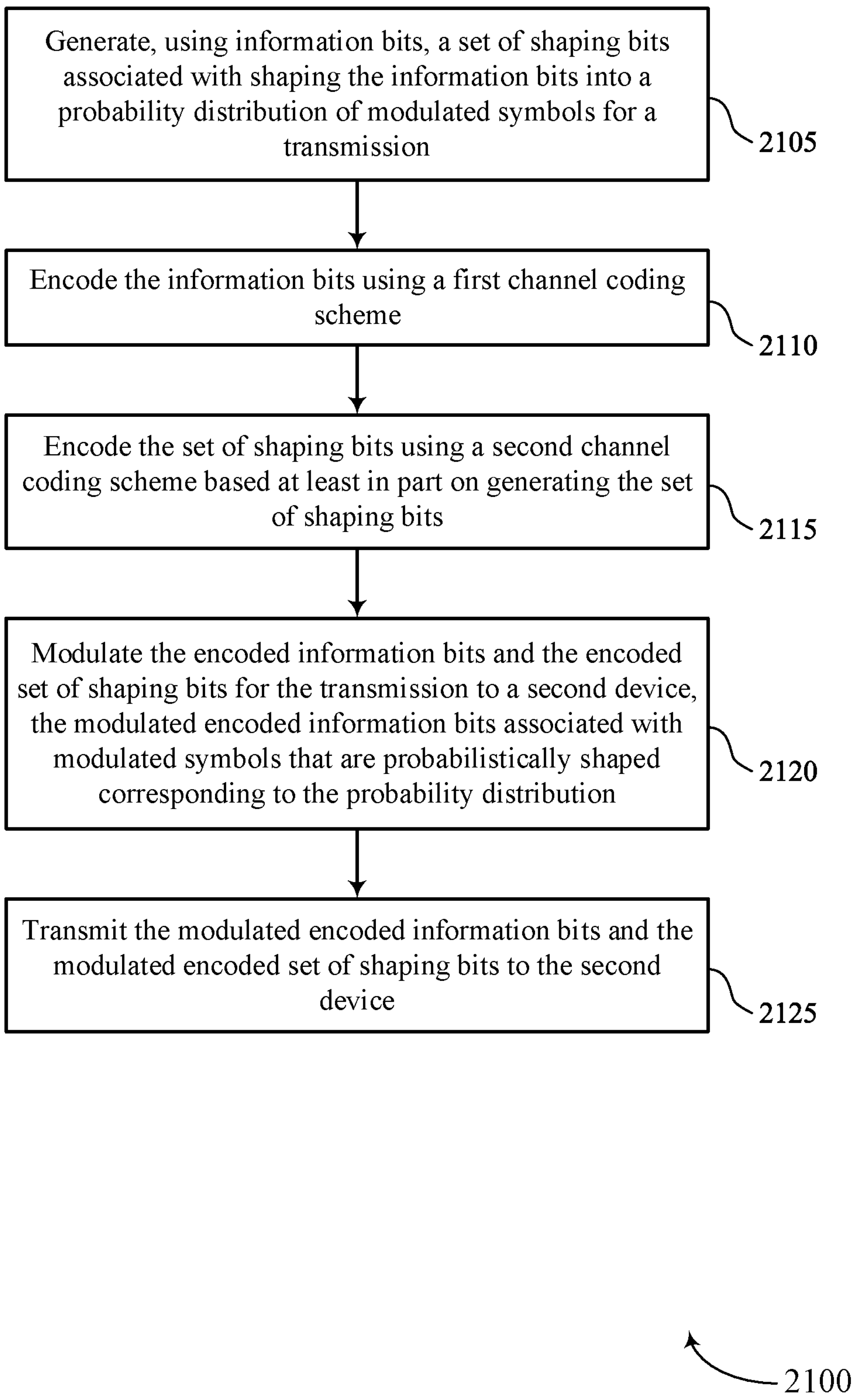

FIG. 21 shows a flowchart illustrating a method 2100 that supports probabilistic shaping and channel coding for wireless signals in accordance with one or more aspects of the present disclosure. The operations of the method 2100 may be implemented by a network entity or a UE or its components as described herein. For example, the operations of the method 2100 may be performed by a network entity or a UE 115 as described with reference to FIGS. 1 through 14. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 2105, the method may include generating, using information bits, a set of shaping bits associated with shaping the information bits into a probability distribution of modulated symbols for a transmission. The operations of 2105 may be performed in accordance with examples as disclosed herein. In some examples, aspects of the operations of 2105 may be performed by a shaping bit generation component 1225 as described with reference to FIG. 12.

At 2110, the method may include encoding the information bits using a first channel coding scheme. The operations of 2110 may be performed in accordance with examples as disclosed herein. In some examples, aspects of the operations of 2110 may be performed by an information bit encoding component 1230 as described with reference to FIG. 12.

At 2115, the method may include encoding the set of shaping bits using a second channel coding scheme based at least in part on generating the set of shaping bits. The operations of 2115 may be performed in accordance with examples as disclosed herein. In some examples, aspects of the operations of 2115 may be performed by a shaping bit encoding component 1235 as described with reference to FIG. 12.

At 2120, the method may include modulating the encoded information bits and the encoded set of shaping bits for the transmission to a second device, the modulated encoded information bits associated with modulated symbols that are probabilistically shaped corresponding to the probability distribution. The operations of 2120 may be performed in accordance with examples as disclosed herein. In some examples, aspects of the operations of 2120 may be performed by a modulating component 1240 as described with reference to FIG. 12.

At 2125, the method may include transmitting the modulated encoded information bits and the modulated encoded set of shaping bits to the second device. The operations of 2125 may be performed in accordance with examples as disclosed herein. In some examples, aspects of the operations of 2125 may be performed by a transmitting component 1265 as described with reference to FIG. 12.

Figure 22:
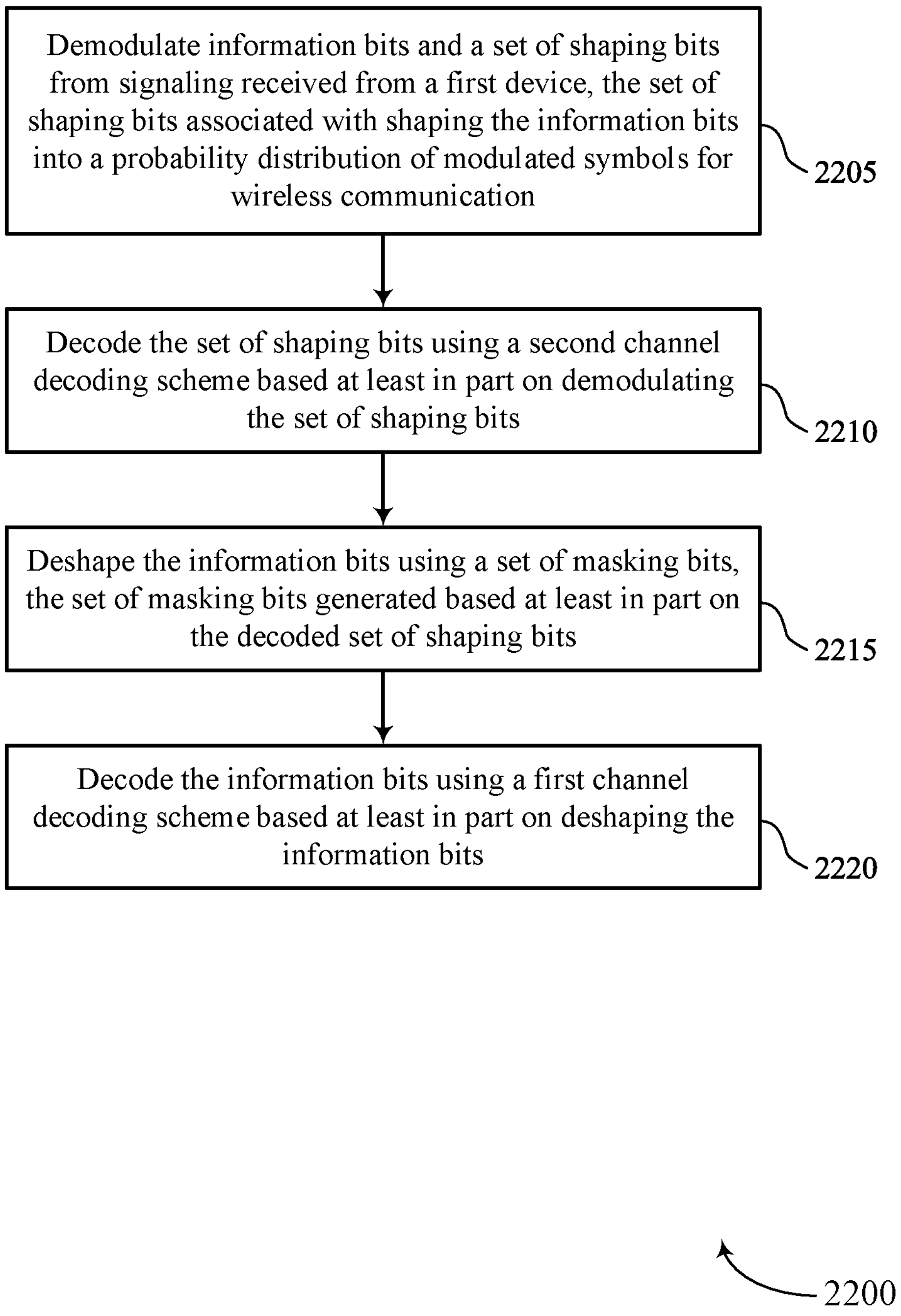

FIG. 22 shows a flowchart illustrating a method 2200 that supports probabilistic shaping and channel coding for wireless signals in accordance with one or more aspects of the present disclosure. The operations of the method 2200 may be implemented by a UE or a network entity or its components as described herein. For example, the operations of the method 2200 may be performed by a UE 115 or a network entity as described with reference to FIGS. 1 through 9 and 15 through 19. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 2205, the method may include demodulating information bits and a set of shaping bits from signaling received from a first device, the set of shaping bits associated with shaping the information bits into a probability distribution of modulated symbols for wireless communication. The operations of 2205 may be performed in accordance with examples as disclosed herein. In some examples, aspects of the operations of 2205 may be performed by a demodulating component 1745 as described with reference to FIG. 17.

At 2210, the method may include decoding the set of shaping bits using a second channel decoding scheme based at least in part on demodulating the set of shaping bits. The operations of 2210 may be performed in accordance with examples as disclosed herein. In some examples, aspects of the operations of 2210 may be performed by a shaping bit decoding component 1750 as described with reference to FIG. 17.

At 2215, the method may include deshaping the information bits using a set of masking bits, the set of masking bits generated based at least in part on the decoded set of shaping bits. The operations of 2215 may be performed in accordance with examples as disclosed herein. In some examples, aspects of the operations of 2215 may be performed by a deshaping component 1755 as described with reference to FIG. 17.

At 2220, the method may include decoding the information bits using a first channel decoding scheme based at least in part on deshaping the information bits. The operations of 2220 may be performed in accordance with examples as disclosed herein. In some examples, aspects of the operations of 2220 may be performed by an information bit decoding component 1760 as described with reference to FIG. 17.

Figure 23:
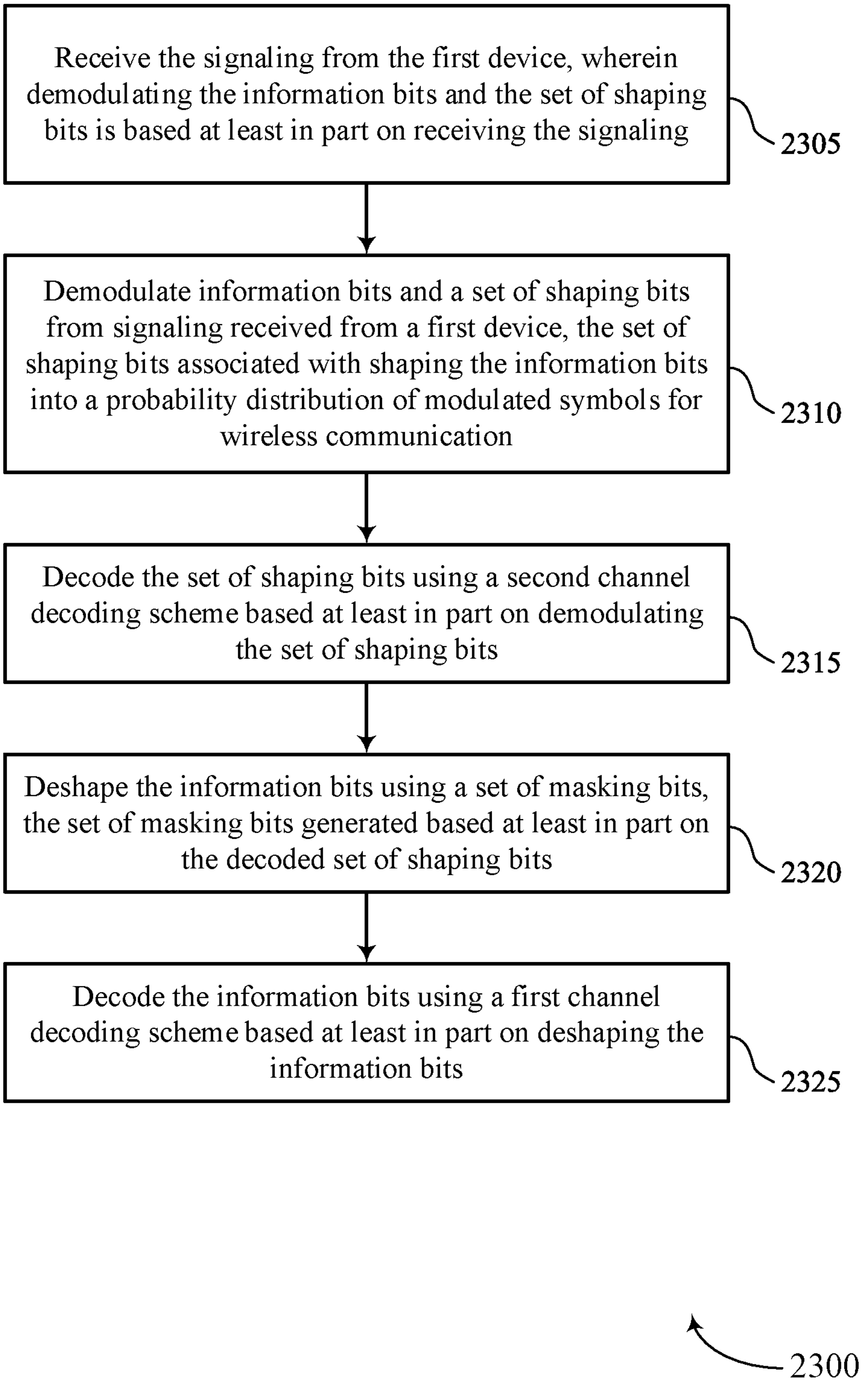

FIG. 23 shows a flowchart illustrating a method 2300 that supports probabilistic shaping and channel coding for wireless signals in accordance with one or more aspects of the present disclosure. The operations of the method 2300 may be implemented by a UE or a network entity or its components as described herein. For example, the operations of the method 2300 may be performed by a UE 115 or a network entity as described with reference to FIGS. 1 through 9 and 15 through 19. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 2305, the method may include receiving the signaling from the first device, where demodulating the information bits and the set of shaping bits is based at least in part on receiving the signaling. The operations of 2305 may be performed in accordance with examples as disclosed herein. In some examples, aspects of the operations of 2305 may be performed by a signaling reception component 1780 as described with reference to FIG. 17.

At 2310, the method may include demodulating information bits and a set of shaping bits from signaling received from a first device, the set of shaping bits associated with shaping the information bits into a probability distribution of modulated symbols for wireless communication. The operations of 2310 may be performed in accordance with examples as disclosed herein. In some examples, aspects of the operations of 2310 may be performed by a demodulating component 1745 as described with reference to FIG. 17.

At 2315, the method may include decoding the set of shaping bits using a second channel decoding scheme based at least in part on demodulating the set of shaping bits. The operations of 2315 may be performed in accordance with examples as disclosed herein. In some examples, aspects of the operations of 2315 may be performed by a shaping bit decoding component 1750 as described with reference to FIG. 17.

At 2320, the method may include deshaping the information bits using a set of masking bits, the set of masking bits generated based at least in part on the decoded set of shaping bits. The operations of 2320 may be performed in accordance with examples as disclosed herein. In some examples, aspects of the operations of 2320 may be performed by a deshaping component 1755 as described with reference to FIG. 17.

At 2325, the method may include decoding the information bits using a first channel decoding scheme based at least in part on deshaping the information bits. The operations of 2325 may be performed in accordance with examples as disclosed herein. In some examples, aspects of the operations of 2325 may be performed by an information bit decoding component 1760 as described with reference to FIG. 17.

The following provides an overview of aspects of the present disclosure:

Aspect 1: A method for wireless communication at a first device, comprising: generating, using information bits, a set of shaping bits associated with shaping the information bits into a probability distribution of modulated symbols for a transmission; encoding the information bits using a first channel coding scheme; encoding the set of shaping bits using a second channel coding scheme based at least in part on generating the set of shaping bits; and modulating the encoded information bits and the encoded set of shaping bits for the transmission to a second device, the modulated encoded information bits associated with modulated symbols that are probabilistically shaped corresponding to the probability distribution.

Aspect 2: The method of aspect 1, further comprising: transmitting the modulated encoded information bits and the modulated encoded set of shaping bits to the second device.

Aspect 3: The method of aspect 2, further comprising: receiving first feedback from the second device based at least in part on transmitting the modulated encoded information bits, the first feedback associated with the information bits; and receiving, from the second device based at least in part on transmitting the modulated encoded set of shaping bits, second feedback different from the first feedback, the second feedback associated with the set of shaping bits.

Aspect 4: The method of any of aspects 1 through 3, wherein the probability distribution of the modulated symbols comprises a first set of symbols with respective probabilities of usage below a first probability level and a second set of symbols with respective probabilities of usage above or equal to the first probability level.

Aspect 5: The method of any of aspects 1 through 4, further comprising: generating a set of masking bits corresponding to the set of shaping bits; and shaping the information bits for modulation based at least in part on combining the information bits with the set of masking bits, wherein modulating the encoded information bits is based at least in part on shaping the information bits.

Aspect 6: The method of aspect 5, wherein generating the set of masking bits comprises: generating the set of masking bits using the set of shaping bits, wherein generating the masking bits using the set of shaping bits comprises one or more of multiplying the set of shaping bits with a generator matrix to generate the set of masking bits or encoding the set of shaping bits using a linear code to generate the set of masking bits.

Aspect 7: The method of any of aspects 5 through 6, wherein generating the set of shaping bits comprises: generate the set of shaping bits by compressing the set of masking bits to reduce a size of the set of masking bits.

Aspect 8: The method of any of aspects 5 through 7, wherein the information bits comprise data bits and parity bits associated with the data bits.

Aspect 9: The method of any of aspects 5 through 8, wherein shaping the information bits comprises: applying the set of masking bits to a subset of the information bits, wherein the subset of the information bits is based at least in part on one or more respective modulation symbol bit positions associated with the subset of information bits.

Aspect 10: The method of any of aspects 5 through 9, wherein shaping the information bits comprises: applying a first set of shaping parameters to a first subset of the information bits, the first subset associated with a first set of frequency resources, a first set of time resources, a first set of spatial layers, or any combination thereof; and applying a second set of shaping parameters to a second subset of the information bits, the second subset associated with a second set of frequency resources, a second set of time resources, a second set of spatial layers, or any combination thereof.

Aspect 11: The method of aspect 10, wherein generating the set of shaping bits comprises: generating a first subset of the set of shaping bits corresponding to the first set of shaping parameters; and generating a second subset of the set of shaping bits corresponding to the second set of shaping parameters.

Aspect 12: The method of any of aspects 1 through 11, wherein generating the set of shaping bits comprises: shaping the information bits for modulation after encoding the information bits based at least in part on combining the information bits with a set of masking bits, wherein the set of shaping bits is indicative of the set of masking bits; and generating the set of shaping bits after encoding the information bits using the encoded information bits.

Aspect 13: The method of any of aspects 1 through 12, wherein generating the set of shaping bits comprises: shaping the information bits for modulation before encoding the information bits based at least in part on combining the information bits with a set of masking bits, wherein the set of shaping bits is indicative of the set of masking bits; and generating the set of shaping bits using unencoded information bits based at least in part on shaping the information bits before encoding the information bits.

Aspect 14: The method of any of aspects 1 through 13, wherein modulating the encoded information bits and the encoded set of shaping bits comprises: modulating the encoded information bits using a first modulation scheme; modulating the encoded set of shaping bits using a second modulation scheme; and transmitting the modulated encoded information bits and the modulated encoded set of shaping bits to the second device.

Aspect 15: The method of any of aspects 1 through 14, wherein modulating the encoded information bits and the encoded set of shaping bits comprises: jointly modulating the encoded information bits and the encoded set of shaping bits using a modulation scheme; and transmitting the modulated encoded information bits and the modulated encoded set of shaping bits to the second device.

Aspect 16: The method of aspect 15, wherein the modulated encoded information bits are mapped to respective amplitudes of the modulated symbols and the modulated encoded set of shaping bits is mapped to respective signs of the modulated symbols.

Aspect 17: The method of any of aspects 1 through 16, further comprising: transmit the modulated encoded information bits and the modulated encoded set of shaping bits to the second device, wherein the modulated encoded information bits and the modulated encoded set of shaping bits are transmitted via a same transmission.

Aspect 18: The method of any of aspects 1 through 17, further comprising: transmit the modulated encoded information bits and the modulated encoded set of shaping bits to the second device, wherein the modulated encoded information bits and the modulated encoded set of shaping bits are transmitted via different transmissions.

Aspect 19: The method of aspect 18, wherein the set of shaping bits is concatenated with second information bits for encoding, modulation, and transmission via a second transmission.

Aspect 20: A method for wireless communication at a second device, comprising: demodulating information bits and a set of shaping bits from signaling received from a first device, the set of shaping bits associated with shaping the information bits into a probability distribution of modulated symbols for wireless communication; decoding the set of shaping bits using a second channel decoding scheme based at least in part on demodulating the set of shaping bits; deshaping the information bits using a set of masking bits, the set of masking bits generated based at least in part on the decoded set of shaping bits; and decoding the information bits using a first channel decoding scheme based at least in part on deshaping the information bits.

Aspect 21: The method of aspect 20, further comprising: receiving the signaling from the first device, wherein demodulating the information bits and the set of shaping bits is based at least in part on receiving the signaling.

Aspect 22: The method of any of aspects 20 through 21, further comprising: transmitting first feedback to the first device based at least in part on decoding the information bits, the first feedback associated with the information bits; and transmitting, to the first device based at least in part on decoding the set of shaping bits, second feedback different from the first feedback, the second feedback associated with the set of shaping bits.

Aspect 23: The method of any of aspects 20 through 22, wherein the probability distribution of modulated symbols comprises a first set of symbols with respective probabilities of usage below a first probability level and a second set of symbols with respective probabilities of usage above or equal to the first probability level.

Aspect 24: The method of any of aspects 20 through 23, wherein deshaping the information bits comprises: removing the set of masking bits from a first set of log likelihood ratios associated with the information bits and the set of masking bits to generate a second set of log likelihood ratios associated with the information bits.

Aspect 25: The method of any of aspects 20 through 24, further comprising: generating the set of masking bits based at least in part on one or more of multiplying the set of shaping bits with a generator matrix to generate the set of masking bits or encoding the set of shaping bits using a linear code to generate the set of masking bits.

Aspect 26: The method of any of aspects 20 through 25, further comprising: generating the set of masking bits based at least in part on decompressing the set of shaping bits.

Aspect 27: The method of any of aspects 20 through 26, wherein the information bits comprise data bits and parity bits associated with the data bits.

Aspect 28: The method of any of aspects 20 through 27, wherein deshaping the information bits comprises: removing the set of masking bits from a subset of the information bits, wherein the subset of the information bits is based at least in part on one or more respective modulation symbol bit positions associated with the subset of information bits.

Aspect 29: The method of any of aspects 20 through 28, wherein deshaping the information bits comprises: applying a first set of deshaping parameters to a first subset of the information bits, the first subset associated with a first set of frequency resources, a first set of time resources, a first set of spatial layers, or any combination thereof; and applying a second set of deshaping parameters to a second subset of the information bits, the second subset associated with a second set of frequency resources, a second set of time resources, a second set of spatial layers, or any combination thereof.

Aspect 30: The method of any of aspects 20 through 29, wherein a first subset of the set of shaping bits corresponds to the first set of deshaping parameters and a second subset of the set of shaping bits corresponds to the second set of deshaping parameters.

Aspect 31: The method of any of aspects 20 through 30, wherein deshaping the information bits comprises: deshaping the information bits after decoding the information bits.

Aspect 32: The method of any of aspects 20 through 31, wherein deshaping the information bits comprises: deshaping the information bits before decoding the information bits.

Aspect 33: The method of any of aspects 20 through 32, wherein demodulating the information bits and the set of shaping bits comprises: demodulating the information bits using a first demodulation scheme; and demodulating the set of shaping bits using a second demodulation scheme.

Aspect 34: The method of any of aspects 20 through 33, wherein demodulating the information bits and the set of shaping bits comprises: jointly demodulating the information bits and the set of shaping bits using a demodulation scheme.

Aspect 35: The method of aspect 34, wherein the information bits are mapped to respective amplitudes of the modulated symbols and the set of shaping bits is mapped to respective signs of the modulated symbols.

Aspect 36: The method of any of aspects 20 through 35, further comprising: receiving the modulated encoded information bits and the modulated encoded set of shaping bits from the first device, wherein the modulated encoded information bits and the modulated encoded set of shaping bits are received via a same transmission.

Aspect 37: The method of any of aspects 20 through 36, further comprising: receive the modulated encoded information bits and the modulated encoded set of shaping bits from the first device, wherein the modulated encoded information bits and the modulated encoded set of shaping bits are received via different transmissions.

Aspect 38: The method of aspect 37, wherein the set of shaping bits is concatenated with second information bits for reception via a second transmission, demodulation, and decoding.

Aspect 39: An apparatus for wireless communication at a first device, comprising a processor; memory coupled with the processor; and instructions stored in the memory and executable by the processor to cause the apparatus to perform a method of any of aspects 1 through 19.

Aspect 40: An apparatus for wireless communication at a first device, comprising at least one means for performing a method of any of aspects 1 through 19.

Aspect 41: A non-transitory computer-readable medium storing code for wireless communication at a first device, the code comprising instructions executable by a processor to perform a method of any of aspects 1 through 19.

Aspect 42: An apparatus for wireless communication at a second device, comprising a processor; memory coupled with the processor; and instructions stored in the memory and executable by the processor to cause the apparatus to perform a method of any of aspects 20 through 38.

Aspect 43: An apparatus for wireless communication at a second device, comprising at least one means for performing a method of any of aspects 20 through 38.

Aspect 44: A non-transitory computer-readable medium storing code for wireless communication at a second device, the code comprising instructions executable by a processor to perform a method of any of aspects 20 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, “determining” can include receiving (e.g., receiving information), accessing (e.g., accessing data stored in memory) and the like. Also, “determining” can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term “example” used herein means “serving as an example, instance, or illustration,” and not “preferred” or “advantageous over other examples.” The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first device, comprising:

a processor;

a memory coupled with the processor, with instructions stored in the memory, the instructions being executable by the processor to cause the apparatus to:

generate, using information bits, a set of shaping bits associated with shaping the information bits into a probability distribution of modulated symbols for a transmission, wherein the probability distribution of the modulated symbols comprises a first set of symbols with respective probabilities of usage below a first probability level and a second set of symbols with respective probabilities of usage above or equal to the first probability level;

encode the information bits using a first channel coding scheme;

encode the set of shaping bits using a second channel coding scheme based at least in part on generating the set of shaping bits; and modulate the encoded information bits and the encoded set of shaping bits for the transmission to a second device, the modulated encoded information bits associated with modulated symbols that are probabilistically shaped corresponding to the probability distribution.

2. The apparatus of claim 1, wherein the instructions are further executable by the processor to cause the apparatus to:

transmit the modulated encoded information bits and the modulated encoded set of shaping bits to the second device.

3. The apparatus of claim 2, wherein the instructions are further executable by the processor to cause the apparatus to:

receive first feedback from the second device based at least in part on transmitting the modulated encoded information bits, the first feedback associated with the information bits; and receive, from the second device based at least in part on transmitting the modulated encoded set of shaping bits, second feedback different from the first feedback, the second feedback associated with the set of shaping bits.

4. The apparatus of claim 1, wherein the instructions are further executable by the processor to cause the apparatus to:

generate a set of masking bits corresponding to the set of shaping bits; and shape the information bits for modulation based at least in part on combining the information bits with the set of masking bits, wherein modulating the encoded information bits is based at least in part on shaping the information bits.

5. The apparatus of claim 4, wherein the instructions to generate the set of masking bits are executable by the processor to cause the apparatus to:

generate the set of masking bits using the set of shaping bits, wherein generating the masking bits using the set of shaping bits comprises one or more of multiplying the set of shaping bits with a generator matrix to generate the set of masking bits or encoding the set of shaping bits using a linear code to generate the set of masking bits.

6. The apparatus of claim 4, wherein the instructions to generate the set of shaping bits are executable by the processor to cause the apparatus to:

generate the set of shaping bits by compressing the set of masking bits to reduce a size of the set of masking bits.

7. The apparatus of claim 4, wherein the instructions to shape the information bits are executable by the processor to cause the apparatus to:

apply the set of masking bits to a subset of the information bits, wherein the subset of the information bits is based at least in part on one or more respective modulation symbol bit positions associated with the subset of information bits.

8. The apparatus of claim 4, wherein the instructions to shape the information bits are executable by the processor to cause the apparatus to:

apply a first set of shaping parameters to a first subset of the information bits, the first subset associated with a first set of frequency resources, a first set of time resources, a first set of spatial layers, or any combination thereof; and apply a second set of shaping parameters to a second subset of the information bits, the second subset associated with a second set of frequency resources, a second set of time resources, a second set of spatial layers, or any combination thereof.

9. The apparatus of claim 8, wherein the instructions to generate the set of shaping bits are executable by the processor to cause the apparatus to:

generate a first subset of the set of shaping bits corresponding to the first set of shaping parameters; and generate a second subset of the set of shaping bits corresponding to the second set of shaping parameters.

10. The apparatus of claim 1, wherein the information bits comprise data bits and parity bits associated with the data bits.

11. The apparatus of claim 1, wherein the instructions are further executable by the processor to cause the apparatus to:

shape the information bits for modulation after encoding the information bits based at least in part on combining the information bits with a set of masking bits, wherein the set of shaping bits is indicative of the set of masking bits; and generate the set of shaping bits after encoding the information bits using the encoded information bits.

12. The apparatus of claim 1, wherein the instructions are further executable by the processor to cause the apparatus to:

shape the information bits for modulation before encoding the information bits based at least in part on combining the information bits with a set of masking bits, wherein the set of shaping bits is indicative of the set of masking bits; and generate the set of shaping bits using unencoded information bits based at least in part on shaping the information bits before encoding the information bits.

13. The apparatus of claim 1, wherein the instructions to modulate the encoded information bits and the encoded set of shaping bits are executable by the processor to cause the apparatus to:

modulate the encoded information bits using a first modulation scheme;

modulate the encoded set of shaping bits using a second modulation scheme; and transmit the modulated encoded information bits and the modulated encoded set of shaping bits to the second device.

14. The apparatus of claim 1, wherein the instructions to modulate the encoded information bits and the encoded set of shaping bits are executable by the processor to cause the apparatus to:

jointly modulate the encoded information bits and the encoded set of shaping bits using a modulation scheme; and transmit the modulated encoded information bits and the modulated encoded set of shaping bits to the second device.

15. The apparatus of claim 14, wherein the modulated encoded information bits are mapped to respective amplitudes of the modulated symbols and the modulated encoded set of shaping bits is mapped to respective signs of the modulated symbols.

16. The apparatus of claim 1, wherein the instructions are further executable by the processor to cause the apparatus to:

transmit the modulated encoded information bits and the modulated encoded set of shaping bits to the second device, wherein the modulated encoded information bits and the modulated encoded set of shaping bits are transmitted via a same transmission.

17. The apparatus of claim 1, wherein the instructions are further executable by the processor to cause the apparatus to:

transmit the modulated encoded information bits and the modulated encoded set of shaping bits to the second device, wherein the modulated encoded information bits and the modulated encoded set of shaping bits are transmitted via different transmissions.

18. The apparatus of claim 17, wherein the set of shaping bits is concatenated with second information bits for encoding, modulation, and transmission via a second transmission.

19. An apparatus for wireless communication at a second device, comprising:

a processor;

a memory coupled with the processor, with instructions stored in the memory, the instructions being executable by the processor to cause the apparatus to:

demodulate information bits and a set of shaping bits from signaling received from a first device, the set of shaping bits associated with shaping the information bits into a probability distribution of modulated symbols for wireless communication, wherein the probability distribution of the modulated symbols comprises a first set of symbols with respective probabilities of usage below a first probability level and a second set of symbols with respective probabilities of usage above or equal to the first probability level;

decode the set of shaping bits using a second channel decoding scheme based at least in part on demodulating the set of shaping bits;

deshape the information bits using a set of masking bits, the set of masking bits generated based at least in part on the decoded set of shaping bits; and decode the information bits using a first channel decoding scheme based at least in part on deshaping the information bits.

20. The apparatus of claim 19, wherein the instructions are further executable by the processor to cause the apparatus to:

transmit first feedback to the first device based at least in part on decoding the information bits, the first feedback associated with the information bits; and transmit, to the first device based at least in part on decoding the set of shaping bits, second feedback different from the first feedback, the second feedback associated with the set of shaping bits.

21. The apparatus of claim 19, wherein the instructions to deshape the information bits are executable by the processor to cause the apparatus to:

remove the set of masking bits from a first set of log likelihood ratios associated with the information bits and the set of masking bits to generate a second set of log likelihood ratios associated with the information bits.

22. The apparatus of claim 19, wherein the instructions are further executable by the processor to cause the apparatus to:

generate the set of masking bits based at least in part on decompressing the set of shaping bits.

23. The apparatus of claim 19, wherein the instructions to deshape the information bits are executable by the processor to cause the apparatus to:

remove the set of masking bits from a subset of the information bits, wherein the subset of the information bits is based at least in part on one or more respective modulation symbol bit positions associated with the subset of information bits.

24. The apparatus of claim 19, wherein the instructions to deshape the information bits are executable by the processor to cause the apparatus to:

apply a first set of deshaping parameters to a first subset of the information bits, the first subset associated with a first set of frequency resources, a first set of time resources, a first set of spatial layers, or any combination thereof; and apply a second set of deshaping parameters to a second subset of the information bits, the second subset associated with a second set of frequency resources, a second set of time resources, a second set of spatial layers, or any combination thereof.

25. The apparatus of claim 19, wherein the instructions to demodulate the information bits and the set of shaping bits are executable by the processor to cause the apparatus to:

demodulate the information bits using a first demodulation scheme; and demodulate the set of shaping bits using a second demodulation scheme.

26. The apparatus of claim 19, wherein the instructions to demodulate the information bits and the set of shaping bits are executable by the processor to cause the apparatus to:

jointly demodulate the information bits and the set of shaping bits using a demodulation scheme.

27. A method for wireless communication at a first device, comprising:

generating, using information bits, a set of shaping bits associated with shaping the information bits into a probability distribution of modulated symbols for a transmission, wherein the probability distribution of the modulated symbols comprises a first set of symbols with respective probabilities of usage below a first probability level and a second set of symbols with respective probabilities of usage above or equal to the first probability level;

encoding the information bits using a first channel coding scheme;

encoding the set of shaping bits using a second channel coding scheme based at least in part on generating the set of shaping bits; and modulating the encoded information bits and the encoded set of shaping bits for the transmission to a second device, the modulated encoded information bits comprising modulated symbols that are probabilistically shaped based at least in part on the probability distribution.

28. A method for wireless communication at a second device, comprising:

demodulating information bits and a set of shaping bits from signaling received from a first device, the set of shaping bits associated with shaping the information bits into a probability distribution of modulated symbols for wireless communication, wherein the probability distribution of the modulated symbols comprises a first set of symbols with respective probabilities of usage below a first probability level and a second set of symbols with respective probabilities of usage above or equal to the first probability level;

decoding the set of shaping bits using a second channel decoding scheme based at least in part on demodulating the set of shaping bits;

deshaping the information bits using a set of masking bits, the set of masking bits generated based at least in part on the decoded set of shaping bits; and decoding the information bits using a first channel decoding scheme based at least in part on deshaping the information bits.

* * * * *